(12) United States Patent
Nie et al.

(10) Patent No.: US 12,737,050 B2
(45) Date of Patent: Sep. 15, 2026

(54) USER INTERFACES FOR GESTURE DETECTION

(71) Applicant: Apple Inc., Cupertino, CA (US)

(72) Inventors: Yiqiang Nie, San Francisco, CA (US); Kaan E. Dogrusoz, San Francisco, CA (US); Charles Maalouf, Seattle, WA (US); Elizabeth A Ottens, San Francisco, CA (US); Brady J. Quist, Woodinville, WA (US)

(73) Assignee: Apple Inc., Cupertino, CA (US)

( * ) Notice: Subject to any disclaimer, the term of this patent is extended or adjusted under 35 U.S.C. 154(b) by 189 days.

(21) Appl. No.: 18/615,715

(22) Filed: Mar. 25, 2024

(65) Prior Publication Data

US 2024/0385691 A1 Nov. 21, 2024

Related U.S. Application Data

(60) Provisional application No. 63/464,515, filed on May 5, 2023.

(51) Int. Cl.
*G06F 3/01* (2006.01)

(52) U.S. Cl.
CPC .............. *G06F 3/017* (2013.01); *G06F 3/015* (2013.01)

(58) Field of Classification Search
CPC ................................. G06F 3/015; G06F 3/017
See application file for complete search history.

(56) References Cited

U.S. PATENT DOCUMENTS

| | | | |
|---|---|---|---|
| 4,803,487 | A | 2/1989 | Willard et al. |
| 5,483,261 | A | 1/1996 | Yasutake |
| 5,488,204 | A | 1/1996 | Mead et al. |
| 5,617,031 | A | 4/1997 | Tuttle |
| 5,793,366 | A | 8/1998 | Mano et al. |
| 5,825,352 | A | 10/1998 | Bisset et al. |
| 5,825,353 | A | 10/1998 | Will |
| 5,835,079 | A | 11/1998 | Shieh |
| 5,853,327 | A | 12/1998 | Gilboa |
| 5,880,411 | A | 3/1999 | Gillespie et al. |
| 6,008,807 | A | 12/1999 | Bretschneider et al. |
| 6,016,248 | A | 1/2000 | Anzai et al. |
| 6,031,531 | A | 2/2000 | Kimble |
| 6,128,010 | A | 10/2000 | Baxter et al. |
| 6,167,353 | A | 12/2000 | Piernot et al. |
| 6,188,391 | B1 | 2/2001 | Seely et al. |
| 6,190,174 | B1 | 2/2001 | Lam |
| 6,232,972 | B1 | 5/2001 | Arcuri et al. |
| 6,310,610 | B1 | 10/2001 | Beaton et al. |

(Continued)

FOREIGN PATENT DOCUMENTS

| | | | |
|---|---|---|---|
| AU | 2015101019 | A4 | 9/2015 |
| CN | 1556955 | A | 12/2004 |

(Continued)

OTHER PUBLICATIONS

Applicant-Initiated Interview Summary received for U.S. Appl. No. 18/674,435, malled on Sep. 29, 2025, 4 pages.

(Continued)

*Primary Examiner* — Daniel Samwel
(74) *Attorney, Agent, or Firm* — YHE Law LLP

(57) ABSTRACT

A computer system detects a gesture, such as an air gesture, and performs an operation based on the gesture.

60 Claims, 37 Drawing Sheets

(56) References Cited

U.S. PATENT DOCUMENTS 6,323,846 B1 11/2001 Westerman et al.
6,323,884 B1 11/2001 Bird et al.
6,359,837 B1 3/2002 Tsukamoto
6,424,376 B1 7/2002 Hirasawa
6,429,896 B1 8/2002 Aruga et al.
6,522,347 B1 2/2003 Tsuji et al.
6,650,894 B1 11/2003 Berstis et al.
6,690,387 B2 2/2004 Zimmerman et al.
6,809,724 B1 10/2004 Shiraishi et al.
6,809,759 B1 10/2004 Chiang
6,819,867 B2 11/2004 Mayer et al.
6,857,105 B1 2/2005 Fox et al.
6,889,138 B1 5/2005 Krull et al.
7,015,894 B2 3/2006 Morohoshi
7,184,064 B2 2/2007 Zimmerman et al.
7,463,304 B2 12/2008 Murray
7,537,162 B1 5/2009 Siu
7,571,014 B1 8/2009 Lambourne et al.
7,616,110 B2 11/2009 Crump et al.
7,653,883 B2 1/2010 Hotelling et al.
7,656,393 B2 2/2010 King et al.
7,663,607 B2 2/2010 Hotelling et al.
7,843,471 B2 11/2010 Doan et al.
7,905,815 B2 3/2011 Ellis et al.
8,170,656 B2 5/2012 Tan et al.
8,189,087 B2 5/2012 Misawa et al.
8,196,043 B2 6/2012 Crow et al.
8,290,603 B1 10/2012 Lambourne
8,341,537 B2 12/2012 Ray et al.
8,378,811 B2 2/2013 Crump et al.
8,447,704 B2 5/2013 Tan et al.
8,479,122 B2 7/2013 Hotelling et al.
8,508,472 B1 8/2013 Wieder
8,618,930 B2 12/2013 Papadopoulos et al.
8,624,836 B1 1/2014 Miller et al.
8,634,808 B1 1/2014 Zhong et al.
8,675,084 B2 3/2014 Bolton et al.
8,742,890 B2 6/2014 Gocho
8,762,895 B2 6/2014 Mehta et al.
8,769,554 B2 7/2014 Onda et al.
8,872,760 B2 10/2014 Tsurumi
8,894,462 B2 11/2014 Leyland et al.
8,924,894 B1 12/2014 Yaksick et al.
8,963,806 B1 2/2015 Starner et al.
8,983,539 B1 3/2015 Kim et al.
9,071,945 B1 6/2015 Rubin et al.
9,112,849 B1 8/2015 Werkelin Ahlin et al.
9,146,124 B2 9/2015 Parada et al.
9,171,268 B1 10/2015 Penilla et al.
9,172,866 B2 10/2015 Ito et al.
9,195,219 B2 11/2015 Hong et al.
9,223,296 B2 12/2015 Yang et al.
9,329,831 B1 5/2016 Fullerton et al.
9,369,537 B1 6/2016 Mathew et al.
9,389,694 B2 7/2016 Ataee et al.
D765,118 S 8/2016 Bachman et al.
9,405,766 B2 8/2016 Robbin et al.
9,414,115 B1 8/2016 Mao et al.
9,423,868 B2 8/2016 Iwasaki
9,451,144 B2 9/2016 Dye et al.
9,462,340 B1 10/2016 Mathurin
9,495,575 B2 11/2016 Kim et al.
D773,510 S 12/2016 Foss et al.
9,532,723 B2 1/2017 Kim et al.
9,544,563 B1 1/2017 Chin et al.
9,547,419 B2 1/2017 Yang et al.
9,560,629 B2 1/2017 Migicovsky et al.
9,574,896 B2 2/2017 Mcgavran et al.
9,594,354 B1 3/2017 Kahn et al.
9,628,950 B1 4/2017 Noeth et al.
9,652,741 B2 5/2017 Goldberg et al.
D789,381 S 6/2017 Okumura et al.
9,668,676 B2 6/2017 Culbert
9,704,386 B2 7/2017 Yoon et al.
9,753,543 B2 9/2017 Jeon et al.
9,820,323 B1 11/2017 Young et al.
9,832,697 B2 11/2017 Kotecha et al.
9,892,715 B2 2/2018 Komulainen et al.
9,927,957 B1 3/2018 Sagar et al.
9,939,899 B2 4/2018 Allec et al.
9,942,463 B2 4/2018 Kuo et al.
9,973,674 B2 5/2018 Dye et al.
9,977,566 B2 5/2018 Jitkoff et al.
10,001,817 B2 6/2018 Zambetti et al.
10,019,599 B1 7/2018 Moran et al.
10,135,905 B2 11/2018 Chaudhri et al.
10,182,138 B2 1/2019 Motika et al.
10,216,392 B2 2/2019 Zhao
10,261,595 B1 4/2019 Kin
10,299,300 B1 5/2019 Young
10,310,697 B2 6/2019 Roberts et al.
10,318,034 B1 6/2019 Hauenstein et al.
10,324,590 B2 6/2019 Yang et al.
10,356,070 B2 7/2019 Cha et al.
10,466,881 B2 11/2019 Sasaki et al.
10,524,300 B2 12/2019 Ueda et al.
10,627,914 B2 4/2020 Ang et al.
10,643,246 B1 5/2020 Suprasadachandran Pillai
10,656,720 B1 5/2020 Holz
10,671,174 B2 6/2020 Ang et al.
10,684,693 B2 6/2020 Kletsov et al.
10,691,332 B2 6/2020 Offenberg et al.
10,691,397 B1 * 6/2020 Clements .............. G06F 3/0484
10,721,711 B2 7/2020 Kirov et al.
10,802,598 B2 10/2020 Ang et al.
10,895,979 B1 1/2021 Boyers
10,926,135 B1 2/2021 Mckirdy
10,936,067 B1 3/2021 Chand et al.
10,966,149 B2 3/2021 Yoon et al.
11,048,334 B2 6/2021 Rothberg et al.
11,050,873 B2 6/2021 Kim et al.
11,099,647 B2 8/2021 Ang et al.
11,150,730 B1 10/2021 Anderson et al.
11,331,045 B1 5/2022 Moschella et al.
11,347,320 B1 5/2022 Shin et al.
11,543,887 B2 1/2023 Ang et al.
11,604,510 B2 3/2023 Henderek et al.
11,868,531 B1 1/2024 Tasci
2001/0030597 A1 10/2001 Inoue et al.
2001/0031622 A1 10/2001 Kivela et al.
2002/0024500 A1 2/2002 Howard
2002/0068600 A1 6/2002 Chihara et al.
2002/0140803 A1 10/2002 Gutta et al.
2002/0142734 A1 10/2002 Wickstead
2002/0171737 A1 11/2002 Tullis et al.
2003/0025802 A1 2/2003 Mayer, Jr. et al.
2003/0128237 A1 7/2003 Sakai
2003/0151982 A1 8/2003 Brewer et al.
2003/0158927 A1 8/2003 Sagey et al.
2003/0171984 A1 9/2003 Wodka et al.
2004/0044953 A1 3/2004 Watkins et al.
2004/0100389 A1 5/2004 Naito et al.
2004/0264916 A1 12/2004 Van et al.
2005/0114374 A1 * 5/2005 Juszkiewicz ......... G11B 19/027
2005/0117601 A1 6/2005 Anderson et al.
2005/0134695 A1 6/2005 Deshpande et al.
2005/0198319 A1 9/2005 Chan et al.
2005/0237194 A1 10/2005 Voba et al.
2005/0246642 A1 11/2005 Valderas et al.
2006/0010402 A1 1/2006 Undasan
2006/0079973 A1 4/2006 Bacharach et al.
2006/0107226 A1 5/2006 Matthews et al.
2006/0135064 A1 6/2006 Cho et al.
2006/0197753 A1 9/2006 Hotelling
2006/0217104 A1 9/2006 Cho
2007/0021153 A1 1/2007 Novak
2007/0025711 A1 2/2007 Marcus et al.
2007/0040810 A1 2/2007 Dowe et al.
2007/0096283 A1 5/2007 Ljung et al.
2007/0109417 A1 5/2007 Hyttfors et al.
2007/0143495 A1 6/2007 Porat
2007/0165103 A1 7/2007 Arima et al.
2007/0180392 A1 8/2007 Russo
2007/0191008 A1 8/2007 Bucher et al.

(56) References Cited

U.S. PATENT DOCUMENTS

2007/0236451 A1 10/2007 Ofek et al.
2007/0254640 A1 11/2007 Bliss
2007/0259654 A1 11/2007 Oijer
2008/0004113 A1 1/2008 Avery et al.
2008/0052643 A1 2/2008 Ike et al.
2008/0077673 A1 3/2008 Thomas et al.
2008/0120029 A1 5/2008 Zelek et al.
2008/0122796 A1 5/2008 Jobs et al.
2008/0165136 A1 7/2008 Christie et al.
2008/0214191 A1 9/2008 Yach et al.
2008/0219151 A1 9/2008 Ma et al.
2008/0259829 A1 10/2008 Rosenblatt
2008/0284855 A1 11/2008 Umeyama et al.
2008/0300055 A1 12/2008 Lutnick et al.
2008/0320394 A1 12/2008 Womack
2009/0060170 A1 3/2009 Coughlan et al.
2009/0068984 A1 3/2009 Burnett
2009/0088207 A1 4/2009 Sweeney et al.
2009/0102933 A1 4/2009 Harris et al.
2009/0143114 A1 6/2009 Vargas et al.
2009/0144391 A1 6/2009 Jung et al.
2009/0176532 A1 7/2009 Chae et al.
2009/0195402 A1 8/2009 Izadi et al.
2009/0195497 A1 8/2009 Fitzgerald et al.
2009/0203315 A1 8/2009 Kawabata et al.
2009/0207743 A1 8/2009 Huq et al.
2009/0222748 A1 9/2009 Lejeune et al.
2009/0225060 A1 9/2009 Rizolu et al.
2009/0228868 A1 9/2009 Forstall et al.
2009/0231960 A1 9/2009 Hutcheson
2009/0239587 A1 9/2009 Negron et al.
2009/0251410 A1 10/2009 Mori et al.
2009/0284476 A1 11/2009 Bull et al.
2009/0306487 A1 12/2009 Crowe et al.
2009/0311993 A1 12/2009 Horodezky
2009/0315671 A1 12/2009 Gocho et al.
2009/0318082 A1* 12/2009 Sinton .................. H04W 48/18 455/41.2
2009/0325630 A1 12/2009 Tiltola et al.
2010/0026626 A1 2/2010 Macfarlane
2010/0026640 A1 2/2010 Kim et al.
2010/0054497 A1 3/2010 Bull et al.
2010/0088182 A1 4/2010 Ryder et al.
2010/0125785 A1 5/2010 Moore et al.
2010/0138764 A1 6/2010 Hatambeiki et al.
2010/0149090 A1 6/2010 Morris et al.
2010/0162160 A1 6/2010 Stallings et al.
2010/0169790 A1 7/2010 Vaughan et al.
2010/0178873 A1 7/2010 Lee et al.
2010/0182126 A1 7/2010 Martis et al.
2010/0199232 A1 8/2010 Mistry et al.
2010/0228836 A1 9/2010 Lehtovirta et al.
2010/0284389 A1 11/2010 Ramsay et al.
2010/0287513 A1 11/2010 Singh et al.
2010/0289740 A1 11/2010 Kim et al.
2010/0289772 A1 11/2010 Miller
2010/0289910 A1 11/2010 Kamshilin et al.
2010/0321201 A1 12/2010 Huang et al.
2011/0012772 A1 1/2011 Chuang et al.
2011/0016425 A1 1/2011 Homburg et al.
2011/0029750 A1 2/2011 Jang et al.
2011/0037712 A1 2/2011 Kim et al.
2011/0054360 A1 3/2011 Son et al.
2011/0058052 A1 3/2011 Bolton et al.
2011/0059769 A1 3/2011 Brunolli
2011/0081860 A1 4/2011 Brown et al.
2011/0090407 A1 4/2011 Friedman
2011/0106921 A1 5/2011 Brown et al.
2011/0111735 A1 5/2011 Pietrow
2011/0115932 A1 5/2011 Shin et al.
2011/0130168 A1 6/2011 Vendrow et al.
2011/0138284 A1 6/2011 Wigdor et al.
2011/0148568 A1 6/2011 Lim et al.
2011/0153435 A1 6/2011 Pisaris-henderson
2011/0153628 A1 6/2011 Basu et al.
2011/0157055 A1 6/2011 Tilley et al.
2011/0159469 A1 6/2011 Hwang et al.
2011/0159927 A1 6/2011 Choi
2011/0173204 A1 7/2011 Murillo et al.
2011/0181520 A1 7/2011 Boda et al.
2011/0183613 A1 7/2011 Nocera
2011/0210931 A1 9/2011 Shai
2011/0225492 A1 9/2011 Boettcher et al.
2011/0235926 A1 9/2011 Yokono
2011/0237221 A1 9/2011 Prakash et al.
2011/0252318 A1 10/2011 Helms
2011/0316884 A1 12/2011 Giambalvo et al.
2012/0019400 A1 1/2012 Patel et al.
2012/0044062 A1 2/2012 Jersa et al.
2012/0051560 A1 3/2012 Sanders
2012/0069206 A1 3/2012 Hsieh
2012/0071146 A1 3/2012 Shrivastava et al.
2012/0089300 A1 4/2012 Wolterman et al.
2012/0115608 A1 5/2012 Pfeifer et al.
2012/0120277 A1 5/2012 Tsai et al.
2012/0127070 A1 5/2012 Ryoo et al.
2012/0146899 A1 6/2012 Teng
2012/0188158 A1 7/2012 Tan et al.
2012/0192094 A1 7/2012 Goertz et al.
2012/0197419 A1 8/2012 Dhruv et al.
2012/0198531 A1 8/2012 Ort et al.
2012/0236037 A1 9/2012 Lessing et al.
2012/0266093 A1 10/2012 Park et al.
2012/0287290 A1 11/2012 Jain et al.
2012/0290965 A1 11/2012 Ignor et al.
2012/0306748 A1 12/2012 Fleizach et al.
2012/0316777 A1 12/2012 Kitta et al.
2012/0320141 A1 12/2012 Bowen et al.
2013/0016048 A1 1/2013 So et al.
2013/0016818 A1 1/2013 Cohn
2013/0017846 A1 1/2013 Schoppe
2013/0027341 A1 1/2013 Mastandrea
2013/0038771 A1 2/2013 Brunner et al.
2013/0057472 A1 3/2013 Dizac et al.
2013/0065482 A1 3/2013 Trickett et al.
2013/0076591 A1 3/2013 Sirpal et al.
2013/0085931 A1 4/2013 Runyan
2013/0093904 A1 4/2013 Wagner et al.
2013/0106603 A1 5/2013 Weast et al.
2013/0111550 A1 5/2013 Naveh et al.
2013/0117693 A1 5/2013 Anderson et al.
2013/0125016 A1 5/2013 Pallakoff et al.
2013/0134212 A1 5/2013 Chang et al.
2013/0135203 A1 5/2013 Croughwell, III
2013/0138272 A1 5/2013 Louise-babando et al.
2013/0141325 A1 6/2013 Bailey et al.
2013/0141331 A1 6/2013 Shiu et al.
2013/0141362 A1 6/2013 Asanuma et al.
2013/0143512 A1 6/2013 Hernandez et al.
2013/0145316 A1 6/2013 Heo
2013/0154913 A1 6/2013 Genc et al.
2013/0162411 A1 6/2013 Moses et al.
2013/0166679 A1 6/2013 Kuwahara et al.
2013/0168444 A1 7/2013 Hsieh et al.
2013/0201098 A1 8/2013 Schilit et al.
2013/0219285 A1 8/2013 Iwasaki et al.
2013/0219303 A1 8/2013 Eriksson et al.
2013/0222270 A1 8/2013 Winkler et al.
2013/0223279 A1 8/2013 Tinnakornsrisuphap et al.
2013/0225152 A1 8/2013 Matthews et al.
2013/0234926 A1 9/2013 Rauber
2013/0239046 A1 9/2013 Platzer et al.
2013/0244633 A1 9/2013 Jacobs et al.
2013/0286251 A1 10/2013 Wood et al.
2013/0300651 A1 11/2013 Lim
2013/0314204 A1 11/2013 Ho et al.
2013/0325524 A1 12/2013 Boudville
2013/0329074 A1 12/2013 Zhang et al.
2013/0329924 A1 12/2013 Fleizach et al.
2013/0331130 A1 12/2013 Lee
2013/0339436 A1 12/2013 Gray
2013/0346882 A1 12/2013 Shiplacoff et al.
2014/0006949 A1 1/2014 Briand et al.
2014/0007021 A1 1/2014 Akiyama et al.

(56) References Cited

U.S. PATENT DOCUMENTS

2014/0015546 A1 1/2014 Frederick et al.
2014/0022399 A1 1/2014 Rashid et al.
2014/0028546 A1* 1/2014 Jeon .................... G06F 3/04842 345/156
2014/0031698 A1 1/2014 Moon et al.
2014/0033100 A1 1/2014 Noda et al.
2014/0037107 A1 2/2014 Marino et al.
2014/0040831 A1 2/2014 Akasaka et al.
2014/0057569 A1 2/2014 Toivanen et al.
2014/0068526 A1 3/2014 Figelman et al.
2014/0068755 A1 3/2014 King et al.
2014/0073252 A1 3/2014 Lee et al.
2014/0075003 A1 3/2014 Tanaka et al.
2014/0075311 A1 3/2014 Boettcher et al.
2014/0078318 A1 3/2014 Alameh
2014/0078371 A1 3/2014 Kinoshita
2014/0084857 A1 3/2014 Liu et al.
2014/0095225 A1 4/2014 Williams et al.
2014/0104180 A1 4/2014 Schaffer
2014/0104449 A1 4/2014 Masarik et al.
2014/0118563 A1 5/2014 Mehta et al.
2014/0122331 A1 5/2014 Vaish et al.
2014/0123043 A1 5/2014 Schmidt et al.
2014/0135612 A1 5/2014 Yuen et al.
2014/0139454 A1 5/2014 Mistry et al.
2014/0139637 A1 5/2014 Mistry et al.
2014/0141721 A1 5/2014 Kim et al.
2014/0142851 A1 5/2014 Larmo et al.
2014/0143678 A1 5/2014 Mistry et al.
2014/0143737 A1 5/2014 Mistry et al.
2014/0143784 A1 5/2014 Mistry et al.
2014/0149859 A1 5/2014 Van Dyken et al.
2014/0155705 A1 6/2014 Papadopoulos et al.
2014/0156801 A1 6/2014 Fernandes et al.
2014/0160033 A1 6/2014 Brikman et al.
2014/0160078 A1 6/2014 Seo et al.
2014/0160304 A1 6/2014 Galor et al.
2014/0164544 A1 6/2014 Gagneraud
2014/0164907 A1 6/2014 Jung et al.
2014/0164930 A1 6/2014 Lieb et al.
2014/0167986 A1 6/2014 Parada et al.
2014/0168056 A1 6/2014 Swaminathan et al.
2014/0173455 A1 6/2014 Shimizu et al.
2014/0176298 A1 6/2014 Kumar et al.
2014/0180582 A1 6/2014 Pontarelli et al.
2014/0181654 A1 6/2014 Kumar et al.
2014/0184524 A1 7/2014 Schiefer et al.
2014/0191715 A1 7/2014 Wechlin et al.
2014/0195943 A1 7/2014 Zheng et al.
2014/0204229 A1 7/2014 Leung et al.
2014/0210708 A1 7/2014 Simmons et al.
2014/0218599 A1 8/2014 Nakamura et al.
2014/0228063 A1 8/2014 Harris et al.
2014/0237389 A1 8/2014 Ryall et al.
2014/0240216 A1 8/2014 Bukurak et al.
2014/0240577 A1 8/2014 Masugi
2014/0269614 A1 9/2014 Maguire et al.
2014/0273975 A1 9/2014 Barat et al.
2014/0282068 A1 9/2014 Levkovitz et al.
2014/0282270 A1 9/2014 Slonneger
2014/0293755 A1 10/2014 Geiser et al.
2014/0302834 A1 10/2014 Jones
2014/0310350 A1 10/2014 Borggaard et al.
2014/0310598 A1 10/2014 Sprague et al.
2014/0320387 A1 10/2014 Eriksson et al.
2014/0320434 A1 10/2014 Pantel
2014/0328147 A1 11/2014 Yang et al.
2014/0331314 A1 11/2014 Fujioka
2014/0333602 A1 11/2014 Yang et al.
2014/0337450 A1 11/2014 Choudhary et al.
2014/0337748 A1 11/2014 Lee
2014/0343843 A1 11/2014 Yanku
2014/0344951 A1 11/2014 Brewer
2014/0358707 A1 12/2014 Perkins et al.
2014/0359124 A1 12/2014 Adimatyam et al.
2014/0359481 A1 12/2014 Graham et al.
2014/0359522 A1 12/2014 Kim et al.
2014/0365113 A1 12/2014 Yue et al.
2014/0365979 A1 12/2014 Yoon et al.
2014/0368719 A1 12/2014 Kaneko et al.
2014/0370807 A1 12/2014 Pierce et al.
2014/0375985 A1 12/2014 Deliwala
2014/0380187 A1 12/2014 Gardenfors et al.
2015/0011199 A1 1/2015 Lee et al.
2015/0017956 A1 1/2015 Jeong
2015/0019135 A1 1/2015 Kacyvenski et al.
2015/0019981 A1 1/2015 Petitt et al.
2015/0019982 A1 1/2015 Petitt et al.
2015/0022438 A1 1/2015 Hong
2015/0022674 A1 1/2015 Koss et al.
2015/0026615 A1 1/2015 Choi et al.
2015/0026647 A1 1/2015 Park et al.
2015/0033136 A1 1/2015 Sasaki et al.
2015/0035762 A1 2/2015 Lu
2015/0036853 A1 2/2015 Solum et al.
2015/0046876 A1 2/2015 Goldenberg
2015/0049033 A1 2/2015 Kim et al.
2015/0049233 A1 2/2015 Choi
2015/0061842 A1* 3/2015 Yoon ...................... G04G 21/04 340/12.5
2015/0061972 A1 3/2015 Kang et al.
2015/0065035 A1 3/2015 Son et al.
2015/0067580 A1 3/2015 Um et al.
2015/0084660 A1 3/2015 Knierim et al.
2015/0084860 A1 3/2015 Aleem et al.
2015/0085621 A1 3/2015 Hong et al.
2015/0094031 A1 4/2015 Liu
2015/0094050 A1 4/2015 Bowles et al.
2015/0094093 A1 4/2015 Pierce et al.
2015/0100621 A1 4/2015 Pan
2015/0106221 A1 4/2015 Tapley et al.
2015/0121231 A1 4/2015 Edwardson et al.
2015/0131121 A1 5/2015 Kang
2015/0156803 A1 6/2015 Ballard et al.
2015/0163788 A1 6/2015 Karunakaran
2015/0169171 A1 6/2015 Fotland
2015/0185877 A1 7/2015 Watanabe et al.
2015/0189162 A1 7/2015 Kuo et al.
2015/0193130 A1 7/2015 Cho et al.
2015/0193138 A1 7/2015 Relyea et al.
2015/0194050 A1 7/2015 Lee
2015/0199780 A1 7/2015 Beyk
2015/0205358 A1 7/2015 Lyren
2015/0205511 A1 7/2015 Vinna et al.
2015/0215443 A1* 7/2015 Heo ....................... A61B 5/681 455/556.1
2015/0220149 A1 8/2015 Plagemann et al.
2015/0242065 A1 8/2015 Ko et al.
2015/0242083 A1 8/2015 Rainisto
2015/0243246 A1 8/2015 Mun et al.
2015/0248235 A1 9/2015 Offenberg et al.
2015/0261310 A1 9/2015 Walmsley et al.
2015/0261410 A1 9/2015 Kumar et al.
2015/0261493 A1 9/2015 Lemmon et al.
2015/0264202 A1 9/2015 Pawlowski
2015/0268821 A1 9/2015 Ramsby et al.
2015/0286295 A1 10/2015 Pepe
2015/0287403 A1 10/2015 Holzer Zaslansky et al.
2015/0297185 A1 10/2015 Mccormack et al.
2015/0312617 A1 10/2015 Chen et al.
2015/0324057 A1 11/2015 Chaji et al.
2015/0332031 A1 11/2015 Mistry et al.
2015/0339261 A1 11/2015 Jha et al.
2015/0346834 A1 12/2015 Martinez Fernandez et al.
2015/0350029 A1 12/2015 Skrobotov
2015/0358043 A1 12/2015 Jeong et al.
2015/0370333 A1 12/2015 Ataee et al.
2015/0373172 A1 12/2015 Boesen
2016/0004408 A1 1/2016 Yun
2016/0011724 A1 1/2016 Wheeler et al.
2016/0014266 A1 1/2016 Bhatt
2016/0018846 A1 1/2016 Zenoff
2016/0018900 A1 1/2016 Tu et al.
2016/0021168 A1 1/2016 Chaudhri et al.

(56) References Cited

U.S. PATENT DOCUMENTS

2016/0026425 A1 1/2016 Lee et al.
2016/0028869 A1 1/2016 Bhatt
2016/0029899 A1 2/2016 Kim et al.
2016/0034742 A1 2/2016 Kim et al.
2016/0041580 A1 2/2016 Inoue et al.
2016/0041680 A1 2/2016 Chi et al.
2016/0043905 A1 2/2016 Fiedler
2016/0048215 A1 2/2016 Shin et al.
2016/0048369 A1 2/2016 Zenoff
2016/0048370 A1 2/2016 Zenoff
2016/0050476 A1 2/2016 Patil
2016/0054710 A1 2/2016 Jo et al.
2016/0061613 A1 3/2016 Jung et al.
2016/0062567 A1 3/2016 Yang et al.
2016/0062572 A1 3/2016 Yang et al.
2016/0062582 A1 3/2016 Wilson et al.
2016/0062606 A1 3/2016 Vega et al.
2016/0062719 A1 3/2016 Romano et al.
2016/0085266 A1 3/2016 Lee et al.
2016/0091980 A1 3/2016 Baranski et al.
2016/0092053 A1 3/2016 Loganathan et al.
2016/0094698 A1 3/2016 Lee et al.
2016/0098137 A1 4/2016 Kim et al.
2016/0116941 A1 4/2016 Kuwabara et al.
2016/0124514 A1 5/2016 Cha et al.
2016/0134737 A1 5/2016 Pulletikurty
2016/0142763 A1 5/2016 Kim et al.
2016/0143079 A1* 5/2016 Yoon .................... H04W 8/005 455/41.1
2016/0156597 A1 6/2016 Meng et al.
2016/0156957 A1 6/2016 Yun
2016/0165037 A1 6/2016 Youn et al.
2016/0191511 A1 6/2016 Tijerina et al.
2016/0195864 A1 7/2016 Kim
2016/0196692 A1 7/2016 Kjallstrom et al.
2016/0202866 A1 7/2016 Zambetti
2016/0202873 A1* 7/2016 Chi ........................ G06F 3/005 345/173
2016/0209939 A1 7/2016 Zambetti et al.
2016/0246566 A1 8/2016 Fullerton et al.
2016/0248899 A1 8/2016 Lee et al.
2016/0259489 A1 9/2016 Yang
2016/0260414 A1 9/2016 Yang
2016/0269176 A1 9/2016 Pang et al.
2016/0283194 A1 9/2016 Patil et al.
2016/0291768 A1 10/2016 Cho et al.
2016/0296142 A1 10/2016 Culbert
2016/0313798 A1 10/2016 Connor
2016/0313875 A1 10/2016 Williams et al.
2016/0327911 A1 11/2016 Eim et al.
2016/0328108 A1 11/2016 Li
2016/0337206 A1 11/2016 Bugenhagen et al.
2016/0345039 A1 11/2016 Billmeyer
2016/0357507 A1 12/2016 Decker et al.
2017/0006210 A1 1/2017 Dye et al.
2017/0011210 A1 1/2017 Cheong et al.
2017/0031453 A1 2/2017 Presura
2017/0031648 A1 2/2017 So et al.
2017/0034253 A1 2/2017 Jiang et al.
2017/0046872 A1 2/2017 Geselowitz et al.
2017/0053542 A1 2/2017 Wilson et al.
2017/0065184 A1 3/2017 Barak
2017/0068507 A1* 3/2017 Kim ....................... G06F 3/165
2017/0083188 A1 3/2017 Yang et al.
2017/0090555 A1* 3/2017 Nekozuka ........... G06F 3/04842
2017/0090567 A1 3/2017 Allec et al.
2017/0123487 A1 5/2017 Hazra et al.
2017/0134553 A1 5/2017 Jeon et al.
2017/0134872 A1 5/2017 Silva et al.
2017/0149795 A1 5/2017 Day
2017/0156110 A1 6/2017 Ueno et al.
2017/0160098 A1 6/2017 Mcgavran et al.
2017/0160819 A1 6/2017 Yi et al.
2017/0180843 A1 6/2017 Perianu et al.
2017/0185373 A1 6/2017 Kim et al.
2017/0192743 A1 7/2017 Chun et al.
2017/0195772 A1 7/2017 Han et al.
2017/0205854 A1 7/2017 Zenoff
2017/0205878 A1 7/2017 Hoste et al.
2017/0212590 A1 7/2017 Vanblon et al.
2017/0220224 A1 8/2017 Kodali et al.
2017/0230236 A1 8/2017 Kim et al.
2017/0308227 A1 10/2017 Park
2017/0308292 A1 10/2017 Choi
2017/0322711 A1 11/2017 Robinson et al.
2017/0322713 A1 11/2017 Hwang et al.
2017/0331901 A1 11/2017 Sarlandie De La Robertie et al.
2017/0357426 A1 12/2017 Wilson et al.
2017/0357477 A1 12/2017 Im et al.
2018/0004287 A1 1/2018 Yoo et al.
2018/0013815 A1 1/2018 Gold
2018/0036469 A1 2/2018 Crnkovich et al.
2018/0046788 A1 2/2018 Ohtani et al.
2018/0059894 A1 3/2018 Kim
2018/0062691 A1 3/2018 Barnett, Jr.
2018/0067712 A1 3/2018 Behzadi et al.
2018/0069957 A1 3/2018 Mushikabe et al.
2018/0081453 A1 3/2018 Ely
2018/0101235 A1 4/2018 Bodensteiner et al.
2018/0121036 A1 5/2018 Moore et al.
2018/0137266 A1 5/2018 Kim et al.
2018/0153430 A1 6/2018 Ang et al.
2018/0181261 A1 6/2018 Saurabh
2018/0199137 A1 7/2018 Mate et al.
2018/0218636 A1 8/2018 Alaouf et al.
2018/0253151 A1 9/2018 Kletsov et al.
2018/0259915 A1 9/2018 Hosoi et al.
2018/0262677 A1 9/2018 Dye et al.
2018/0267773 A1 9/2018 Kim et al.
2018/0288560 A1 10/2018 Naik et al.
2018/0294844 A1 10/2018 Choi et al.
2018/0307303 A1 10/2018 Powderly et al.
2018/0321842 A1 11/2018 Lee et al.
2018/0329585 A1 11/2018 Carrigan et al.
2018/0329586 A1 11/2018 Sundstrom et al.
2018/0335903 A1 11/2018 Coffman et al.
2018/0341448 A1 11/2018 Behzadi et al.
2018/0352435 A1 12/2018 Donley et al.
2019/0011703 A1 1/2019 Robaina et al.
2019/0018506 A1 1/2019 Bernstein et al.
2019/0028865 A1 1/2019 Raleigh et al.
2019/0033964 A1 1/2019 Kulkarni et al.
2019/0037004 A1 1/2019 Chaudhri et al.
2019/0113889 A1 4/2019 Kumar et al.
2019/0121300 A1 4/2019 Peterson et al.
2019/0121522 A1 4/2019 Davis et al.
2019/0129661 A1 5/2019 Hirota et al.
2019/0138696 A1 5/2019 Carpenter et al.
2019/0146219 A1 5/2019 Rodriguez, II
2019/0146422 A1 5/2019 Meyer et al.
2019/0179423 A1 6/2019 Rose et al.
2019/0182749 A1 6/2019 Breaux et al.
2019/0187861 A1 6/2019 Yang
2019/0191208 A1 6/2019 Coenen et al.
2019/0196600 A1 6/2019 Rothberg et al.
2019/0220040 A1 7/2019 Wu et al.
2019/0238675 A1 8/2019 Soni et al.
2019/0265849 A1 8/2019 Yang et al.
2019/0268771 A1 8/2019 Seo et al.
2019/0281547 A1 9/2019 Yoon et al.
2019/0297439 A1 9/2019 Maeda
2019/0306607 A1 10/2019 Clayton et al.
2019/0317608 A1 10/2019 Ono et al.
2019/0340348 A1 11/2019 Yu et al.
2019/0347181 A1 11/2019 Cranfill et al.
2019/0349469 A1 11/2019 Skogen et al.
2019/0357787 A1 11/2019 Barachant et al.
2019/0370094 A1 12/2019 Louch et al.
2019/0372862 A1 12/2019 Carrigan et al.
2020/0042087 A1 2/2020 Ang et al.
2020/0042088 A1 2/2020 Ang et al.
2020/0042089 A1 2/2020 Ang et al.
2020/0042094 A1 2/2020 Ang et al.
2020/0042095 A1 2/2020 Ang et al.

(56) References Cited

U.S. PATENT DOCUMENTS

2020/0042145 A1 2/2020 Williams et al.
2020/0042311 A1 2/2020 Shin
2020/0067245 A1 2/2020 Maley
2020/0073481 A1 3/2020 Mizunuma et al.
2020/0073483 A1 3/2020 Berenzweig et al.
2020/0097081 A1 3/2020 Stone et al.
2020/0097082 A1 3/2020 Berenzweig et al.
2020/0111260 A1 4/2020 Osborn et al.
2020/0125165 A1 4/2020 Pace et al.
2020/0150772 A1 5/2020 Quinn et al.
2020/0159340 A1 5/2020 Bernstein et al.
2020/0159374 A1 5/2020 Yang et al.
2020/0174734 A1 6/2020 Gomes et al.
2020/0213437 A1 7/2020 Bhatt
2020/0228646 A1 7/2020 Hotes et al.
2020/0249752 A1 8/2020 Parshionikar
2020/0264764 A1 8/2020 Seymour et al.
2020/0285379 A1 9/2020 George-svahn
2020/0301509 A1 9/2020 Liu et al.
2020/0304917 A1 9/2020 Ryu
2020/0310540 A1 10/2020 Hussami et al.
2020/0310541 A1 10/2020 Reisman et al.
2020/0342144 A1 10/2020 Alameh et al.
2020/0356252 A1 11/2020 Ko et al.
2020/0356687 A1 11/2020 Salzman et al.
2020/0359204 A1 11/2020 Hawkins et al.
2020/0379712 A1 12/2020 Carrigan
2020/0379713 A1 12/2020 Carrigan
2020/0379716 A1 12/2020 Carrigan et al.
2020/0401292 A1 12/2020 Lorenz et al.
2021/0064132 A1 3/2021 Rubin et al.
2021/0076091 A1 3/2021 Shohara
2021/0103338 A1 4/2021 Ang et al.
2021/0124417 A1* 4/2021 Ma .......................... G06F 3/015
2021/0216654 A1 7/2021 Ko et al.
2021/0232225 A1 7/2021 Cipoletta et al.
2021/0255750 A1 8/2021 Al et al.
2021/0263702 A1 8/2021 Carrigan
2021/0349552 A1 11/2021 Bernstein et al.
2021/0373718 A1 12/2021 Yang et al.
2021/0405760 A1 12/2021 Schoen
2021/0407507 A1 12/2021 Zhou et al.
2022/0019284 A1 1/2022 Kaifosh et al.
2022/0043626 A1 2/2022 Carrigan
2022/0044309 A1 2/2022 Jose
2022/0050425 A1 2/2022 Connor
2022/0083183 A1 3/2022 Patton
2022/0101719 A1 3/2022 Bojic et al.
2022/0121344 A1 4/2022 Pastrana Vicente et al.
2022/0129068 A1 4/2022 Anderson et al.
2022/0156353 A1 5/2022 Duffy et al.
2022/0179497 A1 6/2022 Jung et al.
2022/0215375 A1* 7/2022 Gupta ................... G07F 19/206
2022/0240408 A1 7/2022 Faulkner et al.
2022/0244782 A1 8/2022 Robert et al.
2022/0253146 A1 8/2022 Erivantcev et al.
2022/0276780 A1 9/2022 Ko et al.
2022/0291753 A1 9/2022 Erivantcev et al.
2022/0326779 A1 10/2022 Chung et al.
2022/0374085 A1 11/2022 Nguyen et al.
2022/0417317 A1* 12/2022 Jaygarl ................. H04L 67/025
2023/0024627 A1 1/2023 Bernstein et al.
2023/0052490 A1 2/2023 Chaudhri et al.
2023/0072423 A1 3/2023 Osborn et al.
2023/0074476 A1 3/2023 Bae et al.
2023/0090410 A1 3/2023 Sharma et al.
2023/0113991 A1 4/2023 Ang et al.
2023/0131489 A1 4/2023 Marzorati et al.
2023/0177870 A1 6/2023 Chao et al.
2023/0179700 A1 6/2023 Bhatt
2023/0195237 A1 6/2023 Nguyen et al.
2023/0214089 A1 7/2023 Yang et al.
2023/0252737 A1 8/2023 Dreyer et al.
2023/0259207 A1 8/2023 Lam et al.
2023/0270363 A1 8/2023 Qazi et al.
2023/0325002 A1* 10/2023 Bicking .................. G06F 3/167
715/863
2023/0335139 A1 10/2023 Breton et al.
2023/0353862 A1 11/2023 Yi et al.
2023/0376193 A1 11/2023 Han et al.
2023/0376268 A1 11/2023 Carrigan et al.
2024/0061513 A1 2/2024 Reisman et al.
2024/0085992 A1 3/2024 Bernstein et al.
2024/0094819 A1 3/2024 Nie et al.
2024/0220009 A1 7/2024 Dryer et al.
2024/0310982 A1 9/2024 Chaudhri et al.
2024/0370093 A1 11/2024 Nie et al.
2024/0402901 A1 12/2024 Krivoruchko et al.
2025/0047777 A1 2/2025 Bhatt
2025/0085791 A1 3/2025 Bernstein et al.
2025/0094021 A1 3/2025 Yang et al.
2025/0321646 A1 10/2025 Chao et al.

FOREIGN PATENT DOCUMENTS

CN 1705346 A 12/2005
CN 101243383 A 8/2008
CN 101427574 A 5/2009
CN 101433034 A 5/2009
CN 202309894 U 7/2012
CN 102830795 A 12/2012
CN 102833345 A 12/2012
CN 103415084 A 11/2013
CN 103778082 A 5/2014
CN 103839023 A 6/2014
CN 103914238 A 7/2014
CN 103970208 A 8/2014
CN 104024987 A 9/2014
CN 203930358 U 11/2014
CN 104205785 A 12/2014
CN 104272854 A 1/2015
CN 104281430 A 1/2015
CN 104346297 A 2/2015
CN 104423581 A 3/2015
CN 104956182 A 9/2015
CN 105208511 A 12/2015
CN 105388998 A 3/2016
CN 105574378 A 5/2016
CN 105657465 A 6/2016
CN 105959906 A 9/2016
CN 106060772 A 10/2016
CN 103914238 B 2/2017
CN 106797415 A 5/2017
CN 106851528 A 6/2017
CN 106936929 A 7/2017
CN 107637073 A 1/2018
CN 107683470 A 2/2018
CN 107797657 A 3/2018
CN 107852572 A 3/2018
CN 107949879 A 4/2018
CN 108289239 A 7/2018
CN 108292203 A 7/2018
CN 108958608 A 12/2018
CN 208188782 U 12/2018
CN 109347581 A 2/2019
CN 109461462 A 3/2019
CN 109584879 A 4/2019
CN 109584879 B 7/2021
CN 108958608 B 7/2022
EP 0836074 A2 4/1998
EP 1406176 A1 4/2004
EP 1614992 A1 1/2006
EP 1705883 A1 9/2006
EP 1858238 A2 11/2007
EP 1953663 A1 8/2008
EP 2096413 A1 9/2009
EP 2290583 A1 3/2011
EP 2306692 A1 3/2011
EP 2367098 A2 9/2011
EP 2428947 A2 3/2012
EP 2466260 A1 6/2012
EP 2523439 A1 12/2012
EP 2565765 A1 3/2013
EP 2629483 A1 8/2013

(56) References Cited

FOREIGN PATENT DOCUMENTS

| | | | |
|---|---|---|---|
| EP | 2632131 | A1 | 8/2013 |
| EP | 1614992 | B1 | 10/2013 |
| EP | 2698686 | A2 | 2/2014 |
| EP | 2703972 | A1 | 3/2014 |
| EP | 2720442 | A1 | 4/2014 |
| EP | 2813921 | A1 | 12/2014 |
| EP | 2892240 | A1 | 7/2015 |
| EP | 2980715 | A1 | 2/2016 |
| EP | 2999208 | A1 | 3/2016 |
| EP | 3001282 | A1 | 3/2016 |
| EP | 3032537 | A2 | 6/2016 |
| EP | 3057342 | A1 | 8/2016 |
| EP | 3073703 | A1 | 9/2016 |
| EP | 3125097 | A2 | 2/2017 |
| EP | 3276905 | A1 | 1/2018 |
| EP | 3379853 | A1 | 9/2018 |
| GB | 0412212 | | 7/2004 |
| GB | 2402105 | A | 12/2004 |
| JP | 11-183183 | A | 7/1999 |
| JP | 2000-163031 | A | 6/2000 |
| JP | 2000-227832 | A | 8/2000 |
| JP | 2001-216069 | A | 8/2001 |
| JP | 2001-309455 | A | 11/2001 |
| JP | 2002-33795 | A | 1/2002 |
| JP | 2002-342033 | A | 11/2002 |
| JP | 2006-209563 | A | 8/2006 |
| JP | 2009-502048 | A | 1/2009 |
| JP | 2011-217000 | A | 10/2011 |
| JP | 2013-146557 | A | 8/2013 |
| JP | 2014-53692 | A | 3/2014 |
| JP | 2014-123169 | A | 7/2014 |
| JP | 2014-128032 | A | 7/2014 |
| JP | 2014-143575 | A | 8/2014 |
| JP | 2015-61318 | A | 3/2015 |
| JP | 2016-13151 | A | 1/2016 |
| JP | 2017-34563 | A | 2/2017 |
| JP | 2017-510912 | A | 4/2017 |
| JP | 2017-143357 | A | 8/2017 |
| JP | 2018-113544 | A | 7/2018 |
| JP | 2018-147265 | A | 9/2018 |
| JP | 2018-536933 | A | 12/2018 |
| KR | 10-2016-0000330 | A | 1/2016 |
| KR | 10-2016-0092363 | A | 8/2016 |
| KR | 10-2017-0027435 | A | 3/2017 |
| KR | 10-2017-0032471 | A | 3/2017 |
| KR | 10-2017-0082022 | A | 7/2017 |
| KR | 10-2017-0124954 | A | 11/2017 |
| KR | 10-2019-0020850 | A | 3/2019 |
| KR | 10-2019-0022883 | A | 3/2019 |
| TV | 201215086 | A | 4/2012 |
| TW | 201012152 | A | 3/2010 |
| TW | M474482 | U | 3/2014 |
| TW | 201509168 | A | 3/2015 |
| WO | 2007/008321 | A2 | 1/2007 |
| WO | 2007/105937 | A1 | 9/2007 |
| WO | 2007/142703 | A1 | 12/2007 |
| WO | 2007/149731 | A1 | 12/2007 |
| WO | 2009/137419 | A2 | 11/2009 |
| WO | 2009/140095 | A2 | 11/2009 |
| WO | 2011/063516 | A1 | 6/2011 |
| WO | 2012/138663 | A2 | 10/2012 |
| WO | 2012/172970 | A1 | 12/2012 |
| WO | 2013/169849 | A2 | 11/2013 |
| WO | 2013/169875 | A2 | 11/2013 |
| WO | 2014/113987 | A1 | 7/2014 |
| WO | 2014/117125 | A1 | 7/2014 |
| WO | 2014/171734 | A2 | 10/2014 |
| WO | 2015/060856 | A1 | 4/2015 |
| WO | 2015/061831 | A1 | 5/2015 |
| WO | 2015/065402 | A1 | 5/2015 |
| WO | 2015/119637 | A1 | 8/2015 |
| WO | 2015/121100 | A1 | 8/2015 |
| WO | 2015/185123 | A1 | 12/2015 |
| WO | 2016/022203 | A1 | 2/2016 |
| WO | 2016/022205 | A1 | 2/2016 |
| WO | 2016/036472 | A1 | 3/2016 |
| WO | 2016/036541 | A2 | 3/2016 |
| WO | 2016/053459 | A1 | 4/2016 |
| WO | 2016/200603 | A1 | 12/2016 |
| WO | 2016/204186 | A1 | 12/2016 |
| WO | 2017/062621 | A1 | 4/2017 |
| WO | 2017/112003 | A1 | 6/2017 |
| WO | 2018/032085 | A1 | 2/2018 |
| WO | 2018/048510 | A1 | 3/2018 |
| WO | 2018/084802 | A1 | 5/2018 |
| WO | 2018/098136 | A1 | 5/2018 |
| WO | 2018/131251 | A1 | 7/2018 |
| WO | 2019/173136 | A1 | 9/2019 |
| WO | 2019/200350 | A1 | 10/2019 |
| WO | 2019/217086 | A2 | 11/2019 |
| WO | 2020/063762 | A1 | 4/2020 |
| WO | 2021/006903 | A1 | 1/2021 |
| WO | 2023/230354 | A1 | 11/2023 |

OTHER PUBLICATIONS

Corrected Notice of Allowance received for U.S. Appl. No. 17/747,613, mailed on Sep. 22, 2025, 4 pages.

Decision to Grant received for European Patent Application No. 24211972.5, mailed on Jul. 31, 2025, 2 pages.

Final Office Action received for U.S. Appl. No. 18/499,970, mailed on Aug. 5, 2025, 10 pages.

International Preliminary Report on Patentability received for PCT Patent Application No. PCT/US2024/020743, mailed on Jul. 29, 2025, 15 pages.

Notice of Allowance received for U.S. Appl. No. 18/441,971, mailed on Aug. 5, 2025, 11 pages.

Office Action received for Japanese Patent Application No. 2024-147808, mailed on Aug. 1, 2025, 10 pages (5 pages of English Translation and 5 pages of Official Copy).

Apple Support, "How to use AssistiveTouch on Apple Watch", Online available at: https://www.youtube.com/watch?v=869--vlUlv4&t=80s, May 18, 2023, 3 pages.

Applicant-Initiated Interview Summary received for U.S. Appl. No. 18/102,036, mailed on Nov. 4, 2025, 4 pages.

Corrected Notice of Allowance received for U.S. Appl. No. 18/228,597, mailed on Nov. 5, 2025, 2 pages.

International Search Report and Written Opinion received for PCT Patent Application No. PCT/US2025/024587, mailed on Sep. 19, 2025, 19 pages.

Invitation to Pay Additional Fees and Partial International Search Report received for PCT Patent Application No. PCT/US2025/024587, mailed on Jul. 29, 2025, 12 pages.

Restriction Requirement received for U.S. Appl. No. 18/242,694, mailed on Oct. 27, 2025, 6 pages.

3C Blogger Kisplay Share, Samsung Galaxy Tab S Hands-on SideSync 3.0 Is Amazing, http://www.samsung.com/tw/article/galaxy-tab-s-blogger-kisplay., Jul. 4, 2014, 4 pages. (Official Copy Only) {(See Communication Under Rule 37 CFR § 1.98(a) (3)}.

Accessibility by design: An Apple Watch for everyone, Available Online at: https://developer.apple.com/videos/play/wwdc2021/10308/, Jun. 10, 2021, 2 pages.

Advisory Action received for U.S. Appl. No. 14/863,099, mailed on Sep. 8, 2016, 3 pages.

Advisory Action received for U.S. Appl. No. 17/747,613, mailed on Feb. 14, 2024, 3 pages.

Apple Previews Powerful Software Updates Designed for People with Disabilities, Available online at: https://www.apple.com/newsroom/2021/05/apple-previews-powerful-software-updates-designed-for-people-with-disabilities/, May 19, 2021, 10 pages.

Applicant Initiated Interview Summary received for U.S. Appl. No. 14/973,573, mailed on Jul. 10, 2017, 3 pages.

Applicant Initiated Interview Summary received for U.S. Appl. No. 16/583,994, mailed on Apr. 3, 2020, 5 pages.

Applicant Initiated Interview Summary received for U.S. Appl. No. 17/188,228, mailed on Jun. 14, 2022, 9 pages.

Applicant Initiated Interview Summary received for U.S. Appl. No. 17/746,807, mailed on Jun. 9, 2023, 2 pages.

Applicant Initiated Interview Summary received for U.S. Appl. No.

(56) References Cited

OTHER PUBLICATIONS

17/746,807, mailed on Mar. 31, 2023, 2 pages.
Applicant-Initiated Interview Summary received for U.S. Appl. No. 16/144,264, mailed on Jul. 22, 2020, 5 pages.
Applicant-Initiated Interview Summary received for U.S. Appl. No. 16/147,523, mailed on Apr. 27, 2020, 3 pages.
Applicant-Initiated Interview Summary received for U.S. Appl. No. 16/147,523, mailed on Dec. 10, 2021, 4 pages.
Applicant-Initiated Interview Summary received for U.S. Appl. No. 16/147,523, mailed on Jun. 13, 2022, 4 pages.
Applicant-Initiated Interview Summary received for U.S. Appl. No. 16/147,523, mailed on Oct. 26, 2020, 3 pages.
Applicant-Initiated Interview Summary received for U.S. Appl. No. 16/147,523, mailed on Sep. 14, 2021, 3 pages.
Applicant-Initiated Interview Summary received for U.S. Appl. No. 16/281,838, mailed on Jun. 2, 2020, 5 pages.
Applicant-Initiated Interview Summary received for U.S. Appl. No. 16/583,981, mailed on Mar. 9, 2020, 5 pages.
Applicant-Initiated Interview Summary received for U.S. Appl. No. 16/583,981, mailed on Sep. 14, 2020, 6 pages.
Applicant-Initiated Interview Summary received for U.S. Appl. No. 16/583,994, mailed on May 28, 2021, 5 pages.
Applicant-Initiated Interview Summary received for U.S. Appl. No. 16/583,994, mailed on Nov. 24, 2020, 4 pages.
Applicant-Initiated Interview Summary received for U.S. Appl. No. 16/653,857, mailed on Dec. 14, 2020, 3 pages.
Applicant-Initiated Interview Summary received for U.S. Appl. No. 16/653,857, mailed on May 3, 2021, 4 pages.
Applicant-Initiated Interview Summary received for U.S. Appl. No. 16/679,967, mailed on Feb. 10, 2022, 2 pages.
Applicant-Initiated Interview Summary received for U.S. Appl. No. 16/679,967, mailed on Jun. 1, 2022, 2 pages.
Applicant-Initiated Interview Summary received for U.S. Appl. No. 16/679,967, mailed on Oct. 25, 2021, 2 pages.
Applicant-Initiated Interview Summary received for U.S. Appl. No. 16/723,583, mailed on Dec. 28, 2020, 6 pages.
Applicant-Initiated Interview Summary received for U.S. Appl. No. 16/749,929, mailed on Oct. 13, 2020, 4 pages.
Applicant-Initiated Interview Summary received for U.S. Appl. No. 16/773,536, mailed on Mar. 26, 2021, 4 pages.
Applicant-Initiated Interview Summary received for U.S. Appl. No. 17/041,350, mailed on Aug. 18, 2021, 2 pages.
Applicant-Initiated Interview Summary received for U.S. Appl. No. 17/041,350, mailed on Feb. 2, 2022, 2 pages.
Applicant-Initiated Interview Summary received for U.S. Appl. No. 17/188,228, mailed on Sep. 23, 2022, 2 pages.
Applicant-Initiated Interview Summary received for U.S. Appl. No. 17/314,948, mailed on Oct. 21, 2022, 6 pages.
Applicant-Initiated Interview Summary received for U.S. Appl. No. 17/410,169, mailed on Apr. 25, 2023, 6 pages.
Applicant-Initiated Interview Summary received for U.S. Appl. No. 17/410,169, mailed on Jan. 26, 2024, 5 pages.
Applicant-Initiated Interview Summary received for U.S. Appl. No. 17/410,169, mailed on Nov. 7, 2022, 5 pages.
Applicant-Initiated Interview Summary received for U.S. Appl. No. 17/509,356, mailed on Feb. 3, 2023, 3 pages.
Applicant-Initiated Interview Summary received for U.S. Appl. No. 17/746,807, mailed on Nov. 3, 2023, 2 pages.
Applicant-Initiated Interview Summary received for U.S. Appl. No. 17/747,613, mailed on Dec. 14, 2023, 2 pages.
Applicant-Initiated Interview Summary received for U.S. Appl. No. 17/747,613, mailed on Jan. 31, 2024, 3 pages.
Applicant-Initiated Interview Summary received for U.S. Appl. No. 17/975,141, mailed on Aug. 30, 2023, 4 pages.
Applicant-Initiated Interview Summary received for U.S. Appl. No. 18/088,309, mailed on Feb. 28, 2024, 2 pages.
Applicant-Initiated Interview Summary received for U.S. Appl. No. 18/088,309, mailed on Oct. 27, 2023, 2 pages.
Applicant-Initiated Interview Summary received for U.S. Appl. No. 18/109,808, mailed on Jan. 23, 2024, 5 pages.
Applicant-Initiated Interview Summary received for U.S. Appl. No. 18/109,808, mailed on Nov. 22, 2023, 5 pages.
Applicant-Initiated Interview Summary received for U.S. Appl. No. 18/109,808, mailed on Sep. 25, 2023, 5 pages.
Applicant-Initiated Interview Summary received for U.S. Appl. No. 18/122,625, mailed on Jan. 19, 2024, 2 pages.
Applicant-Initiated Interview Summary received for U.S. Appl. No. 18/197,681, mailed on Mar. 18, 2024, 4 pages.
Axiang's Network Notebook, Deep Analysis on Samsung's 2013 New Flagship: tell you what kind of mobile phone Galaxy S4 is! available at: https://axiang.cc/archive/6115, Apr. 22, 2024, 4 pages. (Official Copy Only) {(See Communication Under Rule 37 CFR § 1.98(a) (3)}.
Baar Marius, "Fitbit Ace—Unboxing, Setup and 24-Hour Test", YouTube [online] [video], Retrieved from: <https://youtu.be/ekvkfqOyrls>. See especially 4:44., Oct. 24, 2018, 3 pages.
Brief Communication regarding Oral Proceedings received for European Patent Application No. 16708003.5, mailed on May 8, 2023, 1 page.
Brief Communication regarding Oral Proceedings received for European Patent Application No. 17184710.6, mailed on Feb. 19, 2020, 2 pages.
Brief Communication regarding Oral Proceedings received for European Patent Application No. 17184710.6, mailed on Mar. 9, 2020, 2 pages.
Brief Communication regarding Oral Proceedings received for European Patent Application No. 20192404.0, mailed on May 4, 2022, 3 pages.
Brief Communication regarding Oral Proceedings received for European Patent Application No. 20192404.0, mailed on May 18, 2022, 1 page.
Brief Communication regarding Oral Proceedings received for European Patent Application No. 22729964.1, mailed on Mar. 21, 2024, 1 page.
Chenzai,"Apple, please don't screw up notifications on the Apple Watch", Available online at:—https://digi.tech.qq.com/a/20140918/060747.htm, also published on the English webpage https://www.theverge.com/2014/9/9/6127913/apple-please-dont-screw-up-notifications-on-the-apple-watch, Sep. 18, 2014, 8 pages (4 pages of English Translation and 4 pages of Official Copy).
Communication for Board of Appeal received for European Patent Application No. 17184710.6, mailed on Feb. 29, 2024, 13 pages.
Corrected Notice of Allowance received for U.S. Appl. No. 14/641,251, mailed on Jun. 17, 2016, 2 pages.
Corrected Notice of Allowance received for U.S. Appl. No. 14/839,897, mailed on Jan. 23, 2019, 6 pages.
Corrected Notice of Allowance received for U.S. Appl. No. 14/839,903, mailed on Feb. 13, 2019, 2 pages.
Corrected Notice of Allowance received for U.S. Appl. No. 14/839,903, mailed on Mar. 1, 2019, 2 pages.
Corrected Notice of Allowance received for U.S. Appl. No. 15/268,115, mailed on Apr. 13, 2018, 11 pages.
Corrected Notice of Allowance received for U.S. Appl. No. 15/268,115, mailed on Mar. 21, 2018, 9 pages.
Corrected Notice of Allowance received for U.S. Appl. No. 16/281,838, mailed on Oct. 30, 2020, 2 pages.
Corrected Notice of Allowance received for U.S. Appl. No. 16/583,981, mailed on Apr. 6, 2021, 3 pages.
Corrected Notice of Allowance received for U.S. Appl. No. 16/583,981, mailed on May 17, 2021, 3 pages.
Corrected Notice of Allowance received for U.S. Appl. No. 16/583,994, mailed on Jul. 6, 2021, 3 pages.
Corrected Notice of Allowance received for U.S. Appl. No. 17/041,350, mailed on Apr. 4, 2022, 3 pages.
Corrected Notice of Allowance received for U.S. Appl. No. 17/041,350, mailed on Mar. 15, 2022, 3 pages.
Corrected Notice of Allowance received for U.S. Appl. No. 17/509,356, mailed on Jun. 13, 2023 , 2 pages.
Corrected Notice of Allowance received for U.S. Appl. No. 17/509,356, mailed on May 24, 2023, 2 pages.
Corrected Notice of Allowance received for U.S. Appl. No. 17/950,943, mailed on Jul. 10, 2023, 2 pages.

(56) References Cited

OTHER PUBLICATIONS

Decision on Appeal received for U.S. Appl. No. 14/774,664, mailed on Sep. 12, 2019, 8 pages.
Decision on Appeal received for U.S. Appl. No. 14/863,099, mailed on Aug. 22, 2019, 9 pages.
Decision to Grant received for Danish Patent Aplication No. PA201570664, mailed on Feb. 20, 2017., 2 pages.
Decision to grant received for Danish Patent Aplication No. PA201570788, mailed on Jul. 10, 2017, 2 pages.
Decision to Grant received for Danish Patent Aplication No. PA201570791, mailed on Jun. 7, 2017, 2 pages.
Decision to Grant received for Danish Patent Aplication No. PA202070609, mailed on May 3, 2021, 2 pages.
Decision to Grant received for European Patent Aplication No. 15712218.5, mailed on Jun. 7, 2018, 2 pages.
Decision to Grant received for European Patent Aplication No. 15787091.6, mailed on Dec. 3, 2020, 2 pages.
Decision to Grant received for European Patent Aplication No. 16708003.5, mailed on Oct. 19, 2023, 2 pages.
Decision to Grant received for European Patent Aplication No. 19722280.5, mailed on Feb. 1, 2024, 2 pages.
Decision to Grant received for European Patent Aplication No. 20729346.5, mailed on Nov. 16, 2023, 2 pages.
Decision to Refuse received for European Patent Aplication No. 17184710.6, mailed on Jun. 16, 2020, 9 pages.
Decision to Refuse received for European Patent Aplication No. 20192404.0, mailed on Jun. 14, 2022, 15 pages.
Dharmasena Anusha, "iMessage—send as text message Option", YouTube, Available online at: <https://www.youtube.com/watch?v=hXG-MdlW6FA>, Feb. 18, 2013, 1 page.
Eisenstein et al., "Analysis of Clustering Techniques to Detect Hand Signs", Intelligent Multimedia, Video and Speech Processing, of 2001 International Symposium, Piscataway, NJ, USA, IEEE, 2001, 4 pages.
European Search Report received for European Patent Application No. 20192404.0, mailed on Nov. 20, 2020, 4 pages.
Examiner's Answer to Appeal Brief received for U.S. Appl. No. 14/774,664, mailed on May 31, 2018, 28 pages.
Examiner's Answer to Appeal Brief received for U.S. Appl. No. 14/863,099, mailed on Jul. 28, 2017, 31 pages.
Farmboyreef, "Apple watch controlling your tv", Available online at: https://www.youtube.com/watch?v=xaJPG0Wm3Tg, Jun. 23, 2015, 3 pages.
Final Office Action received for U.S. Appl. No. 14/177,664, mailed on Aug. 25, 2017, 23 pages.
Final Office Action received for U.S. Appl. No. 14/839,897, mailed on Jan. 10, 2018, 16 pages.
Final Office Action received for U.S. Appl. No. 14/863,099, mailed on Apr. 21, 2016, 20 pages.
Final Office Action received for U.S. Appl. No. 15/268,115, mailed on Oct. 11, 2017., 48 pages.
Final Office Action received for U.S. Appl. No. 16/147,523, mailed on Aug. 4, 2020, 15 pages.
Final Office Action received for U.S. Appl. No. 16/147,523, mailed on Oct. 14, 2021, 22 pages.
Final Office Action received for U.S. Appl. No. 16/583,981, mailed on Apr. 16, 2020, 19 pages.
Final Office Action received for U.S. Appl. No. 16/583,994, mailed on Jul. 23, 2020, 16 pages.
Final Office Action received for U.S. Appl. No. 16/653,857, mailed on Feb. 10, 2021, 43 pages.
Final Office Action received for U.S. Appl. No. 16/679,967, mailed on Nov. 10, 2021, 14 pages.
Final Office Action received for U.S. Appl. No. 16/723,583, mailed on Feb. 5, 2021, 15 pages.
Final Office Action received for U.S. Appl. No. 17/041,350, mailed on Sep. 17, 2021, 25 pages.
Final Office Action received for U.S. Appl. No. 17/188,228, mailed on Jul. 6, 2022, 13 pages.
Final Office Action received for U.S. Appl. No. 17/314,948, mailed on Mar. 7, 2023, 31 pages.
Final Office Action received for U.S. Appl. No. 17/410,169, mailed on Feb. 6, 2023, 47 pages.
Final Office Action received for U.S. Appl. No. 17/410,169, mailed on Feb. 23, 2024, 49 pages.
Final Office Action received for U.S. Appl. No. 17/746,807, mailed on Apr. 26, 2023, 16 pages.
Final Office Action received for U.S. Appl. No. 17/746,807, mailed on Feb. 20, 2024, 24 pages.
Final Office Action received for U.S. Appl. No. 17/747,613, mailed on Jan. 11, 2024, 28 pages.
Final Office Action received for U.S. Appl. No. 18/088,309, mailed on Jan. 9, 2024, 13 pages.
Final Office Action received for U.S. Appl. No. 18/109,808, mailed on Mar. 5, 2024, 52 pages.
Final Office Action received for U.S. Appl. No. 18/109,808, mailed on Oct. 31, 2023, 54 pages.
Final Office Action received for U.S. Appl. No. 18/122,625, mailed on Apr. 5, 2024, 12 pages.
Final Office Action received for U.S. Appl. No. 14/839,903, mailed on Sep. 18, 2018, 11 pages.
Final Office Action received for U.S. Appl. No. 15/135,328 mailed on Nov. 9, 2018, 55 pages.
Final Office Action received for U.S. Appl. No. 14/616,573 mailed on Mar. 10, 2017, 5 pages.
Franks Tech Help,"DSLR Camera Remote Control on Android Tablet, DSLR Dashboard, Nexus 10, Canon Camera, OTG Host Cable", Available online at: https://www.youtube.com/watch?v=DD4dCVinreU, Dec. 10, 2013, 1 page.
Fuji Film, "Taking Pictures Remotely: Free iPhone/Android App Fuji Film Camera Remote", Available at <http://app.fujifilm-dsc.com/en/camera_remote/guide05.html>, Apr. 22, 2014, 3 pages.
Gil Lory, "How to control Apple TV with your Apple Watch", Available online at: https://www.imore.com/how-control-your-apple-tv-remote-app%ADapple-watch[, Jun. 6, 2016, 24 pages.
GT-I9500(Galaxy S4) User Manual, Samsung, Rev.1.1, http://org.downloadcenter.samsung.com/downloadfile/ContentsFile.aspx?CDSite=UNI_TW&CttFileID=5406113&CDCttType=UM&ModelType=N&ModelName=GTI9500&VPath=UM/201305/20130520173017063/GTI9500_UM_Open_Taiwan_Jellybean_Chi_Rev.1.1_130520.pdf., May 2013, 14 pages. (Official Copy Only) {(See Communication Under Rule 37 CFR § 1.98(a) (3)}.
Han Sangwoo, "AR Glasses interaction prototype", Available Online at: https://sangwoohan.cargo.site/AR-Glasses-interactioin-prototype, Oct. 2020, 4 pages.
Hobbyistsoftwareltd,"VLC Remote", Online available at: https://watchaware.com/watch-apps/297244048, 2016, 7 pages.
Intention to Grant received for Danish Patent Application No. PA201570773, mailed on Mar. 9, 2018, 2 pages.
Intention to Grant received for Danish Patent Application No. PA201570788, mailed on Mar. 27, 2017, 2 pages.
Intention to Grant received for Danish Patent Application No. PA201570791, mailed on Mar. 7, 2017, 2 pages.
Intention to Grant received for Danish Patent Application No. PA202070609, mailed on Jan. 14, 2021, 2 pages.
Intention to Grant received for European Patent Application No. 15712218.5, mailed on Jan. 24, 2018, 7 pages.
Intention to Grant received for European Patent Application No. 15753796.0, mailed on Jan. 12, 2024, 9 pages.
Intention to Grant received for European Patent Application No. 15787091.6, mailed on Apr. 23, 2020, 7 pages.
Intention to Grant received for European Patent Application No. 15787091.6, mailed on Sep. 30, 2020, 7 pages.
Intention to Grant received for European Patent Application No. 16708003.5, mailed on Jun. 14, 2023, 9 pages.
Intention to Grant received for European Patent Application No. 19722280.5, mailed on Sep. 26, 2023, 9 pages.
Intention to Grant received for European Patent Application No. 20729346.5, mailed on Jul. 10, 2023, 9 pages.
International Preliminary Report on Patentability received for PCT Patent Application No. PCT/US2014/027882, mailed on Sep. 24, 2015, 8 pages.

(56) References Cited

OTHER PUBLICATIONS

International Preliminary Report on Patentability received for PCT Patent Application No. PCT/US2015/019298, mailed on Mar. 16, 2017., 12 pages.
International Preliminary Report on Patentability received for PCT Patent Application No. PCT/US2015/041424, mailed on Feb. 2, 2017., 13 Pages.
International Preliminary Report on Patentability received for PCT Patent Application No. PCT/US2015/047507, mailed on Mar. 16, 2017, 16 pages.
International Preliminary Report on Patentability received for PCT Patent Application No. PCT/US2015/055165, mailed on Sep. 21, 2017, 15 pages.
International Preliminary Report on Patentability received for PCT Patent Application No. PCT/US2016/016621, mailed on Aug. 24, 2017, 8 pages.
International Preliminary Report on Patentability received for PCT Patent Application No. PCT/US2018/038823, mailed on Jan. 23, 2020, 20 pages.
International Preliminary Report on Patentability received for PCT Patent Application No. PCT/US2019/024792, mailed on Dec. 17, 2020, 9 pages.
International Preliminary Report on Patentability received for PCT Patent Application No. PCT/US2020/026044, mailed on Dec. 9, 2021, 18 pages.
International Preliminary Report on Patentability received for PCT Patent Application No. PCT/US2020/031536, mailed on Nov. 18, 2021, 11 pages.
International Preliminary Report on Patentability received for PCT Patent Application No. PCT/US2020/035446, mailed on Dec. 9, 2021, 14 pages.
International Preliminary Report on Patentability received for PCT Patent Application No. PCT/US2022/030021, mailed on Nov. 30, 2023, 14 pages.
International Preliminary Report on Patentability received for PCT Patent Application No. PCT/US2022/044236, mailed on Apr. 4, 2024, 12 pages.
International Preliminary Report on Patentability received for PCT Patent Application No. PCT/US2016/048582, mailed on Sep. 13, 2016, 11 pages.
International Search Report and Written Opinion received for PCT Application No. PCT/US2015/047507, mailed on Feb. 22, 2016, 22 pages.
International Search Report and Written Opinion received for PCT Application No. PCT/US2013/032498, mailed on Feb. 10, 2014, 18 pages.
International Search Report and Written Opinion received for PCT Application No. PCT/US2014/027882, mailed on Oct. 10, 2014, 11 pages.
International Search Report and Written Opinion received for PCT Application No. PCT/US2015/019298, mailed on Jul. 13, 2015, 17 pages.
International Search Report and Written Opinion received for PCT Application No. PCT/US2015/041424, mailed on Mar. 31, 2016, 18 pages.
International Search Report and Written Opinion received for PCT Application No. PCT/US2015/055165, mailed on Apr. 20, 2016, 22 pages.
International Search Report and Written Opinion received for PCT Application No. PCT/US2016/016621, mailed on May 9, 2016, 12 pages.
International Search Report and Written Opinion received for PCT Application No. PCT/US2018/038823, mailed on Oct. 23, 2018, 30 pages.
International Search Report and Written Opinion received for PCT Application No. PCT/US2019/024792, mailed on Jul. 18, 2019, 13 pages.
International Search Report and Written Opinion received for PCT Application No. PCT/US2020/026044, mailed on Sep. 9, 2020, 26 pages.
International Search Report and Written Opinion received for PCT Application No. PCT/US2020/031536, mailed on Sep. 23, 2020, 16 pages.
International Search Report and Written Opinion received for PCT Application No. PCT/US2020/035446, mailed on Nov. 10, 2020, 20 pages.
International Search Report and Written Opinion received for PCT Application No. PCT/US2022/030021, mailed on Nov. 9, 2022, 19 pages.
International Search Report and Written Opinion received for PCT Application No. PCT/US2022/044236, mailed on Mar. 27, 2023, 17 pages.
International Search Report and Written Opinion received for PCT Application No. PCT/US2023/012260, mailed on Aug. 2, 2023, 22 pages.
International Search Report and Written Opinion received for PCT Application No. PCT/US2023/022410, mailed on Aug. 31, 2023, 21 pages.
International Search Report and Written Opinion received for PCT Application No. PCT/US2023/032794, mailed on Jan. 8, 2024, 19 pages.
International Search Report and Written Opinion received for PCT Application No. PCT/US2015/042976, mailed on Aug. 18, 2015, 22 pages.
Invitation to Pay Additional Fees and Partial International Search Report received for PCT Patent Application No. PCT/US2022/030021, mailed on Sep. 15, 2022, 13 pages.
Invitation to Pay Additional Fees and Partial International Search Report received for PCT Patent Application No. PCT/US2023/012260, mailed on Jun. 7, 2023, 11 pages.
Invitation to Pay Additional Fees and Partial International Search Report received for PCT Patent Application No. PCT/US2023/032794, mailed on Nov. 9, 2023, 12 pages.
Invitation to Pay Additional Fees received for PCT Patent Application No. PCT/US2014/027882, mailed on Aug. 5, 2014, 2 pages.
Invitation to Pay Additional Fees received for PCT Patent Application No. PCT/US2015/041424, mailed on Nov. 12, 2015, 6 pages.
Invitation to Pay Additional Fees received for PCT Patent Application No. PCT/US2015/047507, mailed on Jan. 4, 2016, 8 pages.
Invitation to Pay Additional Fees received for PCT Patent Application No. PCT/US2015/055165, mailed on Jan. 18, 2016, 6 pages.
Invitation to Pay Additional Fees received for PCT Patent Application No. PCT/US2018/038823, mailed on Sep. 5, 2018, 22 pages.
Invitation to Pay Additional Fees received for PCT Patent Application No. PCT/US2020/026044, mailed on Jun. 25, 2020, 12 pages.
Invitation to Pay Additional Fees received for PCT Patent Application No. PCT/US2020/031536, mailed on Jul. 31, 2020, 9 pages.
Invitation to Pay Additional Fees received for PCT Patent Application No. PCT/US2020/035446, mailed on Sep. 11, 2020, 12 pages.
Invitation to Pay Search Fees received for European Patent Application No. 15753796.0, mailed on Mar. 24, 2020, 3 pages.
Itjungles, "iPhone 6: How to Pair with Another Bluetooth Device", Available Online at: https://www.youtube.com/watch?v=9setanYtHAk, Aug. 5, 2015, 3 pages.
Jean, "Our Pact Parental Control Review", Available online at: https://www.bewebsmart.com/parental-controls/our-pact-parental-control-review/, Jun. 25, 2016, 25 pages.
Klein Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.
Lee et al., "A Multi-Touch Three-Dimensional Touch-Sensitive Tablet", CHI '85 Proceedings of the SIGCHI Conference on Human Factors in Computing Systems, Apr. 1985, pp. 21-25.
Minutes of the Oral Proceedings received for European Patent Application No. 20729346.5, mailed on Jul. 4, 2023, 6 pages.
My Mate Vince, "Setting up the Fitbit Alta HR Activity Tracker on Apple iOS", Online available at:—>https://youtu.be/FdwRF4lfvFc>, Jun. 18, 2017, 3 pages.

(56) References Cited

OTHER PUBLICATIONS

Nikolov Anton, "Design principle: Consistency", Available online at: https://uxdesign.cc/design-principle-consistency-6b0cf7e7339f, Apr. 8, 2017, 9 pages.
Nishiya et al., "Gesture Estimation Using Deep Learning from PPG Signal", Information Processing Society of Japan Kansai Branch Conventionl Proceedings [online], Japan, Information Processing Society of Japan, Available on http: id.nii.ac.jp/1001/0020708, 2020, 4 pages (Official Copy only) {See Communication Under Rule 37 CFR § 1.98(a) (3)}.
Non-Final Office Action received for U.S. Appl. No. 14/839,913, mailed on Mar. 2, 2016, 11 pages.
Non-Final Office Action received for U.S. Appl. No. 14/864,011, mailed on Jan. 21, 2016, 10 pages.
Non-Final Office Action received for U.S. Appl. No. 16/679,967, mailed on Sep. 2, 2021, 12 pages.
Non-Final Office Action received for U.S. Appl. No. 14/805,403, mailed on Nov. 16, 2017, 21 pages.
Non-Final Office Action received for U.S. Appl. No. 14/616,573, mailed on Jun. 16, 2016, 12 pages.
Non-Final Office Action received for U.S. Appl. No. 14/616,573, mailed on Jun. 14, 2017, 13 pages.
Non-Final Office Action received for U.S. Appl. No. 14/774,664, mailed on Mar. 7, 2017, 23 pages.
Non-Final Office Action received for U.S. Appl. No. 14/839,897, mailed on May 18, 2017, 11 pages.
Non-Final Office Action received for U.S. Appl. No. 14/839,903, mailed on Feb. 26, 2018, 10 pages.
Non-Final Office Action received for U.S. Appl. No. 14/839,913, mailed on Jul. 28, 2016., 12 pages.
Non-Final Office Action received for U.S. Appl. No. 14/863,099, mailed on Dec. 2, 2015, 12 pages.
Non-Final Office Action received for U.S. Appl. No. 14/864,011, mailed on Jun. 10, 2016, 10 pages.
Non-Final Office Action received for U.S. Appl. No. 14/973,573, mailed on Apr. 20, 2017, 34 pages.
Non-Final Office Action received for U.S. Appl. No. 15/038,419, mailed on Dec. 21, 2016, 13 pages.
Non-Final Office Action received for U.S. Appl. No. 15/135,328, mailed on Apr. 11, 2018, 64 pages.
Non-Final Office Action received for U.S. Appl. No. 15/268,115, mailed on Apr. 13, 2017, 44 pages.
Non-Final Office Action received for U.S. Appl. No. 15/433,238, mailed on Nov. 3, 2017, 6 pages.
Non-Final Office Action received for U.S. Appl. No. 15/937,716, mailed on Apr. 22, 2019, 28 pages.
Non-Final Office Action received for U.S. Appl. No. 16/144,264, mailed on May 1, 2020, 30 pages.
Non-Final Office Action received for U.S. Appl. No. 16/147,523, mailed on Apr. 26, 2022, 22 pages.
Non-Final Office Action received for U.S. Appl. No. 16/147,523, mailed on Dec. 27, 2019, 11 pages.
Non-Final Office Action received for U.S. Appl. No. 16/147,523, mailed on Jul. 21, 2021, 20 pages.
Non-Final Office Action received for U.S. Appl. No. 16/281,838, mailed on Mar. 26, 2020, 18 pages.
Non-Final Office Action received for U.S. Appl. No. 16/407,584, mailed on Jul. 10, 2019, 8 pages.
Non-Final Office Action received for U.S. Appl. No. 16/583,981, mailed on Dec. 6, 2019, 14 pages.
Non-Final Office Action received for U.S. Appl. No. 16/583,994, mailed on Dec. 23, 2020, 17 pages.
Non-Final Office Action received for U.S. Appl. No. 16/583,994, mailed on Dec. 30, 2019, 14 pages.
Non-Final Office Action received for U.S. Appl. No. 16/653,857, mailed on Jul. 9, 2020, 35 pages.
Non-Final Office Action received for U.S. Appl. No. 16/653,857, mailed on Jul. 22, 2021, 45 pages.
Non-Final Office Action received for U.S. Appl. No. 16/679,967, mailed on Apr. 19, 2022, 13 pages.
Non-Final Office Action received for U.S. Appl. No. 16/723,583, mailed on Aug. 13, 2020, 13 pages.
Non-Final Office Action received for U.S. Appl. No. 16/749,929, mailed on May 13, 2020, 11 pages.
Non-Final Office Action received for U.S. Appl. No. 16/773,536, mailed on Dec. 18, 2020, 19 pages.
Non-Final Office Action received for U.S. Appl. No. 17/041,350, mailed on Jun. 10, 2021, 24 pages.
Non-Final Office Action received for U.S. Appl. No. 17/188,228, mailed on Dec. 21, 2021, 14 pages.
Non-Final Office Action received for U.S. Appl. No. 17/314,948, mailed on Aug. 1, 2022, 33 pages.
Non-Final Office Action received for U.S. Appl. No. 17/410,169, mailed on Dec. 5, 2023, 48 pages.
Non-Final Office Action received for U.S. Appl. No. 17/410,169, mailed on Sep. 16, 2022, 42 pages.
Non-Final Office Action received for U.S. Appl. No. 17/509,536, mailed on Dec. 22, 2022, 16 pages.
Non-Final Office Action received for U.S. Appl. No. 17/746,807, mailed on Feb. 2, 2023, 14 pages.
Non-Final Office Action received for U.S. Appl. No. 17/746,807, mailed on Jul. 20, 2023, 14 pages.
Non-Final Office Action received for U.S. Appl. No. 17/747,613, mailed on Nov. 16, 2023, 28 pages.
Non-Final Office Action received for U.S. Appl. No. 17/975,141, mailed on Jul. 6, 2023, 22 pages.
Non-Final Office Action received for U.S. Appl. No. 18/088,309, mailed on Apr. 9, 2024, 14 pages.
Non-Final Office Action received for U.S. Appl. No. 18/088,309, mailed on Sep. 21, 2023, 11 pages.
Non-Final Office Action received for U.S. Appl. No. 18/109,808, mailed on Jan. 4, 2024, 45 pages.
Non-Final Office Action received for U.S. Appl. No. 18/109,808, mailed on Sep. 12, 2023, 49 pages.
Non-Final Office Action received for U.S. Appl. No. 18/122,625, mailed on Nov. 15, 2023, 14 pages.
Non-Final Office Action received for U.S. Appl. No. 18/197,681, mailed on Jan. 30, 2024, 32 pages.
Notice of Acceptance received for Australian Patent Application No. 2015385757, mailed on Jul. 16, 2018, 3 pages.
Notice of Acceptance received for Australian Patent Application No. 2016218318, mailed on Jul. 3, 2019, 3 pages.
Notice of Acceptance received for Australian Patent Application No. 2018247345, mailed on May 15, 2019, 3 pages.
Notice of Acceptance received for Australian Patent Application No. 2020239670, mailed on Jul. 2, 2021, 3 pages.
Notice of Acceptance received for Australian Patent Application No. 2020285524, mailed on Dec. 17, 2021, 3 pages.
Notice of Acceptance received for Australian Patent Application No. 20212508863, mailed on Jan. 13, 2023, 3 pages.
Notice of Acceptance received for Australian Patent Application No. 2022201369, mailed on Mar. 17, 2022, 3 pages.
Notice of Acceptance received for Australian Patent Application No. 2022204555, mailed on May 11, 2023, 3 pages.
Notice of Acceptance received for Australian Patent Application No. 2023201920, mailed on Feb. 9, 2024, 3 pages.
Notice of Allowance received for Chinese Patent Application No. 201580046237.6, mailed on Aug. 29, 2018, 4 pages (1 page of English Translation and 3 pages of Official copy).
Notice of Allowance received for Chinese Patent Application No. 201580077218.X, mailed on Nov. 13, 2020, 2 pages (1 page of English Translation and 1 page of Official copy).
Notice of Allowance received for Chinese Patent Application No. 201610084974.1, mailed on Aug. 5, 2019, 2 pages (1 page of English Translation and 1 page of Official copy).
Notice of Allowance received for Chinese Patent Application No. 201710657424.9, mailed on May 8, 2020, 2 pages (1 page of English Translation and 1 page of Official copy).
Notice of Allowance received for Chinese Patent Application No. 201810321928.8, mailed on Sep. 11, 2019, 2 pages (1 page of English Translation and 1 page of Official copy).

(56) References Cited

OTHER PUBLICATIONS

Notice of Allowance received for Chinese Patent Application No. 201910990432.4, mailed on Apr. 27, 2021, 2 pages (1 page of English Translation and 1 page of Official copy).
Notice of Allowance received for Chinese Patent Application No. 201980036737.X, mailed on Apr. 20, 2021, 10 pages (5 pages of English Translation and 5 pages of Official copy).
Notice of Allowance received for Chinese Patent Application No. 202080039642.6, mailed on Apr. 17, 2023, 6 pages (2 pages of English Translation and 4 pages of Official copy).
Notice of Allowance received for Chinese Patent Application No. 202110011509.6, mailed on Mar. 2, 2022, 2 pages (1 page of English Translation and 1 page of Official copy).
Notice of Allowance received for Chinese Patent Application No. 202111612841.4, mailed on Jan. 5, 2023, 3 pages (2 pages of English Translation & 1 page of Official Copy).
Notice of Allowance received for Chinese Patent Application No. 202211558100.7, mailed on Mar. 29, 2024, 3 pages (2 pages of English Translation and 1 page of Official Copy).
Notice of Allowance received for Danish Patent Application No. PA201570771, mailed on Sep. 2, 2016, 2 pages.
Notice of Allowance received for Danish Patent Application No. PA201570773, mailed on Apr. 26, 2018, 2 pages.
Notice of Allowance received for Japanese Patent Application No. 2017-545733, mailed on Jun. 1, 2018, 4 pages (1 page of English Translation and 3 pages of Official copy).
Notice of Allowance received for Japanese Patent Application No. 2018-126311, mailed on Feb. 1, 2019, 4 pages (1 page of English Translation and 3 pages of Official copy).
Notice of Allowance received for Japanese Patent Application No. 2020-551465, mailed on Jun. 28, 2021, 4 pages (1 page of English Translation and 3 pages of Official Copy).
Notice of Allowance received for Japanese Patent Application No. 2021-122610, mailed on Aug. 5, 2022, 4 pages (1 page of English Translation and 3 pages of Official Copy).
Notice of Allowance received for Japanese Patent Application No. 2021-571464, mailed on May 30, 2022, 4 pages (1 page of English Translation and 3 pages of Official Copy).
Notice of Allowance received for Japanese Patent Application No. 2022-102840, mailed on Aug. 19, 2022, 4 pages (1 page of English Translation and 3 pages of Official Copy).
Notice of Allowance received for Japanese Patent Application No. 2022-139320, mailed on Jan. 6, 2023, 4 pages (1 page of English Translation and 3 pages of Official Copy).
Notice of Allowance received for Korean Patent Application No. 10-2020-7028759, mailed on Oct. 19, 2021, 4 pages (1 page of English Translation and 3 pages of Official Copy).
Notice of Allowance received for Korean Patent Application No. 10-2021-7039234, mailed on Dec. 20, 2021, 4 pages (1 page of English Translation and 3 pages of Official Copy).
Notice of Allowance received for Korean Patent Application No. 10-2022-7001721, mailed on Feb. 28, 2022, 5 pages (1 page of English Translation and 4 pages of Official Copy).
Notice of Allowance received for Korean Patent Application No. 10-2022-7008567, mailed on Jul. 4, 2022, 9 pages (2 pages of English Translation and 7 pages of Official Copy).
Notice of Allowance received for Taiwanese Patent Application No. 104107328, mailed on Jun. 12, 2017, 3 pages (Official Copy Only) {(See Communication Under Rule 37 CFR § 1.98(a) (3)}.
Notice of Allowance received for Taiwanese Patent Application No. 104123593, mailed on Oct. 1, 2018, 4 pages (1 pages of English Translation and 3 pages of Official Copy).
Notice of Allowance received for Taiwanese Patent Application No. 104128700, mailed on Mar. 27, 2017, 3 pages (Official Copy Only) {(See Communication Under Rule 37 CFR § 1.98(a) (3)}.
Notice of Allowance received for Taiwanese Patent Application No. 104133756, mailed on Nov. 30, 2017, 5 pages (2 pages of English Translation and 3 pages of Official Copy).
Notice of Allowance received for Taiwanese Patent Application No. 104133757, mailed on Jan. 18, 2017, 3 pages (Official Copy Only) {(See Communication Under Rule 37 CFR § 1.98(a) (3)}.
Notice of Allowance received for U.S. Appl. No. 14/641,251, mailed on May 18, 2016, 13 pages.
Notice of Allowance received for U.S. Appl. No. 14/805,403, mailed on Jul. 11, 2018, 15 pages.
Notice of Allowance received for U.S. Appl. No. 14/839,897, mailed on Jun. 8, 2018, 11 pages.
Notice of Allowance received for U.S. Appl. No. 14/839,903, mailed on Jan. 3, 2019, 7 pages.
Notice of Allowance received for U.S. Appl. No. 14/839,913, mailed on Aug. 11, 2016, 5 pages.
Notice of Allowance received for U.S. Appl. No. 14/864,011, mailed on Apr. 28, 2016, 5 pages.
Notice of Allowance received for U.S. Appl. No. 14/864,011, mailed on Oct. 5, 2016, 5 pages.
Notice of Allowance received for U.S. Appl. No. 14/973,573, mailed on Nov. 30, 2017, 8 pages.
Notice of Allowance received for U.S. Appl. No. 15/038,419, mailed on Apr. 3, 2017, 10 pages.
Notice of Allowance received for U.S. Appl. No. 15/135,328, mailed on Jul. 1, 2019, 25 pages.
Notice of Allowance received for U.S. Appl. No. 15/268,115, mailed on Mar. 7, 2018, 15 pages.
Notice of Allowance received for U.S. Appl. No. 15/366,607, mailed on Apr. 2, 2019, 2 pages.
Notice of Allowance received for U.S. Appl. No. 15/366,607, mailed on Feb. 21, 2019, 9 pages.
Notice of Allowance received for U.S. Appl. No. 15/433,238, mailed on May 17, 2018, 7 pages.
Notice of Allowance received for U.S. Appl. No. 15/937,716, mailed on Oct. 23, 2019, 19 pages.
Notice of Allowance received for U.S. Appl. No. 15/975,581, mailed on Oct. 3, 2018, 25 pages.
Notice of Allowance received for U.S. Appl. No. 16/144,264, mailed on Nov. 16, 2020, 10 pages.
Notice of Allowance received for U.S. Appl. No. 16/147,523, mailed on Aug. 4, 2022, 9 pages.
Notice of Allowance received for U.S. Appl. No. 16/147,523, mailed on Nov. 28, 2022, 8 pages.
Notice of Allowance received for U.S. Appl. No. 16/147,523, mailed on Oct. 4, 2022, 8 pages.
Notice of Allowance received for U.S. Appl. No. 16/281,838, mailed on Aug. 26, 2020, 9 pages.
Notice of Allowance received for U.S. Appl. No. 16/281,838, mailed on May 20, 2021, 9 pages.
Notice of Allowance received for U.S. Appl. No. 16/407,584, mailed on Oct. 28, 2019, 5 pages.
Notice of Allowance received for U.S. Appl. No. 16/583,981, mailed on Mar. 26, 2021, 10 pages.
Notice of Allowance received for U.S. Appl. No. 16/583,994, mailed on Jun. 24, 2021, 10 pages.
Notice of Allowance received for U.S. Appl. No. 16/653,857, mailed on Feb. 16, 2022, 34 pages.
Notice of Allowance received for U.S. Appl. No. 16/679,967, mailed on Jun. 15, 2022, 7 pages.
Notice of Allowance received for U.S. Appl. No. 16/679,967, mailed on Nov. 2, 2022, 7 pages.
Notice of Allowance received for U.S. Appl. No. 16/749,929, mailed on Dec. 16, 2020, 2 pages.
Notice of Allowance received for U.S. Appl. No. 16/749,929, mailed on Nov. 4, 2020, 5 pages.
Notice of Allowance received for U.S. Appl. No. 16/773,536, mailed on Apr. 8, 2021, 16 pages.
Notice of Allowance received for U.S. Appl. No. 16/867,002, mailed on Aug. 20, 2021, 12 pages.
Notice of Allowance received for U.S. Appl. No. 16/867,002, mailed on Mar. 1, 2022, 7 pages.
Notice of Allowance received for U.S. Appl. No. 17/041,350, mailed on Feb. 24, 2022, 6 pages.
Notice of Allowance received for U.S. Appl. No. 17/188,228, mailed on Feb. 1, 2023, 5 pages.

(56) References Cited

OTHER PUBLICATIONS

Notice of Allowance received for U.S. Appl. No. 17/188,228, mailed on Oct. 19, 2022, 6 pages.
Notice of Allowance received for U.S. Appl. No. 17/383,880, mailed on Aug. 29, 2022, 17 pages.
Notice of Allowance received for U.S. Appl. No. 17/383,880, mailed on Jun. 20, 2022, 17 pages.
Notice of Allowance received for U.S. Appl. No. 17/509,356, mailed on Apr. 7, 2023, 11 pages.
Notice of Allowance received for U.S. Appl. No. 17/950,943, mailed on Jul. 5, 2023, 18 pages.
Notice of Allowance received for U.S. Appl. No. 17/950,943, mailed on Oct. 20, 2023, 18 pages.
Notice of Allowance received for U.S. Appl. No. 17/975,141, mailed on Dec. 7, 2023, 10 pages.
Nozawa Naoki et al., "iPad Perfect Manual for iOS 4", Jpn, Sotec Ltd., Yanagisawa Junichi, Dec. 31, 2010, pp. 189-190 (Official Copy Only) {(See Communication Under Rule 37 CFR § 1.98(a) (3)}.
Office Action received for Australian Patent Application No. 2015385757, mailed on Sep. 11, 2017, 3 pages.
Office Action received for Australian Patent Application No. 2016100155, mailed on May 4, 2016, 7 pages.
Office Action received for Australian Patent Application No. 2016218318, mailed on Aug. 24, 2018, 5 pages.
Office Action received for Australian Patent Application No. 2016218318, mailed on Sep. 26, 2018, 3 pages.
Office Action received for Australian Patent Application No. 2018247345, mailed on May 6, 2019, 2 pages.
Office Action received for Australian Patent Application No. 2020239670, mailed on Mar. 3, 2021, 4 pages.
Office Action received for Australian Patent Application No. 2021250863, mailed on Oct. 6, 2022, 6 pages.
Office Action received for Australian Patent Application No. 2022204555, mailed on Feb. 17, 2023, 5 pages.
Office Action received for Australian Patent Application No. 2023201920, mailed on Nov. 10, 2023, 2 pages.
Office Action received for Chinese Patent Application No. 201580046237.6, mailed on Feb. 6, 2018, 10 pages (5 pages of English Translation and 5 pages of Official Copy).
Office Action received for Chinese Patent Application No. 201580077218.X, mailed on Feb. 3, 2020, 23 pages (8 pages of English Translation and 15 pages of Official Copy).
Office Action received for Chinese Patent Application No. 201610084974.1, mailed on Dec. 5, 2018, 6 pages (3 pages of English Translation and 3 pages of Official Copy).
Office Action received for Chinese Patent Application No. 201610084974.1, mailed on May 3, 2018, 12 pages (5 pages of English Translation and 7 pages of Official Copy).
Office Action received for Chinese Patent Application No. 201620119869.2, mailed on Jun. 3, 2016, 2 pages (1 page of English Translation and 1 page of Official copy).
Office Action received for Chinese Patent Application No. 201620119869.2, mailed on Nov. 22, 2016, 2 pages (Official Copy Only) {(See Communication Under Rule 37 CFR § 1.98(a) (3)}.
Office Action received for Chinese Patent Application No. 201710657424.9, mailed on Sep. 17, 2019, 23 pages (11 pages of English Translation and 12 pages of Official Copy).
Office Action received for Chinese Patent Application No. 201810657424.9, mailed on Jul. 2, 2019, 10 pages (5 pages of English Translation and 5 pages of Official Copy).
Office Action received for Chinese Patent Application No. 201910990432.4, mailed on Dec. 28, 2020, 6 pages (3 pages of English Translation and 3 pages of Official Copy).
Office Action received for Chinese Patent Application No. 201910990432.4, mailed on May 18, 2020, 15 pages (9 pages of English Translation and 6 pages of Official Copy).
Office Action received for Chinese Patent Application No. 202080039642.6, mailed on Sep. 5, 2022, 12 pages (6 pages of English Translation and 6 pages of Official Copy).
Office Action received for Chinese Patent Application No. 202110011509.6, mailed on Oct. 11, 2021, 10 pages (5 pages of English Translation and 5 pages of Official Copy).
Office Action received for Chinese Patent Application No. 202111612841.4, mailed on Jul. 22, 2022, 13 pages (7 pages of English Translation and 6 pages of Official Copy).
Office Action received for Chinese Patent Application No. 202211558100.7, mailed on Jan. 8, 2024 pages (6 pages of English Translation and 6 pages of Official Copy).
Office Action received for Danish Patent Application No. PA201570664, mailed on Dec. 14, 2016, 2 pages.
Office Action received for Danish Patent Application No. PA201570664, mailed on Jun. 3, 2016, 3 pages.
Office Action received for Danish Patent Application No. PA201570664, mailed on Mar. 15, 2016, 10 pages.
Office Action received for Danish Patent Application No. PA201570771, mailed on Jun. 13, 2016, 3 pages.
Office Action received for Danish Patent Application No. PA201570771, mailed on Mar. 17, 2016, 8 pages.
Office Action received for Danish Patent Application No. PA201570773, mailed on Aug. 28, 2017, 3 pages.
Office Action received for Danish Patent Application No. PA201570773, mailed on Feb. 15, 2017, 3 pages.
Office Action received for Danish Patent Application No. PA201570773, mailed on Mar. 18, 2016, 9 pages.
Office Action received for Danish Patent Application No. PA201570773, mailed on Sep. 12, 2016, 3 pages.
Office Action received for Danish Patent Application No. PA201570788, mailed on Apr. 8, 2016, 11 pages.
Office Action received for Danish Patent Application No. PA201570788, mailed on Sep. 13, 2016, 3 pages.
Office Action received for Danish Patent Application No. PA201570791, mailed on Apr. 6, 2016, 12 pages.
Office Action received for Danish Patent Application No. PA201570791, mailed on Sep. 6, 2016, 4 pages.
Office Action received for Danish Patent Application No. PA201670074, mailed on Apr. 7, 2016, 8 pages.
Office Action received for Danish Patent Application No. PA201670074, mailed on Jun. 28, 2016, 5 pages.
Office Action received for Danish Patent Application No. PA201670074, mailed on Mar. 16, 2017, 2 pages.
Office Action received for Danish Patent Application No. PA201970533, mailed on Apr. 20, 2012, 2 pages.
Office Action received for Danish Patent Application No. PA201970533, mailed on Jul. 17, 2020, 6 pages.
Office Action received for Danish Patent Application No. PA202070609, mailed on Dec. 10, 2020, 8 pages.
Office Action received for Danish Patent Application No. PA202070610, mailed on Jun. 18, 2021, 8 pages.
Office Action received for Danish Patent Application No. PA202070610, mailed on Mar. 14, 2022, 7 pages.
Office Action received for European Patent Application No. 15712218.5, mailed on Aug. 3, 2017, 4 pages.
Office Action received for European Patent Application No. 15753796.0, mailed on Aug. 4, 2020, 9 pages.
Office Action received for European Patent Application No. 15753796.0, mailed on Jun. 2, 2022, 2 pages.
Office Action received for European Patent Application No. 15787091.6, mailed on Aug. 2, 2019, 8 pages.
Office Action received for European Patent Application No. 15787091.6, mailed on Oct. 8, 2018, 7 pages.
Office Action received for European Patent Application No. 16708003.5, mailed on Feb. 22, 2021, 10 pages.
Office Action received for European Patent Application No. 17184710.6, mailed on Dec. 21, 2018, 7 pages.
Office Action received for European Patent Application No. 19722280.5, mailed on Oct. 4, 2021, 7 pages.
Office Action received for European Patent Application No. 20192404.0, mailed on Dec. 2, 2020, 8 pages.
Office Action received for European Patent Application No. 20192404.0, mailed on Jun. 8, 2021, 7 pages.
Office Action received for European Patent Application No. 20720310.0, mailed on Apr. 11, 2023, 8 pages.

(56) References Cited

OTHER PUBLICATIONS

Office Action received for European Patent Application No. 20720310.0, mailed on Jul. 25, 2023, 11 pages.
Office Action received for European Patent Application No. 20720310.0, mailed on Oct. 4, 2022, 9 pages.
Office Action received for European Patent Application No. 20729346.5, mailed on Jan. 17, 2022, 8 pages.
Office Action received for European Patent Application No. 20729346.5, mailed on Jul. 28, 2022, 9 pages.
Office Action received for European Patent Application No. 20746429.8, mailed on Sep. 20, 2023, 10 pages.
Office Action received for European Patent Application No. 22729964.1, mailed on May 22, 2023, 9 pages.
Office Action received for Indian Patent Application No. 202017041557, mailed on Dec. 8, 2021, 8 pages.
Office Action received for Japanese Patent Application No. 2018-126311, mailed on Nov. 2, 2018, 4 pages (2 pages of English Translation and 2 pages of official copy).
Office Action received for Japanese Patent Application No. 2017-545733, mailed on Feb. 13, 2018, 7 pages (3 pages of English Translation and 4 pages of Official Copy).
Office Action received for Japanese Patent Application No. 2022-149476, mailed on Nov. 2, 2023, 9 pages (4 pages of English Translation and 5 pages of Official Copy).
Office Action received for Japanese Patent Application No. 2023-513867, mailed on Dec. 4, 2023, 6 pages (3 pages of English Translation and 3 pages of Official Copy).
Office Action received for Japanese Patent Application No. 2023-513867, mailed on Jul. 31, 2023, 11 pages (5 pages of English Translation and 6 pages of Official Copy).
Office Action received for Korean Patent Application No. 10-2020-7028759, mailed on Jun. 29, 2021, 12 pages (5 pages of English Translation and 7 pages of Official Copy).
Office Action received for Korean Patent Application No. 10-2022-7008567, mailed on Mar. 28, 2022, 5 pages (2 pages of English Translation and 3 pages of Official Copy).
Office Action received for Korean Patent Application No. 10-2022-7032414, mailed on Mar. 26, 2024, 11 pages (5 pages of English Translation and 6 pages of Official Copy).
Office Action received for Taiwanese Patent Application No. 104123593, mailed on May 24, 2016, 57 pages (26 pages of English Translation and 31 pages of Official Copy).
Office Action received for Taiwanese Patent Application No. 104123593, mailed on Sep. 13, 2016, 8 pages (3 pages of English Translation and 5 pages of Official Copy).
Office Action received for Taiwanese Patent Application No. 104128700, mailed on Aug. 31, 2016, 13 pages (6 pages of English Translation and 7 pages of Official Copy).
Office Action received for Taiwanese Patent Application No. 104133756, mailed on May 17, 2017, 13 pages (6 pages of English Translation and 7 pages of Official Copy).
Office Action received for Taiwanese Patent Application No. 104133757, mailed on Jul. 6, 2016, 22 pages (9 pages of English Translation and 13 pages of Official Copy).
Office Action received for Taiwanese Patent Application No. 104107328, mailed on Dec. 28, 2016, 4 pages (1 page of English Translation and 3 pages of Official Copy).
Ojeda-Zapata Julio, "Five Apps That Play Podcasts Directly from Your Apple Watch", Available online at: https://tidbits.com/2018/04/09/five-apps-that-play-podcasts-directly-from-your-apple-watch/, Apr. 9, 2018, 12 pages.
Pairing Your Apple Watch with Your AppleTV, Available online at: https://www.youtube.com/watch?v=C4t8YFSJ-UY, Apr. 27, 2015, 3 pages.
Playmemories Camera Apps, "PlayMemories Camera Apps Help Guide", available at <https://www.playmemoriescameraapps.com/portal/manual/IS9104-NPIA09014_00-F00002/en/index.html>, 2012, 3 pages.
Remote Shot for SmartWatch 2, Available online at:—https://play.google.com/store/apps/details?id=net.watea.sw2.rshot&h1=en, Nov. 21, 2017, 3 pages.
Result of Consultation received for European Patent Application No. 16708003.5, mailed on Apr. 18, 2023, 9 pages.
Result of Consultation received for European Patent Application No. 17184710.6, mailed on Feb. 21, 2020, 6 pages.
Result of Consultation received for European Patent Application No. 17184710.6, mailed on Feb. 28, 2020, 3 pages.
Result of Consultation received for European Patent Application No. 20729346.5, mailed on Jun. 21, 2023, 3 pages.
Reuss et al., "Period Domain Analysis in Fetal Pulse Oximetry", Proceedings of t11e Second Joing EMBS/BMES Conference, Houston, TX, Oct. 23-26, 2002, 2 pages.
Rubine Dean, "Combining Gestures and Direct Manipulation", CHI '92, May 3-7, 1992, pp. 659-660.
Rubine Deanh., "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Search Report and Opinion received for Danish Patent Application No. PA201970533, mailed on Oct. 25, 2019, 9 pages.
Search Report and Opinion received for Danish Patent Application No. PA202070610, mailed on Jan. 8, 2021, 9 pages.
Singh Ajit, "Mytunz: Free Iphone Media Player App With Sleep Timer, Gesture Control", Available online at: https://www.ilovefreesoftware.com/01/iphone/mytunz-free-iphone-media-player-app.html, Jul. 1, 2014, 6 pages.
Summons to Attend Oral Proceedings received for European Patent Application No. 16708003.5, mailed on Dec. 13, 2022, 11 pages.
Summons to Attend Oral Proceedings received for European Patent Application No. 17184710.6, mailed on Sep. 17, 2019, 7 pages.
Summons to Attend Oral Proceedings received for European Patent Application No. 20192404.0, mailed on Feb. 2, 2022, 11 pages.
Summons to Attend Oral Proceedings received for European Patent Application No. 20720310.0, mailed on Jan. 3, 2024, 12 pages.
Summons to Attend Oral Proceedings received for European Patent Application No. 20729346.5, mailed on Jan. 23, 2023, 11 pages.
Summons to Attend Oral Proceedings received for European Patent Application No. 22729964.1, mailed on Nov. 6, 2023, 7 pages.
Summons to Oral Proceedings received for European Patent Application No. 17184710.6, mailed on May 10, 2023, 3 pages.
Supplemental Notice of Allowance received for U.S. Appl. No. 14/805,403, mailed on Oct. 4, 2018, 3 pages.
Supplemental Notice of Allowance received for U.S. Appl. No. 15/433,238, mailed on Jun. 20, 2018, 2 pages.
Supplemental Notice of Allowance received for U.S. Appl. No. 16/147,523, mailed on Aug. 23, 2022, 2 pages.
Supplemental Notice of Allowance received for U.S. Appl. No. 16/867,002, mailed on Mar. 16, 2022, 2 pages.
Supplemental Notice of Allowance received for U.S. Appl. No. 16/867,002, mailed on Sep. 9, 2021, 2 pages.
Supplemental Notice of Allowance received for U.S. Appl. No. 17/975,141, mailed on Feb. 26, 2024, 2 pages.
Techsmith, "Snagit® 11 Snagit 11.4 Help", Online available at <http://assets.techsmith.com/Downloads/ua-tutorials-snagit-11/Snagit_11.pdf>, Jan. 2014, 146 pages.
Walker Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.
Wearablezone, "How to Set Up Your Fitbit Profile", Online available at:—<https://youtu.be/jsWPtcDWiJM>, Jun. 6, 2016, 3 pages.
Westerman Wayne, "Hand Tracking, Finger Identification and Chordic Manipulation on a Multi-Touch Surface", Doctoral Dissertation, 1999, 363 Pages.
Whitney Lance, "How to Listen to Music on Your Apple Watch", Available Online at: https://medium.com/pcmag-access/how-to-listen-to-music-on-your-apple-watch-f48a6c20dd52#:~:text=On%20your%20iPhone%2C%20go%20to,.%E2%80%9D%20Tap%20on%20Add%20Music., Mar. 2, 2018, 13 pages.

(56) References Cited

OTHER PUBLICATIONS

Xdream, "TickTalk Video User Manual", YouTube [online] [video], online available at: <https://youtu.be/jYhq3DwmVzo>, Mar. 17, 2017, 3 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog. "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
Zhang et al., "FinDroidHR: Smartwatch Gesture Input with Optical Heartrate Monitor", Proceedings of the ACM on Interactive Mobile. Wearable and Ubiquitous Technologies, Available Online at: https://dl.acm.org/doi/10.1145/3191788, vol. 2, No. 1, Mar. 2018, pp. 56:1-56:42.
Zhao et al., "Wireless Photoplethysmograph Knuckle Sensor System for Measuring Finger Motions", 2014 International Symposium on Optomechatronic Technologies, IEEE, 2014, pp. 205-209.
Zheng et al., "An Efficient User Verification System via Mouse Movements", Computer am1 Communications Security, ACM, New York, NY, USA, Dec. 17, 2011, pp. 139-150.
Applicant-Initiated Interview Summary received for U.S. Appl. No. 18/499,970, mailed on May 30, 2025, 4 pages.
Notice of Allowance received for U.S. Appl. No. 18/197,681, mailed on May 20, 2025, 18 pages.
Office Action received for Chinese Patent Application No. 202110481400.9, mailed on Apr. 23, 2025, 24 pages (14 pages of English Translation and 10 pages of Official Copy).
Applicant-Initiated Interview Summary received for U.S. Appl. No. 18/197,681, mailed on Apr. 21, 2025, 4 pages.
Final Office Action received for U.S. Appl. No. 18/102,036, mailed on Apr. 21, 2025, 19 pages.
Intention to Grant received for European Patent Application No. 24211972.5, mailed on Apr. 10, 2025, 9 pages.
Office Action received for Japanese Patent Application No. 2024-023002, mailed on Apr. 11, 2025, 12 pages (6 pages of English Translation and 6 pages of Official Copy).
Extended European Search Report received for European Patent Application No. 25186269.4, mailed on Nov. 17, 2025, 12 pages.
International Preliminary Report on Patentability received for PCT Patent Application No. PCT/US2024/023602, mailed on Nov. 20, 2025, 18 pages.
Notice of Allowance received for U.S. Patent Application No. 17/410, 169, mailed on Nov. 21, 2025, 8 pages.
Notice of Allowance received for U.S. Appl. No. 18/441,971, mailed on Dec. 2, 2025, 11 pages.
Office Action received for European Patent Application No. 24194531.0, mailed on Nov. 27, 2025, 7 pages.
Office Action received for Japanese Patent Application No. 2024-147808, mailed on Nov. 10, 2025, 6 pages (3 pages of English Translation and 3 pages of Official Copy).
Notice of Allowance received for U.S. Appl. No. 18/674,435, mailed on Dec. 3, 2025, 18 pages.
Office Action received for Chinese Patent Application No. 202110481400.9, mailed on Nov. 6, 2025, 28 pages (17 pages of English Translation and 11 pages of Official Copy).
Corrected Notice of Allowance received for U.S. Appl. No. 18/441,971, mailed on Aug. 21, 2025, 2 pages.
Non-Final Office Action received for U.S. Appl. No. 18/102,036, mailed on Aug. 25, 2025, 22 pages.
Notice of Allowance received for U.S. Appl. No. 17/747,613, mailed on Sep. 2, 2025, 10 pages.
Corrected Notice of Allowance received for U.S. Appl. No. 18/228,597, mailed on Sep. 17, 2025, 2 pages.
Non-Final Office Action received for U.S. Appl. No. 18/674,435, mailed on Sep. 10, 2025, 29 pages.
Notice of Allowance received for Japanese Patent Application No. 2024-023002, mailed on Sep. 1, 2025, 5 pages (1 page of English Translation and 4 pages of Official Copy).
Notice of Allowance received for U.S. Appl. No. 18/228,597, mailed on Sep. 10, 2025, 10 pages.
Supplemental Notice of Allowance received for U.S. Appl. No. 17/747,613, mailed on Sep. 16, 2025, 5 pages.
Advisory Action received for U.S. Appl. No. 18/109,808, mailed on May 20, 2024, 6 pages.
Advisory Action received for U.S. Appl. No. 18/197,681, mailed on Aug. 21, 2024, 5 pages.
Applicant-Initiated Interview Summary received for U.S. Appl. No. 17/410,169, mailed on May 8, 2024, 6 pages.
Applicant-Initiated Interview Summary received for U.S. Appl. No. 17/746,807, mailed on May 21, 2024, 2 pages.
Applicant-Initiated Interview Summary received for U.S. Appl. No. 18/088,309, mailed on Aug. 27, 2024, 2 pages.
Applicant-Initiated Interview Summary received for U.S. Appl. No. 18/088,309, mailed on Jun. 7, 2024, 2 pages.
Applicant-Initiated Interview Summary received for U.S. Appl. No. 18/109,808, mailed on Apr. 30, 2024, 5 pages.
Applicant-Initiated Interview Summary received for U.S. Appl. No. 18/109,808, mailed on Aug. 19, 2024, 6 pages.
Applicant-Initiated Interview Summary received for U.S. Appl. No. 18/122,625, mailed on May 22, 2024, 2 pages.
Applicant-Initiated Interview Summary received for U.S. Appl. No. 18/228,597, mailed on Aug. 8, 2024, 4 pages.
Decision to Grant received for European Patent Application No. 22729964.1, mailed on Aug. 29, 2024, 3 pages.
Final Office Action received for U.S. Appl. No. 18/088,309, mailed on Aug. 1, 2024, 16 pages.
Final Office Action received for U.S. Appl. No. 18/197,681, mailed on Jun. 27, 2024, 30 pages.
Intentionl to Grant received for European Patent Application No. 15753796.0, mailed on Jun. 5, 2024, 8 pages.
Intentionl to Grant received for European Patent Application No. 20720310.0, mailed on Jun. 13, 2024, 13 pages.
Intentionl to Grant received for European Patent Application No. 22729964.1, mailed on Apr. 24, 2024, 9 pages.
International Preliminary Report on Patentability received for PCT Patent Application No. PCT/US2023/012260, mailed on Aug. 22, 2024, 15 pages.
Invitation to Pay Additional Fees and Partial International Search Report received for PCT Patent Application No. PCT/US2024/023602, mailed on Aug. 26, 2024, 11 pages.
Minutes of the Oral Proceedings received for European Patent Application No. 17184710.6, mailed on May 22, 2024, 4 pages.
Minutes of the Oral Proceedings received for European Patent Application No. 20720310.0, mailed on Jun. 7, 2024, 7 pages.
Non-Final Office Action received for U.S. Appl. No. 18/109,808, mailed on Jul. 5, 2024, 53 pages.
Non-Final Office Action received for U.S. Appl. No. 18/228/597, mailed on Jul. 8, 2024, 17 pages.
Notice of Allowance received for Japanese Patent Application No. 2022-149476, mailed on Aug. 2, 2024, 4 pages (1 page of English Translation and 3 pages of Official Copy).
Notice of Allowance received for U.S. Appl. No. 17/746,807, mailed on Jul. 3, 2024, 23 pages.
Notice of Allowance received for U.S. Appl. No. 17/975,141, mailed on Apr. 29, 2024, 9 pages.
Notice of Allowance received for U.S. Appl. No. 18/122,624, mailed on Jun. 21, 2024, 7 pages.
Office Action received for Australian Patent Application No. 2023204647, mailed on Jul. 5, 2024, 3 pages.
Office Action received for Chinese Patent Application No. 202080039832.8, mailed on Mar. 23, 2024, 22 pages (12 pages of English Translation and 10 pages of Official Copy).
Office Action received for Indian Patent Application No. 202218027229, mailed on Jun. 13, 2024, 8 pages.
Office Action received for Japanese Patent Application No. 2022-149476, mailed on Apr. 22, 2024, 8 pages (4 pages of English Translation and 4 pages of Official Copy).

(56) References Cited

OTHER PUBLICATIONS

Result of Consultation received for European Patent Application No. 20720310.0, mailed on Apr. 17, 2024, 9 pages.
Result of Consultation received for European Patent Application No. 20720310.0, mailed on Jun. 4, 2024, 3 pages.
Supplemental Notice of Allowance received for U.S. Appl. No. 17/975,141, mailed on Aug. 12, 2024, 2 pages.
Applicant-Initiated Interview Summary received for U.S. Appl. No. 17/410,169, mailed on Nov. 6, 2024, 5 pages.
Applicant-Initiated Interview Summary received for U.S. Appl. No. 17/747,613. mailed on Dec. 18, 2024, 2 pages.
Applicant-Initiated Interview Summary received for U.S. Appl. No. 17/747,613, mailed on Mar. 18, 2025, 2 pages.
Applicant-Initiated Interview Summary received for U.S. Appl. No. 18/102,036, mailed on Mar. 10, 2025, 3 pages.
Applicant-Initiated Interview Summary received for U.S. Appl. No. 18/102,036, mailed on Nov. 8, 2024, 4 pages.
Applicant-Initiated Interview Summary received for U.S. Appl. No. 18/228,597. mailed on Apr. 1, 2025, 5 pages.
Applicant-Initiated Interview Summary received for U.S. Appl. No. 18/228,597, mailed on Jan. 29, 2025, 4 pages.
Applicant-Initiated Interview Summary received for U.S. Appl. No. 18/499,970, mailed on Feb. 25, 2025, 4 pages.
Applicant-Initiated Interview Summary received for U.S. Appl. No. 18/499,970, mailed on Sep. 18, 2024, 3 pages.
Corrected Notice of Allowance received for U.S. Appl. No. 17/746,807, mailed on Feb. 26, 2025, 3 pages.
Decision to Grant received for European Patent Application No. 15753796.0, mailed on Sep. 26, 2024, 3 pages.
Decision to Grant received for European Patent Application No. 20720310.0, mailed on Dec. 5, 2024, 2 pages.
Extended European Search Report received for European Patent Application No. 24194531.0, mailed on Nov. 12, 2024, 8 pages.
Extended European Search Report received for European Patent Application No. 24194994.0, mailed on Nov. 28, 2024, 9 pages.
Extended European Search Report received for European Patent Application No. 24211972.5, mailed on Jan. 2, 2025, 7 pages.
Final Office Action received for U.S. Appl. No. 17/410,169, mailed on Dec. 3, 2024, 56 pages.
Final Office Action received for U.S. Appl. No. 17/747,613, mailed on Mar. 6, 2025, 26 pages.
Final Office Action received for U.S. Appl. No. 18/228,597, mailed on Jan. 8, 2025, 19 pages.
Final Office Action received for U.S. Appl. No. 18/499,970, mailed on Dec. 23, 2024, 8 pages.
Intention to Grant received for European Patent Application No. 20720310.0, mailed on Oct. 7, 2024, 14 pages.
International Preliminary Report on Patentability received for PCT Patent Application No. PCT/US2023/022410, mailed on Nov. 28, 2024, 18 pages.
International Search Report and Written Opinion received for PCT Patent Application No. PCT/US2024/020743, mailed on Jul. 16, 2024, 19 pages.
International Search Report and Written Opinion received for PCT Patent Application No. PCT/US2024/023602, mailed on Nov. 26, 2024, 17 pages.
Non-Final Office Action received for U.S. Appl. No. 17/410,169, mailed on Sep. 10, 2024, 53 pages.
Non-Final Office Action received for U.S. Appl. No. 17/747,613, mailed on Nov. 27, 2024, 27 pages.
Non-Final Office Action received for U.S. Appl. No. 18/102,036, mailed on Dec. 20, 2024, 16 pages.
Non-Final Office Action received for U.S. Appl. No. 18/102,036, mailed on Sep. 29, 2024, 16 pages.
Non-Final Office Action received for U.S. Appl. No. 18/228,597, mailed on Mar. 6, 2025, 20 pages.
Non-Final Office Action received for U.S. Appl. No. 18/499,970, mailed on Aug. 13, 2024, 8 pages.
Non-Final Office Action received for U.S. Appl. No. 18/499,970, mailed on Mar. 14, 2025, 7 pages.
Notice of Acceptance received for Australian Patent Application No. 2023204647, mailed on Oct. 28, 2024, 3 pages.
Notice of Allowance received for Korean Patent Application No. 10-2022-7032414, mailed on Nov. 27, 2024, 7 pages (2 pages of English Translation and 5 pages of Official Copy).
Notice of Allowance received for U.S. Appl. No. 17/746,807, mailed on Nov. 14, 2024, 6 pages.
Notice of Allowance received for U.S. Appl. No. 18/109,808, mailed on Oct. 10, 2024, 10 pages.
Notice of Allowance received for U.S. Appl. No. 18/122,625, mailed on Sep. 20, 2024, 5 pages.
Notice of Allowance received for U.S. Appl. No. 18/511,778, mailed on Sep. 30, 2024, 17 pages.
Office Action received for Australian Patent Application No. 2023204647, mailed on Sep. 19, 2024, 2 pages.
Office Action received for Chinese Patent Application No. 202310794146.7, mailed on Aug. 30, 2024, 18 pages (11 pages of English Translation and 7 pages of Official Copy).
Office Action received for Chinese Patent Application No. 202310794146.7, mailed on Nov. 13, 2024, 17 pages (11 pages of English Translation and 6 pages of Official Copy).
Final Office Action received for U.S. Appl. No. 18/228,597, mailed on May 9, 2025, 22 pages.
Office Action received for Chinese Patent Application No. 202310794146.7, mailed on Apr. 10. 2025, 11 pages (6 pages of English Translation and 5 pages of Official Copy).
Non-Final Office Action received for U.S. Appl. No. 18/957,386, mailed on Oct. 3, 2025, 18 pages.
Notice of Allowance received for Chinese Patent Application No. 202310794146.7, mailed on Sep. 29, 2025, 4 pages (1 page of English Translation and 3 pages of Official Copy).
Applicant-Initiated Interview Summary received for U.S. Appl. No. 18/102,036, mailed on Jun. 27, 2025, 3 pages.
Applicant-Initiated Interview Summary received for U.S. Appl. No. 18/228,597, mailed on Jun. 23, 2025, 4 pages.
Intention to Grant received for European Patent Application No. 24211972.5, mailed on Jun. 16, 2025, 9 pages.
Non-Final Office Action received for U.S. Appl. No. 17/747,613, mailed on Jun. 26, 2025, 28 pages.
International Preliminary Report on Patentability received for PCT Patent Application No. PCT/US2023/032794, mailed on Apr. 3, 2025, 13 pages.
Non-Final Office Action received for U.S. Appl. No. 18/197,681, mailed on Apr. 3, 2025, 30 pages.
Non-Final Office Action received for U.S. Appl. No. 18/441,971, mailed on Apr. 10, 2025, 39 pages.
Written Opinion received for PCT Patent Application No. PCT/US2024/020743, mailed on Apr. 1, 2025, 14 pages.
Advisory Action received for U.S. Appl. No. 18/228,597, mailed on Jul. 7, 2025, 3 pages.
Applicant-Initiated Interview Summary received for U.S. Appl. No. 17/747,613, mailed on Jul. 21, 2025, 2 pages.
Applicant-Initiated Interview Summary received for U.S. Appl. No. 18/441,971, mailed on Jul. 15, 2025, 4 pages.
Notice of Allowance received for U.S. Appl. No. 17/410,169, mailed on Jul. 17, 2025, 8 pages.
Applicant-Initiated Interview Summary received for U.S. Appl. No. 18/957,386, mailed on Dec. 22, 2025, 4 pages.
Notice of Allowance received for U.S. Appl. No. 18/102,036, mailed on Dec. 17, 2025, 8 pages.
Supplemental Notice of Allowance received for U.S. Appl. No. 18/674,435, mailed on Dec. 18, 2025, 2 pages.
3C Blogger Kisplay Share, Samsung Galaxy Tab S Hands-on SideSync 3.0 Is Amazing, http://www.samsung.com/tw/article/galaxy-tab-s-blogger-kisplay., Jul. 4, 2014, 4 pages, Cited by Taiwanese Patent Office in an Office Action for related Patent Application No. 104123593 on May 24, 2016.
Axiang's Network Notebook, Deep Analysis on Samsung's 2013 New Flagship: tell you what kind of mobile phone Galaxy S4 is!, available at: https://axiang.cc/archives/6115, Apr. 22, 2013, 4 pages, Cited by Taiwanese Patent Office in an Office Action for related Patent Application No. 104123593 on May 24, 2016.

(56) References Cited

OTHER PUBLICATIONS

GT-I9500 (Galaxy S4) User Manual, Samsung, Rev. 1.1, http://org.downloadcenter.samsung.com/downloadfile/ContentsFile.aspx?CDSite=UNI_TW&CttFileID=5406113&CDCttType=UM&ModelType=N&ModelName=GTI9500&VPath=UM/201305/20130520173017063/GTI9500_UM_Open_Taiwan_Jellybean_Chi_Rev.1.1_130520.pdf., May 2013, 14 pages, Cited by Taiwanese Patent Office in an Office Action for related Patent Application No. 104123593 on May 24, 2016.

Nishiya et al.,"Gesture Estimation Using Deep Learning from PPG Signal", 4 pages, Cited by the Japanese Patent Office in an Office Action for related Patent Application No. 2023-513867 on Jul. 31, 2023.

Notice of Allowance received for Taiwanese Patent Application No. 104107328, mailed on Jun. 12, 2017, 3 pages.

Notice of Allowance received for Taiwanese Patent Application No. 104128700, mailed on Mar. 27, 2017, 3 pages.

Notice of Allowance received for Taiwanese Patent Application No. 104133757, mailed on Jan. 18, 2017, 3 pages.

Nozawa Naoki et al., "iPad Perfect Manual for iOS 4", Jpn, Sotec Ltd., Yanagisawa Junichi, Dec. 31, 2010, pp. 189-190, Cited by Japanese Patent Office in an Office Action for related Patent Application No. 2018-126311 on Nov. 2, 2018.

Office Action received for Chinese Patent Application No. 201620119869.2, mailed on Nov. 22, 2016, 2 pages.

* cited by examiner

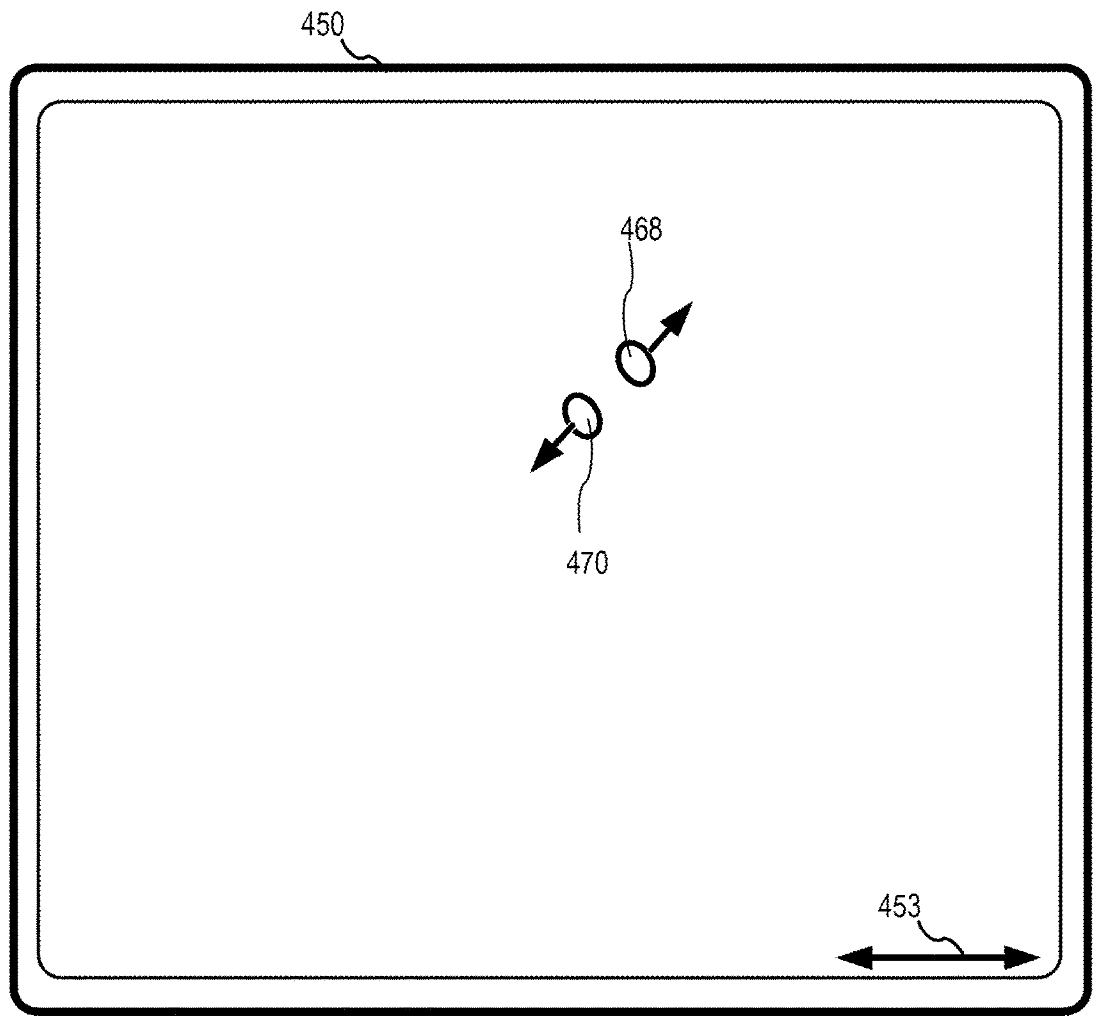
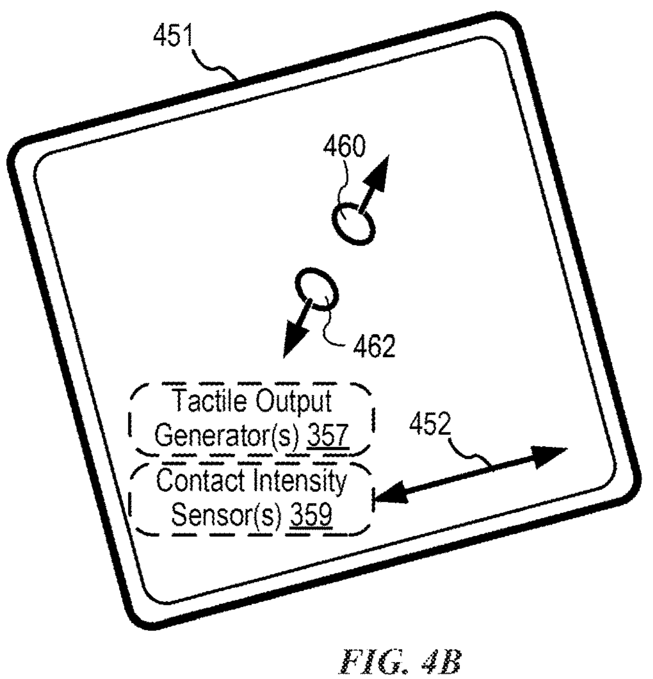
*FIG. 4B*

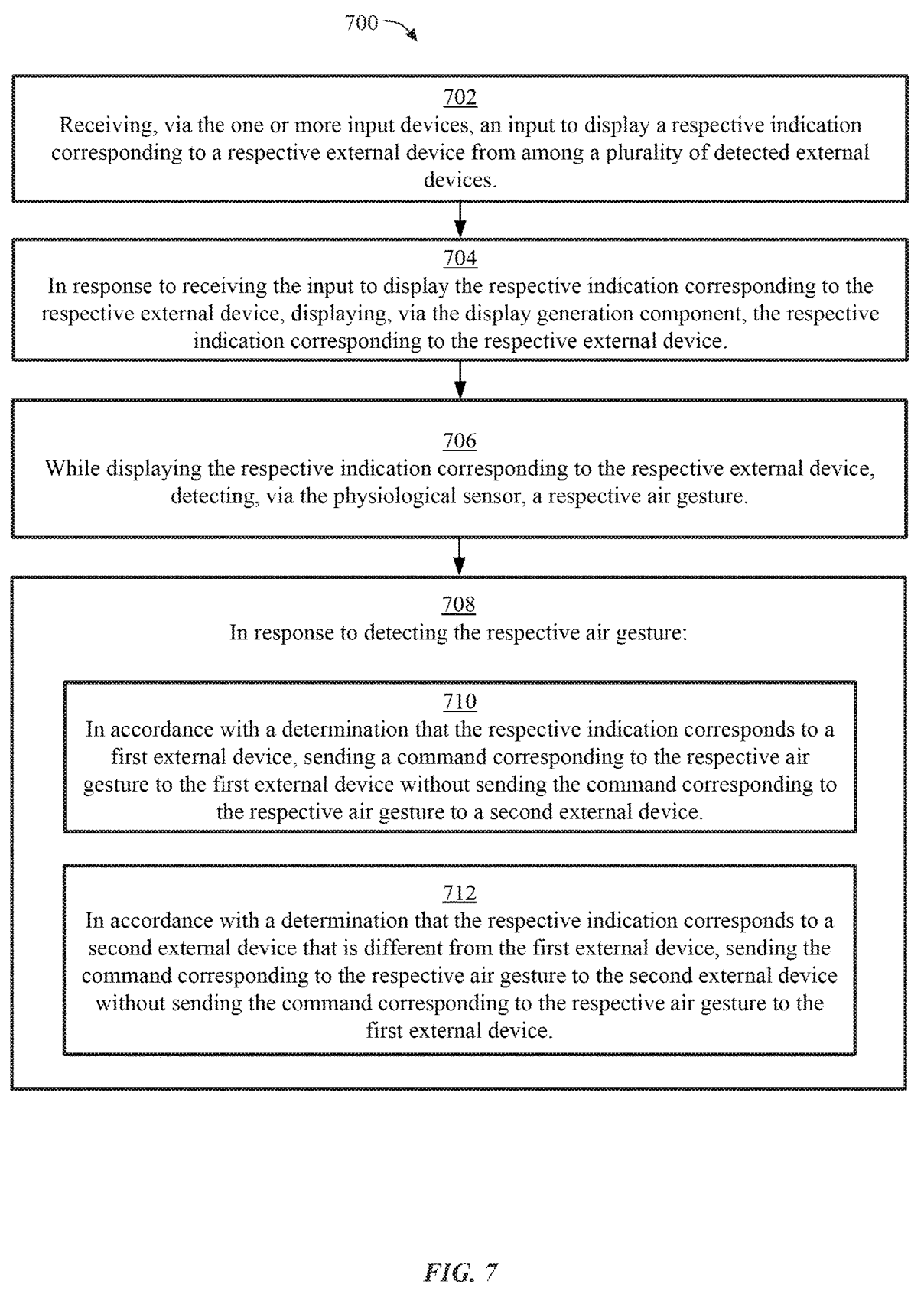

700

702
Receiving, via the one or more input devices, an input to display a respective indication corresponding to a respective external device from among a plurality of detected external devices.

704
In response to receiving the input to display the respective indication corresponding to the respective external device, displaying, via the display generation component, the respective indication corresponding to the respective external device.

706
While displaying the respective indication corresponding to the respective external device, detecting, via the physiological sensor, a respective air gesture.

708
In response to detecting the respective air gesture:

710
In accordance with a determination that the respective indication corresponds to a first external device, sending a command corresponding to the respective air gesture to the first external device without sending the command corresponding to the respective air gesture to a second external device.

712
In accordance with a determination that the respective indication corresponds to a second external device that is different from the first external device, sending the command corresponding to the respective air gesture to the second external device without sending the command corresponding to the respective air gesture to the first external device.

*FIG. 7*

902
During a dictation process:

904
Displaying, via the display generation component, a transcription of a first utterance of a user based on audio data detected by the one or more microphones of the first utterance.

906
In accordance with a determination that an air gesture of a first type is not being detected, via the one or more input devices, while the user is uttering a second utterance, displaying, via the display generation component, a transcription of the second utterance based on audio data detected by the one or more microphones of the second utterance.

908
In accordance with a determination that the air gesture of the first type is being detected, via the one or more input devices, while the user is uttering the second utterance, forgoing displaying a transcription of the second utterance.

Figure 11:
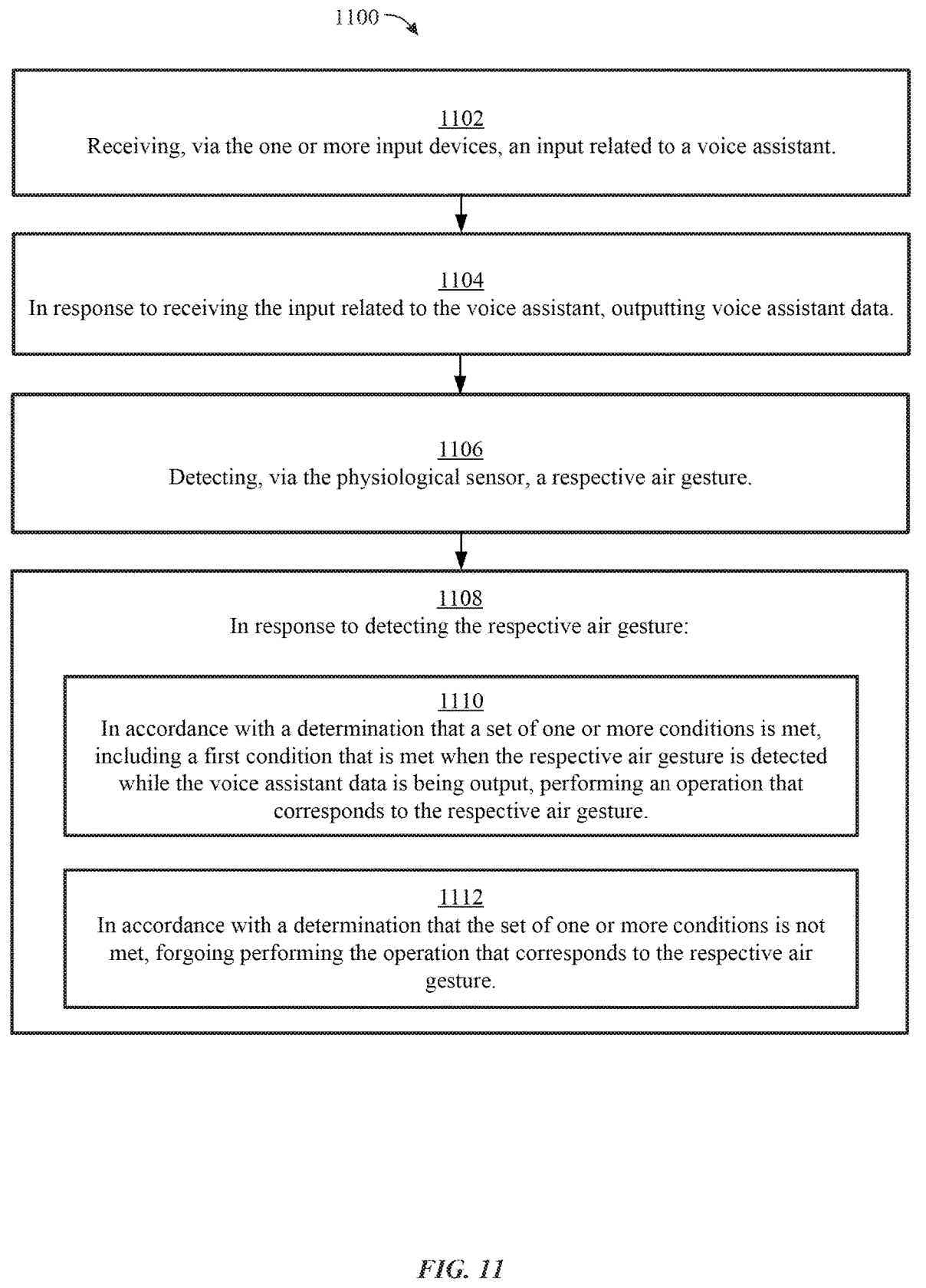

1102
Receiving, via the one or more input devices, an input related to a voice assistant.

1104
In response to receiving the input related to the voice assistant, outputting voice assistant data.

1106
Detecting, via the physiological sensor, a respective air gesture.

1108
In response to detecting the respective air gesture:

1110
In accordance with a determination that a set of one or more conditions is met, including a first condition that is met when the respective air gesture is detected while the voice assistant data is being output, performing an operation that corresponds to the respective air gesture.

1112
In accordance with a determination that the set of one or more conditions is not met, forgoing performing the operation that corresponds to the respective air gesture.

Figure 13:
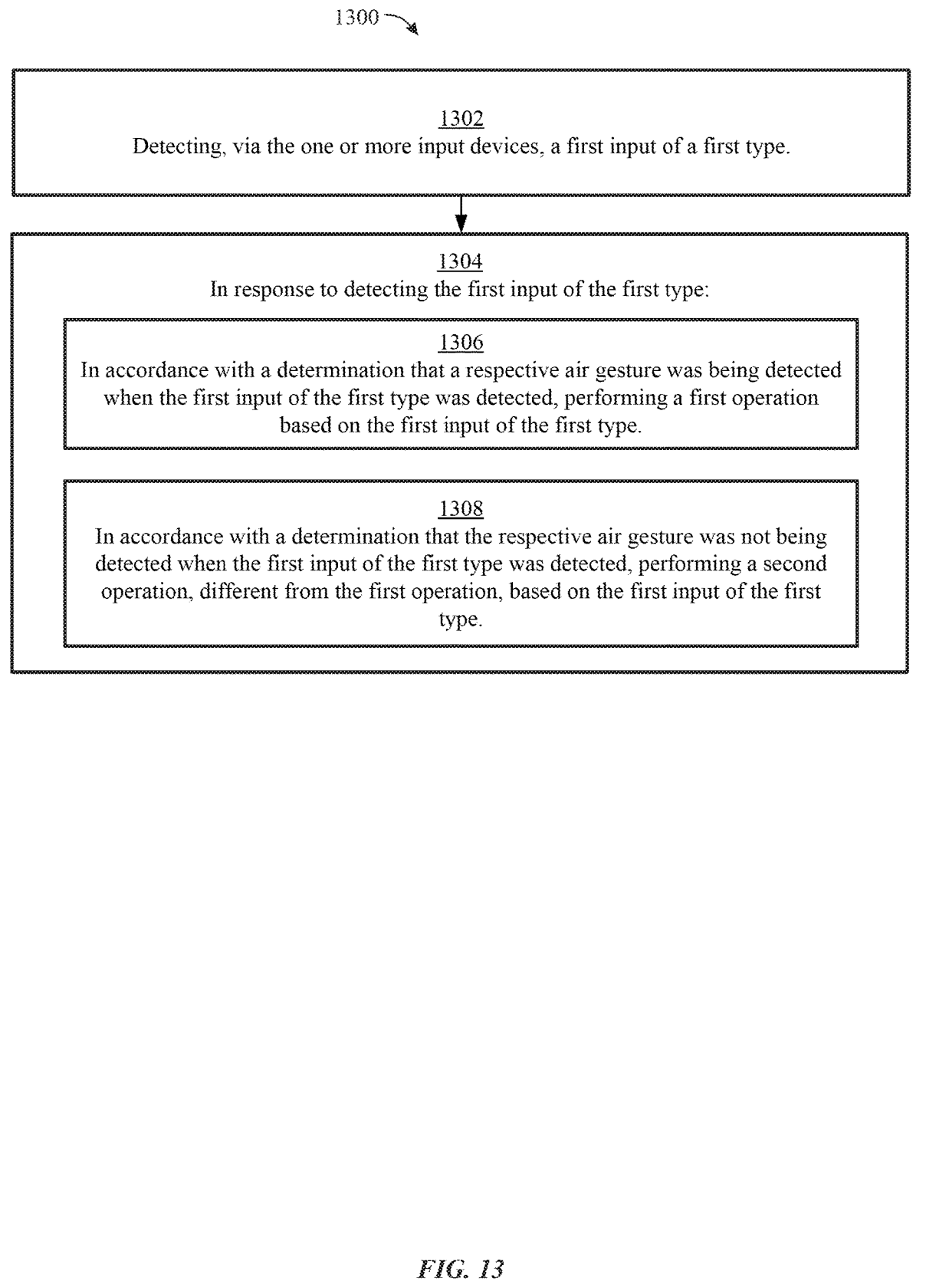

1302
Detecting, via the one or more input devices, a first input of a first type.

1304
In response to detecting the first input of the first type:

1306
In accordance with a determination that a respective air gesture was being detected when the first input of the first type was detected, performing a first operation based on the first input of the first type.

1308
In accordance with a determination that the respective air gesture was not being detected when the first input of the first type was detected, performing a second operation, different from the first operation, based on the first input of the first type.

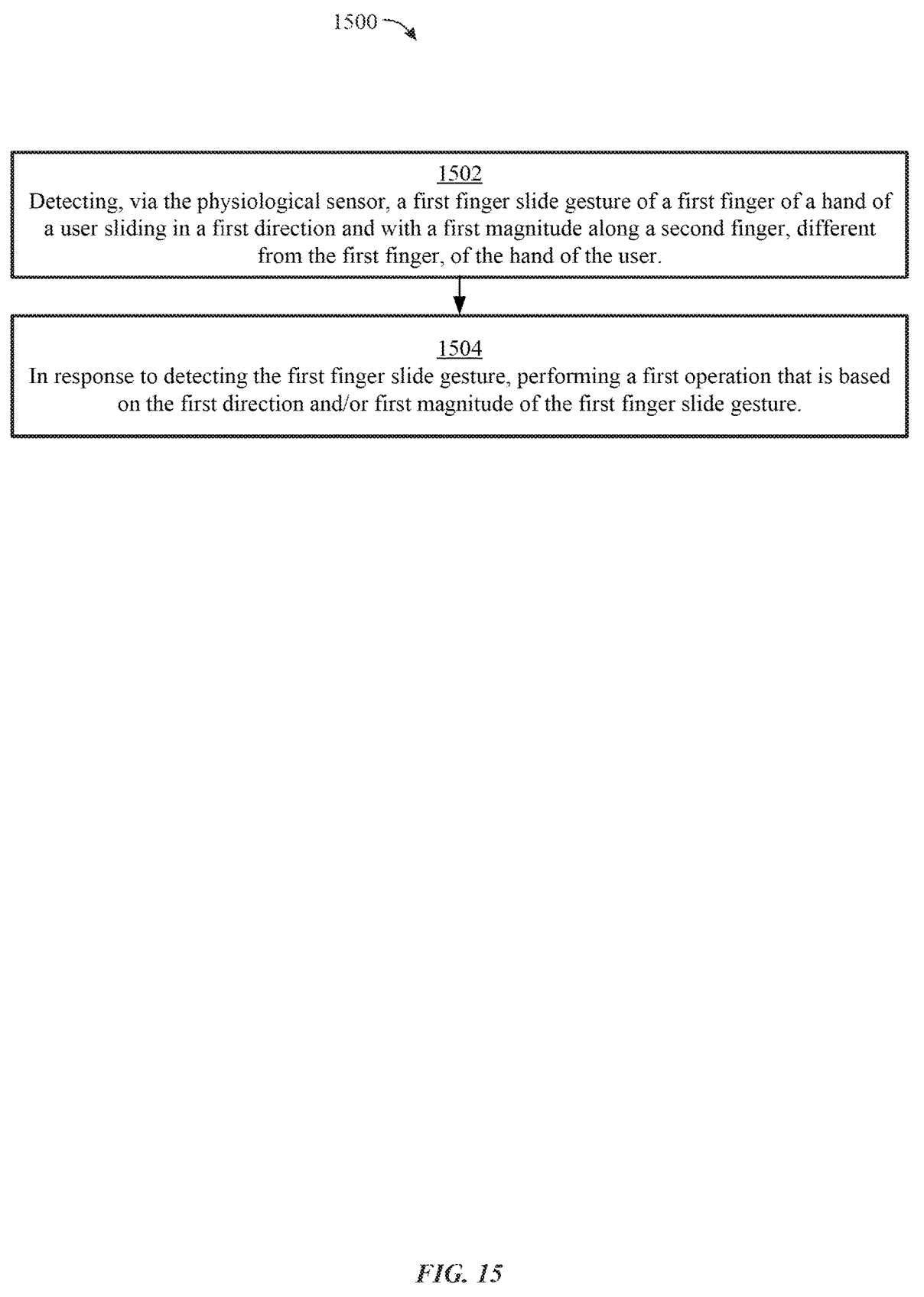

1502
Detecting, via the physiological sensor, a first finger slide gesture of a first finger of a hand of a user sliding in a first direction and with a first magnitude along a second finger, different from the first finger, of the hand of the user.

1504
In response to detecting the first finger slide gesture, performing a first operation that is based on the first direction and/or first magnitude of the first finger slide gesture.

*FIG. 15*

USER INTERFACES FOR GESTURE DETECTION

CROSS-REFERENCE TO RELATED APPLICATIONS

This application claims priority to U.S. Patent Application No. 63/464,515, entitled "USER INTERFACES FOR GESTURE DETECTION," filed on May 5, 2023, the content of which is hereby incorporated by reference in its entirety.

FIELD

The present disclosure relates generally to computer user interfaces, and more specifically to techniques for performing operations based on detected gestures.

BACKGROUND

Users provide inputs to computers to cause the computers to perform operations, such as modifying speaker volume or screen brightness. Some examples of input devices used to receive the user inputs include touch-sensitive surfaces, touchscreen displays, computer mice, keyboards, and microphones.

BRIEF SUMMARY

Some techniques for performing operations based on detected gestures using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for performing operations based on detected gestures. Such methods and interfaces optionally complement or replace other methods for performing operations based on detected gestures. Such methods and interfaces reduce the cognitive burden on a user and produce a more efficient human-machine interface. For battery-operated computing devices, such methods and interfaces conserve power and increase the time between battery charges.

A method is described. The method comprises: at a computer system that is in communication with a display generation component and one or more input devices that include a physiological sensor: receiving, via the one or more input devices, an input to display a respective indication corresponding to a respective external device from among a plurality of detected external devices; in response to receiving the input to display the respective indication corresponding to the respective external device, displaying, via the display generation component, the respective indication corresponding to the respective external device; while displaying the respective indication corresponding to the respective external device, detecting, via the physiological sensor, a respective air gesture; and in response to detecting the respective air gesture: in accordance with a determination that the respective indication corresponds to a first external device, sending a command corresponding to the respective air gesture to the first external device without sending the command corresponding to the respective air gesture to a second external device; and in accordance with a determination that the respective indication corresponds to a second external device that is different from the first external device, sending the command corresponding to the respective air gesture to the second external device without sending the command corresponding to the respective air gesture to the first external device.

A non-transitory computer-readable storage medium is described. The non-transitory computer-readable storage medium stores one or more programs configured to be executed by one or more processors of a computer system that is in communication with a display generation component and one or more input devices that include a physiological sensor, the one or more programs including instructions for: receiving, via the one or more input devices, an input to display a respective indication corresponding to a respective external device from among a plurality of detected external devices; in response to receiving the input to display the respective indication corresponding to the respective external device, displaying, via the display generation component, the respective indication corresponding to the respective external device; while displaying the respective indication corresponding to the respective external device, detecting, via the physiological sensor, a respective air gesture; and in response to detecting the respective air gesture: in accordance with a determination that the respective indication corresponds to a first external device, sending a command corresponding to the respective air gesture to the first external device without sending the command corresponding to the respective air gesture to a second external device; and in accordance with a determination that the respective indication corresponds to a second external device that is different from the first external device, sending the command corresponding to the respective air gesture to the second external device without sending the command corresponding to the respective air gesture to the first external device.

A transitory computer-readable storage medium is described. The transitory computer-readable storage medium stores one or more programs configured to be executed by one or more processors of a computer system that is in communication with a display generation component and one or more input devices that include a physiological sensor, the one or more programs including instructions for: receiving, via the one or more input devices, an input to display a respective indication corresponding to a respective external device from among a plurality of detected external devices; in response to receiving the input to display the respective indication corresponding to the respective external device, displaying, via the display generation component, the respective indication corresponding to the respective external device; while displaying the respective indication corresponding to the respective external device, detecting, via the physiological sensor, a respective air gesture; and in response to detecting the respective air gesture: in accordance with a determination that the respective indication corresponds to a first external device, sending a command corresponding to the respective air gesture to the first external device without sending the command corresponding to the respective air gesture to a second external device; and in accordance with a determination that the respective indication corresponds to a second external device that is different from the first external device, sending the command corresponding to the respective air gesture to the second external device without sending the command corresponding to the respective air gesture to the first external device.

A computer system is described. The computer system is configured to communicate with a display generation component and one or more input devices that include a physiological sensor. The computer system comprises: one or more processors; and memory storing one or more programs configured to be executed by the one or more processors, the one or more programs including instructions for: receiving, via the one or more input devices, an input to display a respective indication corresponding to a respective external device from among a plurality of detected external devices; in response to receiving the input to display the respective indication corresponding to the respective external device, displaying, via the display generation component, the respective indication corresponding to the respective external device; while displaying the respective indication corresponding to the respective external device, detecting, via the physiological sensor, a respective air gesture; and in response to detecting the respective air gesture: in accordance with a determination that the respective indication corresponds to a first external device, sending a command corresponding to the respective air gesture to the first external device without sending the command corresponding to the respective air gesture to a second external device; and in accordance with a determination that the respective indication corresponds to a second external device that is different from the first external device, sending the command corresponding to the respective air gesture to the second external device without sending the command corresponding to the respective air gesture to the first external device.

A computer system is described. The computer system is configured to communicate with a display generation component and one or more input devices that include a physiological sensor. The computer system comprises: means for receiving, via the one or more input devices, an input to display a respective indication corresponding to a respective external device from among a plurality of detected external devices; means, responsive to receiving the input to display the respective indication corresponding to the respective external device, for displaying, via the display generation component, the respective indication corresponding to the respective external device; means, while displaying the respective indication corresponding to the respective external device, for detecting, via the physiological sensor, a respective air gesture; and means, responsive to detecting the respective air gesture, for: in accordance with a determination that the respective indication corresponds to a first external device, sending a command corresponding to the respective air gesture to the first external device without sending the command corresponding to the respective air gesture to a second external device; and in accordance with a determination that the respective indication corresponds to a second external device that is different from the first external device, sending the command corresponding to the respective air gesture to the second external device without sending the command corresponding to the respective air gesture to the first external device.

A computer program product is described. The computer program product comprises one or more programs configured to be executed by one or more processors of a computer system that is in communication with a display generation component and one or more input devices that include a physiological sensor, the one or more programs including instructions for: receiving, via the one or more input devices, an input to display a respective indication corresponding to a respective external device from among a plurality of detected external devices; in response to receiving the input to display the respective indication corresponding to the respective external device, displaying, via the display generation component, the respective indication corresponding to the respective external device; while displaying the respective indication corresponding to the respective external device, detecting, via the physiological sensor, a respective air gesture; and in response to detecting the respective air gesture: in accordance with a determination that the respective indication corresponds to a first external device, sending a command corresponding to the respective air gesture to the first external device without sending the command corresponding to the respective air gesture to a second external device; and in accordance with a determination that the respective indication corresponds to a second external device that is different from the first external device, sending the command corresponding to the respective air gesture to the second external device without sending the command corresponding to the respective air gesture to the first external device.

A method is described. The method comprises: at a computer system that is in communication with a display generation component and one or more input devices that include one or more microphones: during a dictation process: displaying, via the display generation component, a transcription of a first utterance of a user based on audio data detected by the one or more microphones of the first utterance; in accordance with a determination that an air gesture of a first type is not being detected, via the one or more input devices, while the user is uttering a second utterance, displaying, via the display generation component, a transcription of the second utterance based on audio data detected by the one or more microphones of the second utterance; and in accordance with a determination that the air gesture of the first type is being detected, via the one or more input devices, while the user is uttering the second utterance, forgoing displaying a transcription of the second utterance.

A non-transitory computer-readable storage medium is described. The non-transitory computer-readable storage medium stores one or more programs configured to be executed by one or more processors of a computer system that is in communication with a display generation component and one or more input devices that include a physiological sensor, the one or more programs including instructions for: during a dictation process: displaying, via the display generation component, a transcription of a first utterance of a user based on audio data detected by the one or more microphones of the first utterance; in accordance with a determination that an air gesture of a first type is not being detected, via the one or more input devices, while the user is uttering a second utterance, displaying, via the display generation component, a transcription of the second utterance based on audio data detected by the one or more microphones of the second utterance; and in accordance with a determination that the air gesture of the first type is being detected, via the one or more input devices, while the user is uttering the second utterance, forgoing displaying a transcription of the second utterance.

A transitory computer-readable storage medium is described. The transitory computer-readable storage medium stores one or more programs configured to be executed by one or more processors of a computer system that is in communication with a display generation component and one or more input devices that include a physiological sensor, the one or more programs including instructions for: during a dictation process: displaying, via the display generation component, a transcription of a first utterance of a user based on audio data detected by the one or more microphones of the first utterance; in accordance with a determination that an air gesture of a first type is not being detected, via the one or more input devices, while the user is uttering a second utterance, displaying, via the display generation component, a transcription of the second utterance based on audio data detected by the one or more microphones of the second utterance; and in accordance with a determination that the air gesture of the first type is being detected, via the one or more input devices, while the user is uttering the second utterance, forgoing displaying a transcription of the second utterance.

A computer system is described. The computer system is configured to communicate with a display generation component and one or more input devices that include one or more microphones. The computer system comprises: one or more processors; and memory storing one or more programs configured to be executed by the one or more processors, the one or more programs including instructions for: during a dictation process: displaying, via the display generation component, a transcription of a first utterance of a user based on audio data detected by the one or more microphones of the first utterance; in accordance with a determination that an air gesture of a first type is not being detected, via the one or more input devices, while the user is uttering a second utterance, displaying, via the display generation component, a transcription of the second utterance based on audio data detected by the one or more microphones of the second utterance; and in accordance with a determination that the air gesture of the first type is being detected, via the one or more input devices, while the user is uttering the second utterance, forgoing displaying a transcription of the second utterance.

A computer system is described. The computer system is configured to communicate with a display generation component and one or more input devices that include one or more microphones. The computer system comprises: means, during a dictation process, for: displaying, via the display generation component, a transcription of a first utterance of a user based on audio data detected by the one or more microphones of the first utterance; in accordance with a determination that an air gesture of a first type is not being detected, via the one or more input devices, while the user is uttering a second utterance, displaying, via the display generation component, a transcription of the second utterance based on audio data detected by the one or more microphones of the second utterance; and in accordance with a determination that the air gesture of the first type is being detected, via the one or more input devices, while the user is uttering the second utterance, forgoing displaying a transcription of the second utterance.

A computer program product is described. The computer program product comprises one or more programs configured to be executed by one or more processors of a computer system that is in communication with a display generation component and one or more input devices that include one or more microphones, the one or more programs including instructions for: during a dictation process: displaying, via the display generation component, a transcription of a first utterance of a user based on audio data detected by the one or more microphones of the first utterance; in accordance with a determination that an air gesture of a first type is not being detected, via the one or more input devices, while the user is uttering a second utterance, displaying, via the display generation component, a transcription of the second utterance based on audio data detected by the one or more microphones of the second utterance; and in accordance with a determination that the air gesture of the first type is being detected, via the one or more input devices, while the user is uttering the second utterance, forgoing displaying a transcription of the second utterance.

A method is described. The method comprises: at a computer system that is in communication with one or more input devices that include a physiological sensor: receiving, via the one or more input devices, an input related to a voice assistant; in response to receiving the input related to the voice assistant, outputting voice assistant data; detecting, via the physiological sensor, a respective air gesture; and in response to detecting the respective air gesture: in accordance with a determination that a set of one or more conditions is met, including a first condition that is met when the respective air gesture is detected while the voice assistant data is being output, performing an operation that corresponds to the respective air gesture; and in accordance with a determination that the set of one or more conditions is not met, forgoing performing the operation that corresponds to the respective air gesture.

A non-transitory computer-readable storage medium is described. The non-transitory computer-readable storage medium stores one or more programs configured to be executed by one or more processors of a computer system that is in communication with one or more input devices that include a physiological sensor, the one or more programs including instructions for: receiving, via the one or more input devices, an input related to a voice assistant; in response to receiving the input related to the voice assistant, outputting voice assistant data; detecting, via the physiological sensor, a respective air gesture; and in response to detecting the respective air gesture: in accordance with a determination that a set of one or more conditions is met, including a first condition that is met when the respective air gesture is detected while the voice assistant data is being output, performing an operation that corresponds to the respective air gesture; and in accordance with a determination that the set of one or more conditions is not met, forgoing performing the operation that corresponds to the respective air gesture.

A transitory computer-readable storage medium is described. The transitory computer-readable storage medium stores one or more programs configured to be executed by one or more processors of a computer system that is in communication with one or more input devices that include a physiological sensor, the one or more programs including instructions for: receiving, via the one or more input devices, an input related to a voice assistant; in response to receiving the input related to the voice assistant, outputting voice assistant data; detecting, via the physiological sensor, a respective air gesture; and in response to detecting the respective air gesture: in accordance with a determination that a set of one or more conditions is met, including a first condition that is met when the respective air gesture is detected while the voice assistant data is being output, performing an operation that corresponds to the respective air gesture; and in accordance with a determination that the set of one or more conditions is not met, forgoing performing the operation that corresponds to the respective air gesture.

A computer system is described. The computer system is configured to communicate with one or more input devices that include a physiological sensor. The computer system comprises: one or more processors; and memory storing one or more programs configured to be executed by the one or more processors, the one or more programs including instructions for: receiving, via the one or more input devices, an input related to a voice assistant; in response to receiving the input related to the voice assistant, outputting voice assistant data; detecting, via the physiological sensor, a respective air gesture; and in response to detecting the respective air gesture: in accordance with a determination that a set of one or more conditions is met, including a first condition that is met when the respective air gesture is detected while the voice assistant data is being output, performing an operation that corresponds to the respective air gesture; and in accordance with a determination that the set of one or more conditions is not met, forgoing performing the operation that corresponds to the respective air gesture.

A computer system is described. The computer system is configured to communicate with one or more input devices that include a physiological sensor. The computer system comprises: means for receiving, via the one or more input devices, an input related to a voice assistant; means, responsive to receiving the input related to the voice assistant, for outputting voice assistant data; means for detecting, via the physiological sensor, a respective air gesture; and means, responsive to detecting the respective air gesture, for: in accordance with a determination that a set of one or more conditions is met, including a first condition that is met when the respective air gesture is detected while the voice assistant data is being output, performing an operation that corresponds to the respective air gesture; and in accordance with a determination that the set of one or more conditions is not met, forgoing performing the operation that corresponds to the respective air gesture.

A computer program product is described. The computer program product comprises one or more programs configured to be executed by one or more processors of a computer system that is in communication with one or more input devices that include a physiological sensor, the one or more programs including instructions for: receiving, via the one or more input devices, an input related to a voice assistant; in response to receiving the input related to the voice assistant, outputting voice assistant data; detecting, via the physiological sensor, a respective air gesture; and in response to detecting the respective air gesture: in accordance with a determination that a set of one or more conditions is met, including a first condition that is met when the respective air gesture is detected while the voice assistant data is being output, performing an operation that corresponds to the respective air gesture; and in accordance with a determination that the set of one or more conditions is not met, forgoing performing the operation that corresponds to the respective air gesture.

A method is described. The method comprises: at a computer system that is in communication with one or more input devices: detecting, via the one or more input devices, a first input of a first type; and in response to detecting the first input of the first type: in accordance with a determination that a respective air gesture was being detected when the first input of the first type was detected, performing a first operation based on the first input of the first type; and in accordance with a determination that the respective air gesture was not being detected when the first input of the first type was detected, performing a second operation, different from the first operation, based on the first input of the first type.

A non-transitory computer-readable storage medium is described. The non-transitory computer-readable storage medium stores one or more programs configured to be executed by one or more processors of a computer system that is in communication with one or more input devices, the one or more programs including instructions for: detecting, via the one or more input devices, a first input of a first type; and in response to detecting the first input of the first type: in accordance with a determination that a respective air gesture was being detected when the first input of the first type was detected, performing a first operation based on the first input of the first type; and in accordance with a determination that the respective air gesture was not being detected when the first input of the first type was detected, performing a second operation, different from the first operation, based on the first input of the first type.

A transitory computer-readable storage medium is described. The transitory computer-readable storage medium stores one or more programs configured to be executed by one or more processors of a computer system that is in communication with one or more input devices, the one or more programs including instructions for: detecting, via the one or more input devices, a first input of a first type; and in response to detecting the first input of the first type: in accordance with a determination that a respective air gesture was being detected when the first input of the first type was detected, performing a first operation based on the first input of the first type; and in accordance with a determination that the respective air gesture was not being detected when the first input of the first type was detected, performing a second operation, different from the first operation, based on the first input of the first type.

A computer system is described. The computer system is configured to communicate with one or more input devices. The computer system comprises: one or more processors; and memory storing one or more programs configured to be executed by the one or more processors, the one or more programs including instructions for: detecting, via the one or more input devices, a first input of a first type; and in response to detecting the first input of the first type: in accordance with a determination that a respective air gesture was being detected when the first input of the first type was detected, performing a first operation based on the first input of the first type; and in accordance with a determination that the respective air gesture was not being detected when the first input of the first type was detected, performing a second operation, different from the first operation, based on the first input of the first type.

A computer system is described. The computer system is configured to communicate with one or more input devices. The computer system comprises: means for detecting, via the one or more input devices, a first input of a first type; and means, responsive to detecting the first input of the first type, for: in accordance with a determination that a respective air gesture was being detected when the first input of the first type was detected, performing a first operation based on the first input of the first type; and in accordance with a determination that the respective air gesture was not being detected when the first input of the first type was detected, performing a second operation, different from the first operation, based on the first input of the first type.

A computer program product is described. The compute program product comprises one or more programs configured to be executed by one or more processors of a computer system that is in communication with one or more input devices, the one or more programs including instructions for: detecting, via the one or more input devices, a first input of a first type; and in response to detecting the first input of the first type: in accordance with a determination that a respective air gesture was being detected when the first input of the first type was detected, performing a first operation based on the first input of the first type; and in accordance with a determination that the respective air gesture was not being detected when the first input of the first type was detected, performing a second operation, different from the first operation, based on the first input of the first type.

A method is described. The method comprises: at a computer system that is in communication with one or more input devices that include a physiological sensor: detecting, via the physiological sensor, a first finger slide gesture of a first finger of a hand of a user sliding in a first direction and with a first magnitude along a second finger, different from the first finger, of the hand of the user; and in response to detecting the first finger slide gesture, performing a first operation that is based on the first direction and/or first magnitude of the first finger slide gesture.

A non-transitory computer-readable storage medium is described. The non-transitory computer-readable storage medium stores one or more programs configured to be executed by one or more processors of a computer system that is in communication with one or more input devices that include a physiological sensor, the one or more programs including instructions for: detecting, via the physiological sensor, a first finger slide gesture of a first finger of a hand of a user sliding in a first direction and with a first magnitude along a second finger, different from the first finger, of the hand of the user; and in response to detecting the first finger slide gesture, performing a first operation that is based on the first direction and/or first magnitude of the first finger slide gesture.

A transitory computer-readable storage medium is described. The transitory computer-readable storage medium stores one or more programs configured to be executed by one or more processors of a computer system that is in communication with one or more input devices that include a physiological sensor, the one or more programs including instructions for: detecting, via the physiological sensor, a first finger slide gesture of a first finger of a hand of a user sliding in a first direction and with a first magnitude along a second finger, different from the first finger, of the hand of the user; and in response to detecting the first finger slide gesture, performing a first operation that is based on the first direction and/or first magnitude of the first finger slide gesture.

A computer system is described. The computer system is configured to communicate with one or more input devices that include a physiological sensor. The computer system comprises: one or more processors; and memory storing one or more programs configured to be executed by the one or more processors, the one or more programs including instructions for: detecting, via the physiological sensor, a first finger slide gesture of a first finger of a hand of a user sliding in a first direction and with a first magnitude along a second finger, different from the first finger, of the hand of the user; and in response to detecting the first finger slide gesture, performing a first operation that is based on the first direction and/or first magnitude of the first finger slide gesture.

A computer system is described. The computer system is configured to communicate with one or more input devices that include a physiological sensor. The computer system comprises: means for detecting, via the physiological sensor, a first finger slide gesture of a first finger of a hand of a user sliding in a first direction and with a first magnitude along a second finger, different from the first finger, of the hand of the user; and means, responsive to detecting the first finger slide gesture, for performing a first operation that is based on the first direction and/or first magnitude of the first finger slide gesture.

A computer program product is described. The computer program product comprises one or more programs configured to be executed by one or more processors of a computer system that is in communication with one or more input devices that include a physiological sensor, the one or more programs including instructions for: detecting, via the physiological sensor, a first finger slide gesture of a first finger of a hand of a user sliding in a first direction and with a first magnitude along a second finger, different from the first finger, of the hand of the user; and in response to detecting the first finger slide gesture, performing a first operation that is based on the first direction and/or first magnitude of the first finger slide gesture.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for performing operations based on detected gestures, thereby increasing the effectiveness, efficiency, and user satisfaction with such devices. Such methods and interfaces may complement or replace other methods for performing operations based on detected gestures.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram illustrating methods of controlling external devices, in accordance with some embodiments.

FIG. 9 is a flow diagram illustrating methods of managing audio dictation, in accordance with some embodiments.

FIG. 11 is a flow diagram illustrating methods of activating a displayed option, in accordance with some embodiments.

FIG. 13 is a flow diagram illustrating methods of using a gesture to change a mode of operation, in accordance with some embodiments.

FIG. 15 is a flow diagram illustrating methods of performing operations based on a direction and/or magnitude of a gesture, in accordance with some embodiments.

DESCRIPTION OF EMBODIMENTS

Figure 1A:
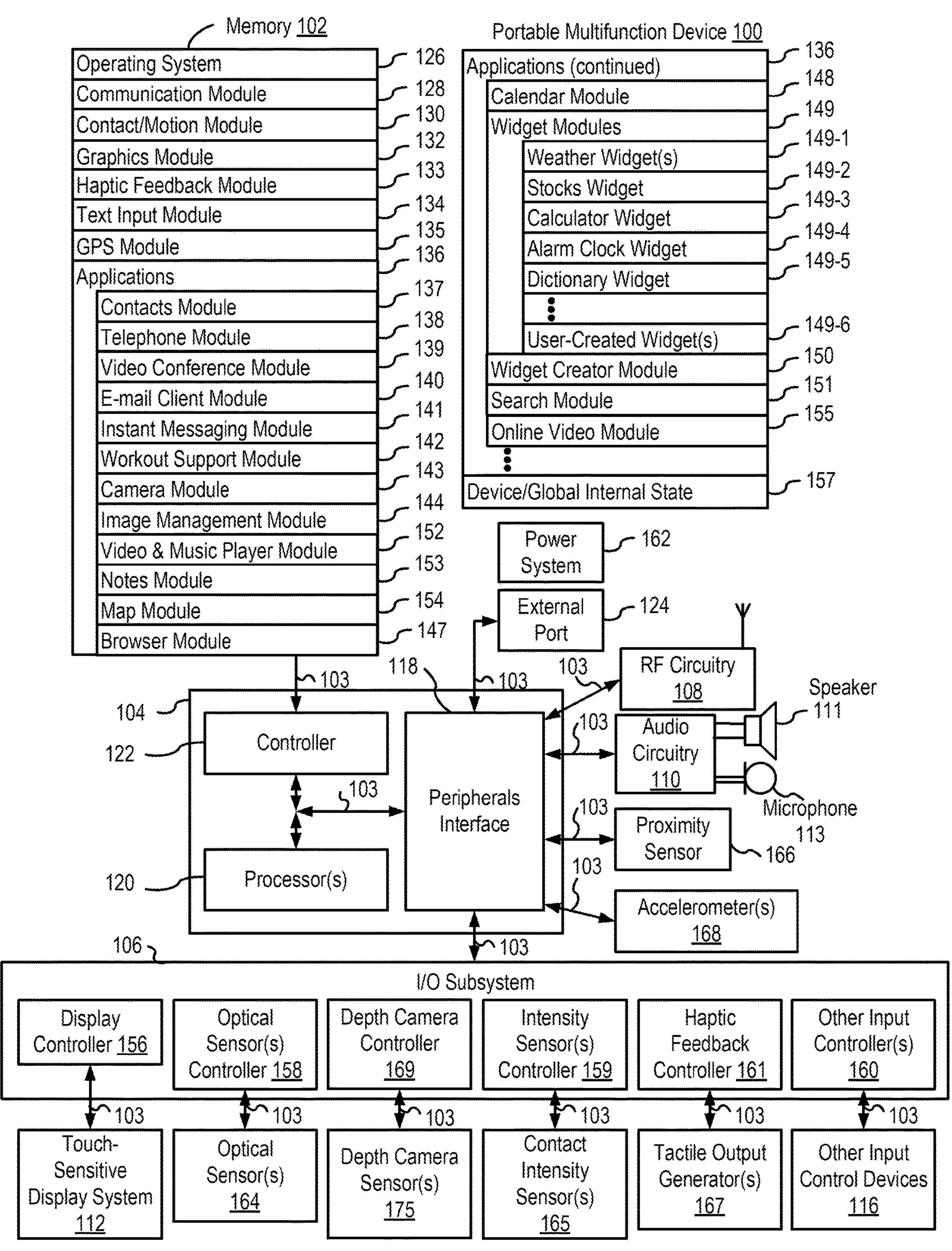
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for performing operations based on detected gestures. Such techniques can reduce the cognitive burden on a user who provide inputs on electronic devices to perform operations, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing operations based on detected gestures. FIGS. 6A-6I illustrate exemplary user interfaces for controlling external devices, in accordance with some embodiments. FIG. 7 is a flow diagram illustrating methods of controlling external devices, in accordance with some embodiments. The user interfaces in FIGS. 6A-6I are used to illustrate the processes described below, including the processes in FIG. 7. FIGS. 8A-8F illustrate exemplary user interfaces for managing audio dictation, in accordance with some embodiments. FIG. 9 is a flow diagram illustrating methods of managing audio dictation, in accordance with some embodiments. The user interfaces in FIGS. 8A-8F are used to illustrate the processes described below, including the processes in FIG. 9. FIGS. 10A-10E illustrate exemplary user interfaces for activating a displayed option, in accordance with some embodiments. FIG. 11 is a flow diagram illustrating methods of activating a displayed option, in accordance with some embodiments. The user interfaces in FIGS. 10A-10E are used to illustrate the processes described below, including the processes in FIG. 11. FIGS. 12A-12E illustrate exemplary user interfaces for using a gesture to change a mode of operation, in accordance with some embodiments. FIG. 13 is a flow diagram illustrating methods of using a gesture to change a mode of operation, in accordance with some embodiments. The user interfaces in FIGS. 12A-12E are used to illustrate the processes described below, including the processes in FIG. 13. FIGS. 14A-14L illustrate exemplary user interfaces for performing operations based on a direction and/or magnitude of a gesture, in accordance with some embodiments. FIG. 15 is a flow diagram illustrating methods of performing operations based on a direction and/or magnitude of a gesture, in accordance with some embodiments. The user interfaces in FIGS. 14A-14L are used to illustrate the processes described below, including the processes in FIG. 15.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both cars) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system.

In some embodiments, a gesture (e.g., a motion gesture) includes an air gesture. In some embodiments, input gestures (e.g., motion gestures) used in the various examples and embodiments described herein include air gestures performed by movement of the user's finger(s) relative to other finger(s) (or part(s) of the user's hand) for interacting with a computer system, in some embodiments. In some embodiments, an air gesture is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body). In some embodiments, the motion of the portion(s) of the user's body is not directly detected and is inferred from measurements/data from one or more sensors (e.g., one or more accelerometers, one or more gyroscopes, an inertial measurement unit (IMU), one or more visual sensors, one or more muscle sensors, one or more electromyography sensors, and/or one or more electrical impulse sensors).

In some embodiments, input gestures (e.g., air gestures) used in the various examples and embodiments described herein include pinch inputs and tap inputs, for interacting with a computer system, in some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture (optionally referred to as a pinch air gesture) includes movement of two or more fingers of a hand to make contact with one another, that is, optionally, followed by an immediate (e.g., within 0-1 seconds) break in contact from each other. In some embodiments, the contact of the portions of the user's body (e.g., two or more fingers) is not directly detected and is inferred from measurements/data from one or more sensors (one or more accelerometers, one or more gyroscopes, an inertial measurement unit (IMU), one or more visual sensors, one or more muscle sensors, one or more electromyography sensors, and/or one or more electrical impulse sensors). A long pinch gesture that is an air gesture (optionally referred to as a pinch-and-hold air gesture or a long pinch air gesture) includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture (optionally referred to as a double-pinch air gesture) comprises two (e.g., or more) pinch inputs (e.g., performed by the same hand) detected in immediate (e.g., within a predefined time period, such as 1 second or 2 seconds) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
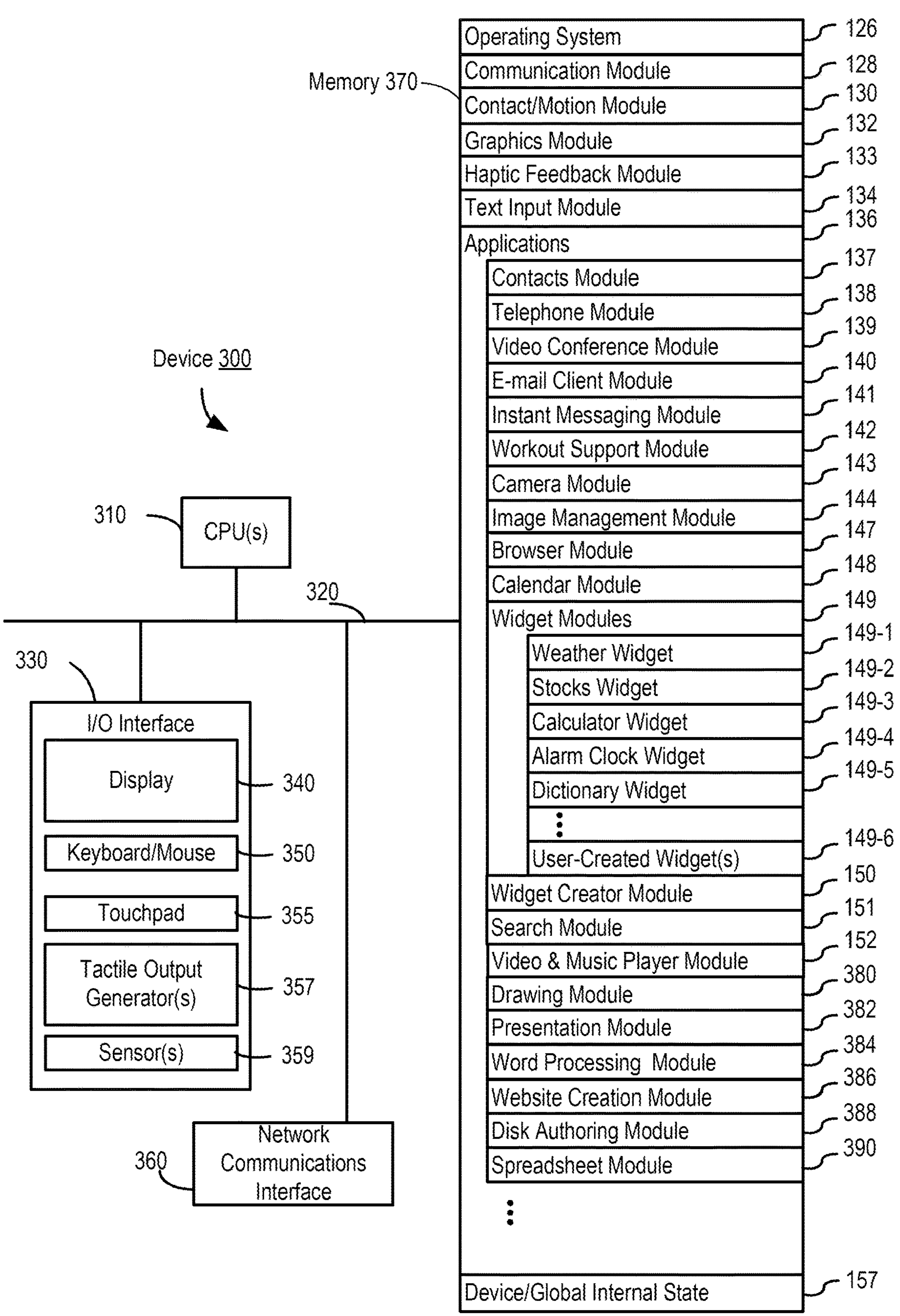
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
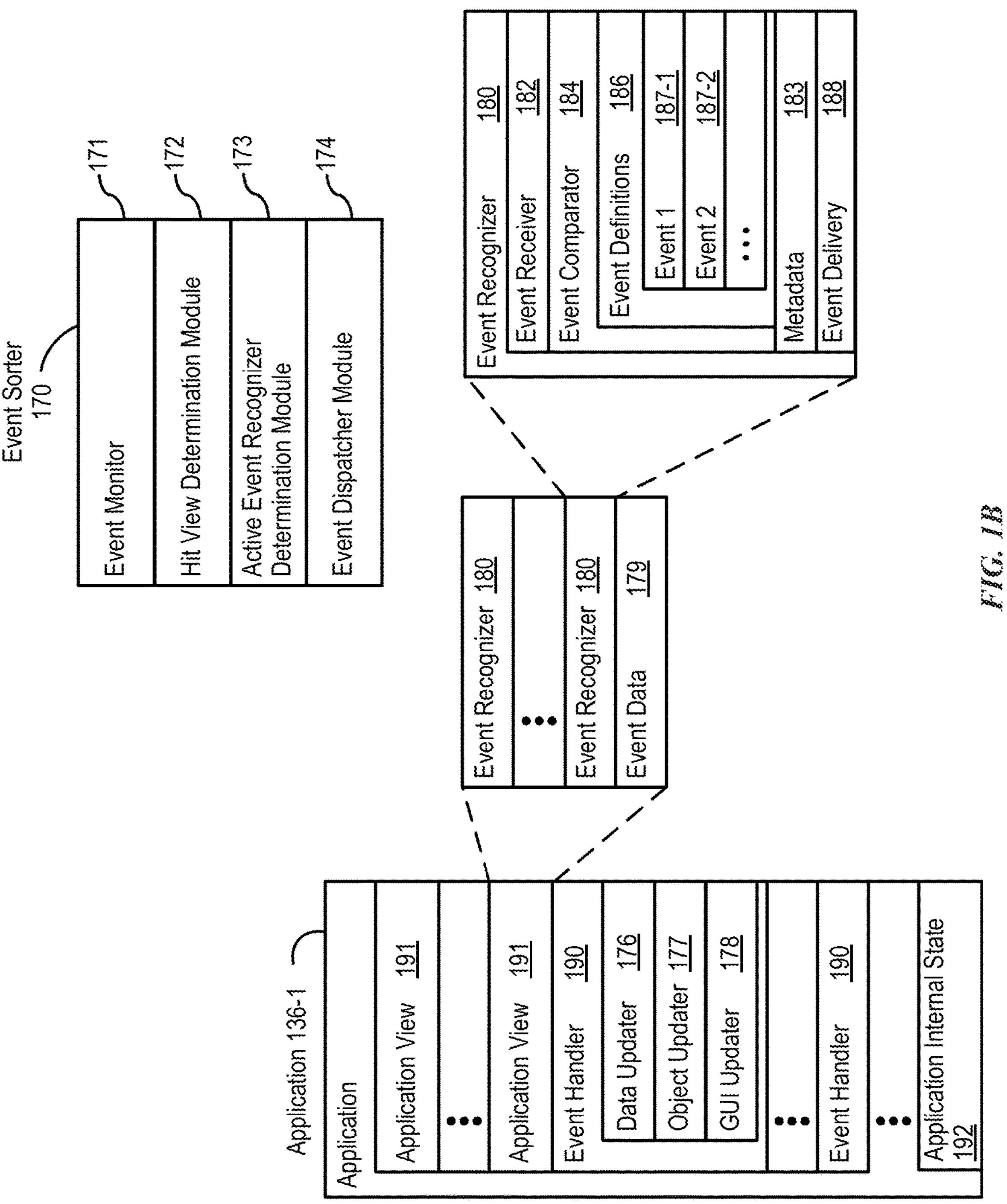
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
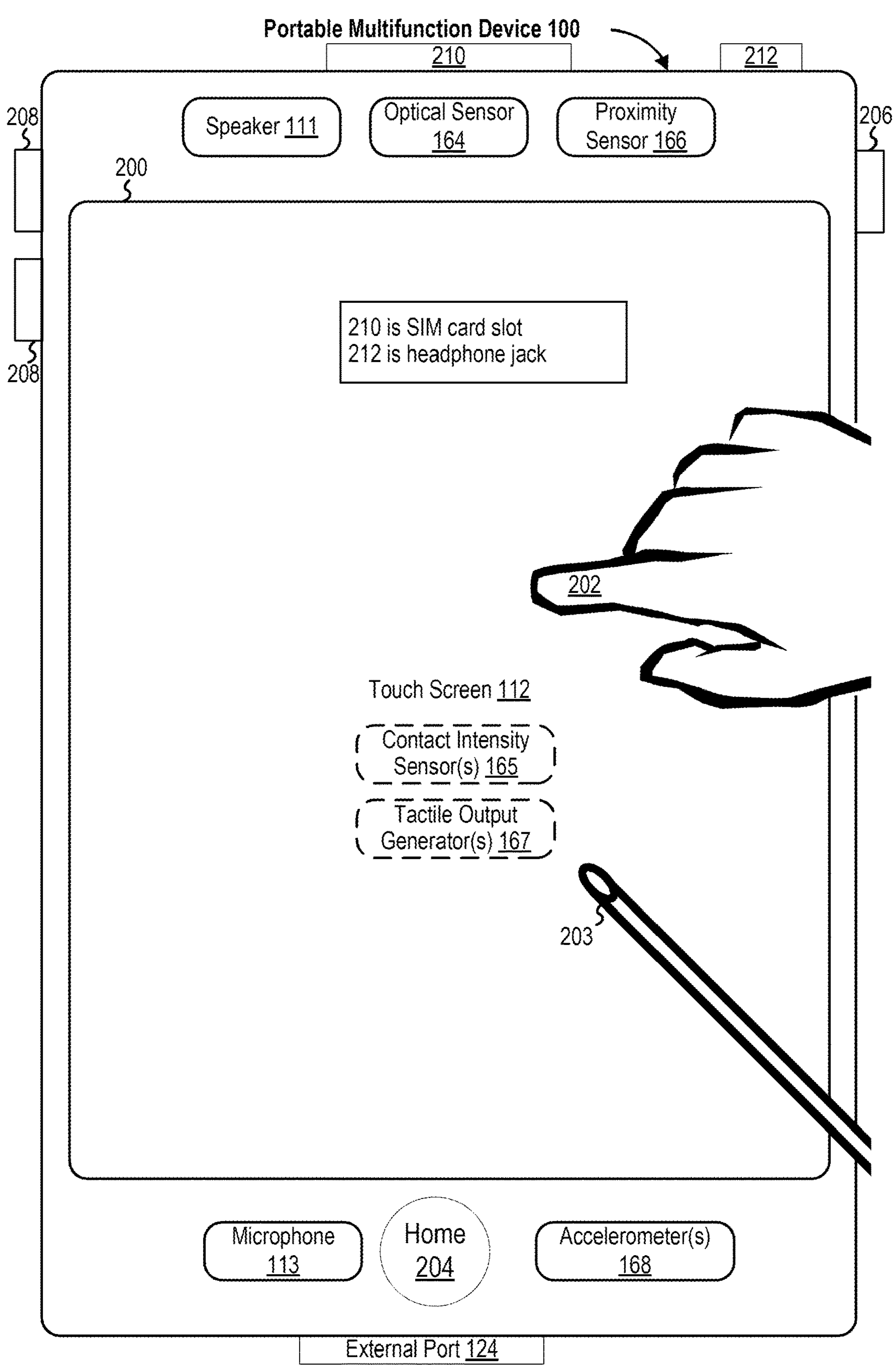
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device

100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
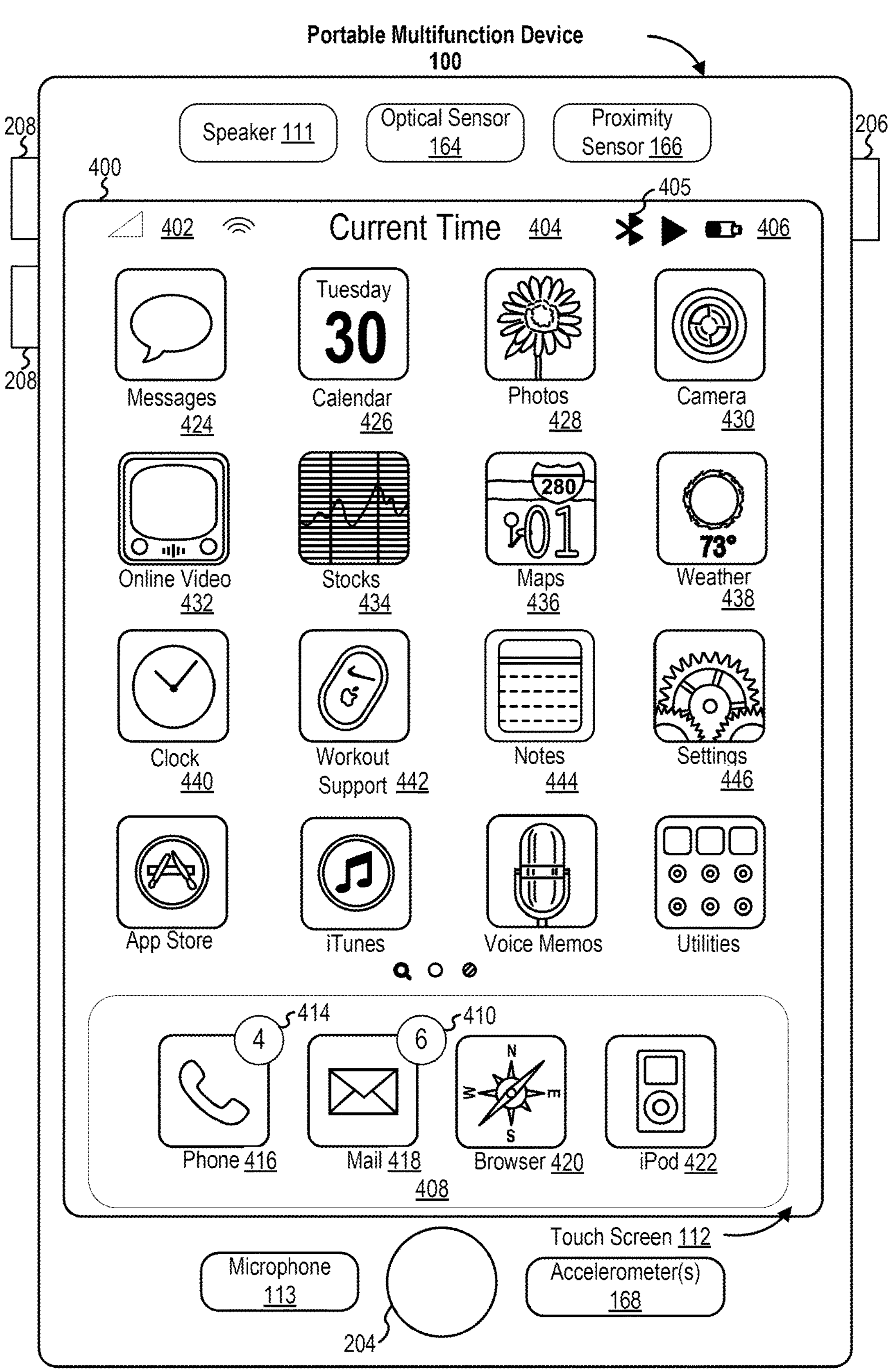
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., contacts 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
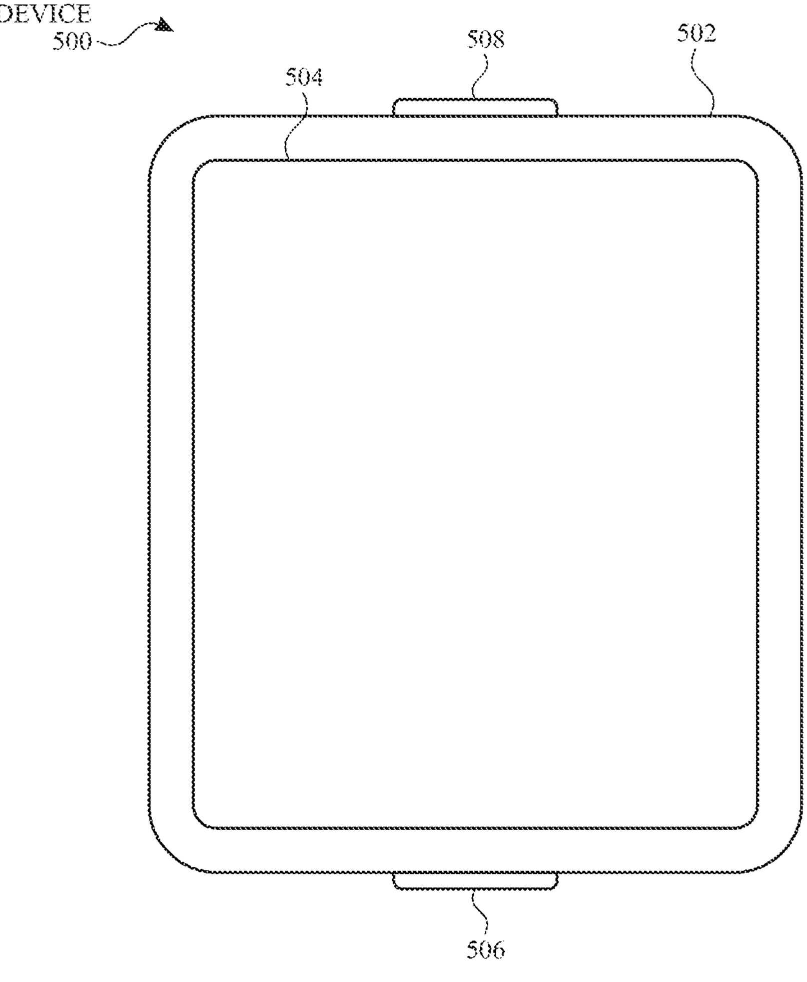
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
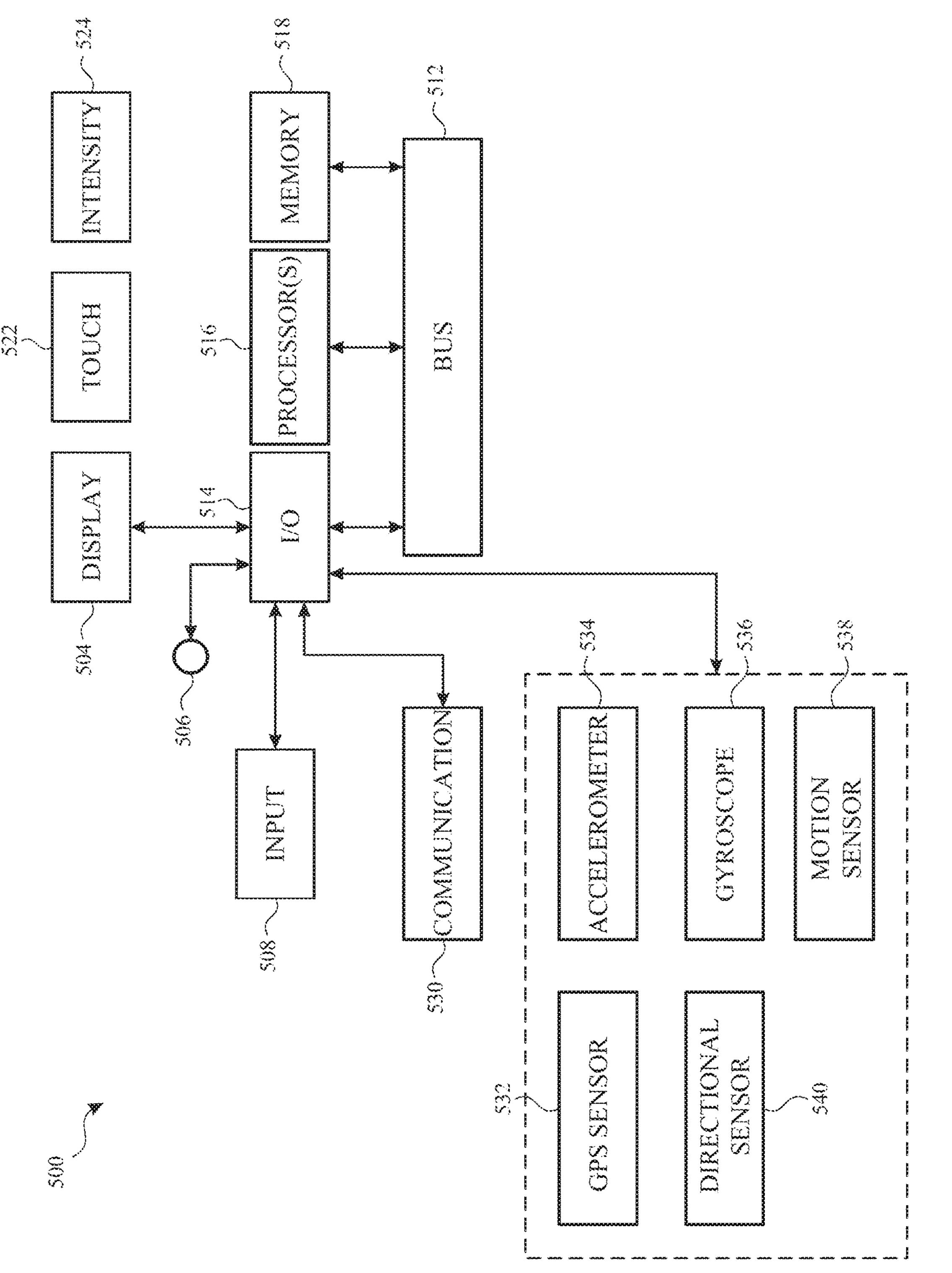
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 (FIG. 7), 900 (FIG. 9), 1100 (FIG. 11), 1300 (FIG. 13), and 1500 (FIG. 15). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6I illustrate exemplary user interfaces for controlling external devices, in accordance with some embodiments. The user interfaces in these figures are used to illustrate the processes described below, including the processes in FIG. 7.

Figure 6A:
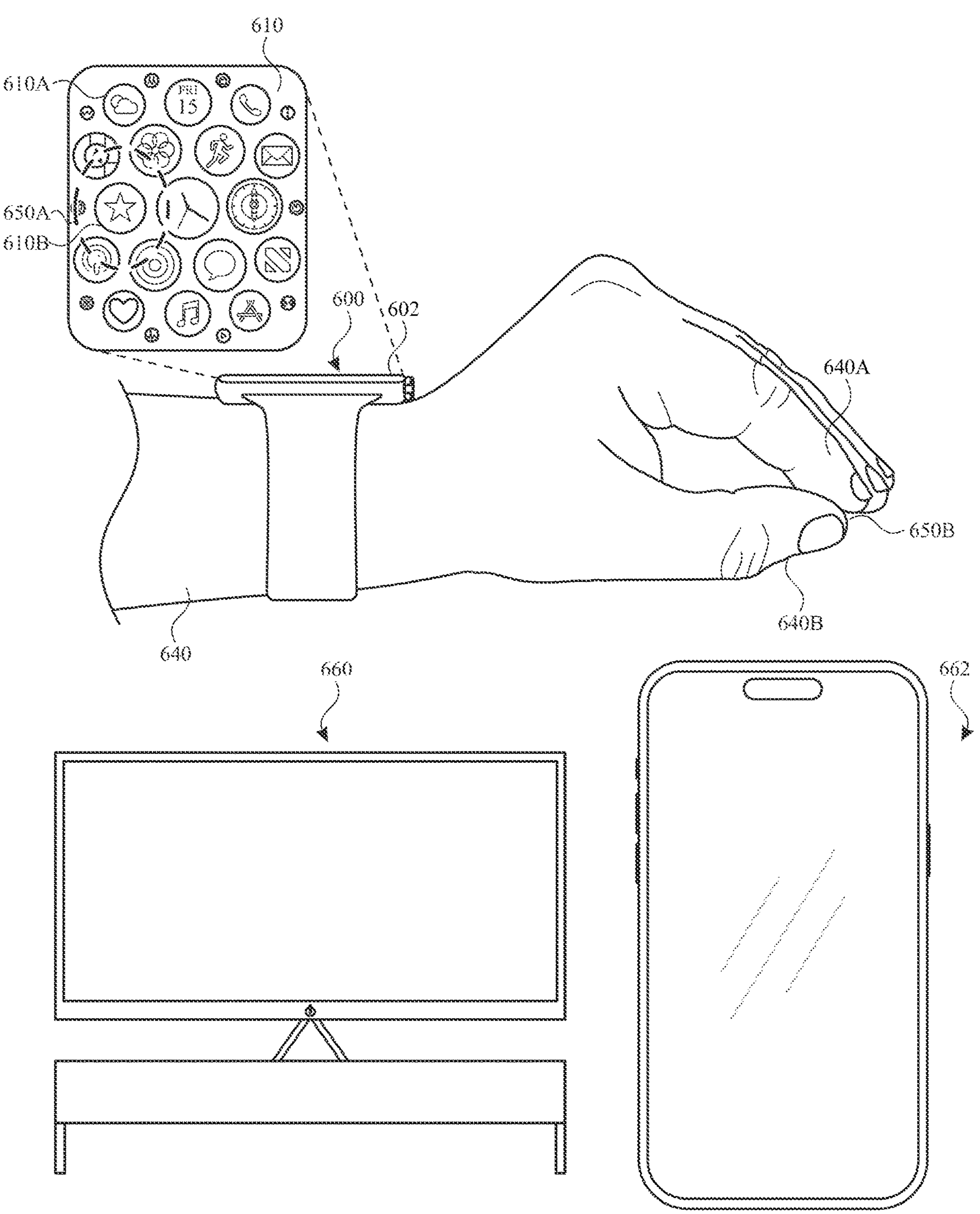
FIGS. 6A-6I illustrate exemplary user interfaces for controlling external devices, in accordance with some embodiments.

FIG. 6A illustrates computer system 600 (e.g., a smartwatch) that is worn on a wrist of a hand 640 (e.g., left hand) of a user of computer system 600. Computer system 600 includes a plurality of input devices, such as a gyroscope, an accelerometer, touchscreen 602, and one or more physiological sensors. In some embodiments, the one or more physiological sensors include a blood pressure sensor, a heart rate sensor, and/or an electromyography (EMG) sensor. In some embodiments, the EMG sensor (e.g., a surface EMG sensor) measures electrical activity and/or muscle response by sensing electromyographic signals generated by a user's muscles as the muscles are moved. In some embodiments, the EMG sensor senses and/or measures electrical impulses generated when a user's muscles contract. In some embodiments, computer system 600 includes an EMG sensor that senses electromyographic signals of hand 640 to determine whether a gesture is being performed by hand 640 and, if so, what gesture is being performed. For example, the EMG sensor (with or without the use of the accelerometer) is used to detect whether a pinch-and-hold air gesture is performed and for how long the gesture (e.g., the pinch) is maintained. In some embodiments, the accelerometer is used to detected whether a gesture is being performed by hand 640 and, if so, what gesture is being performed. For example, the accelerometer (with or without the use of the EMG sensor) is used to detect whether a pinch air gesture is performed. In some embodiments, the EMG sensor and/or the accelerometer is used to detect a swipe air gesture, such as with thumb 640B moving along forefinger 640A.

Figure 6B:
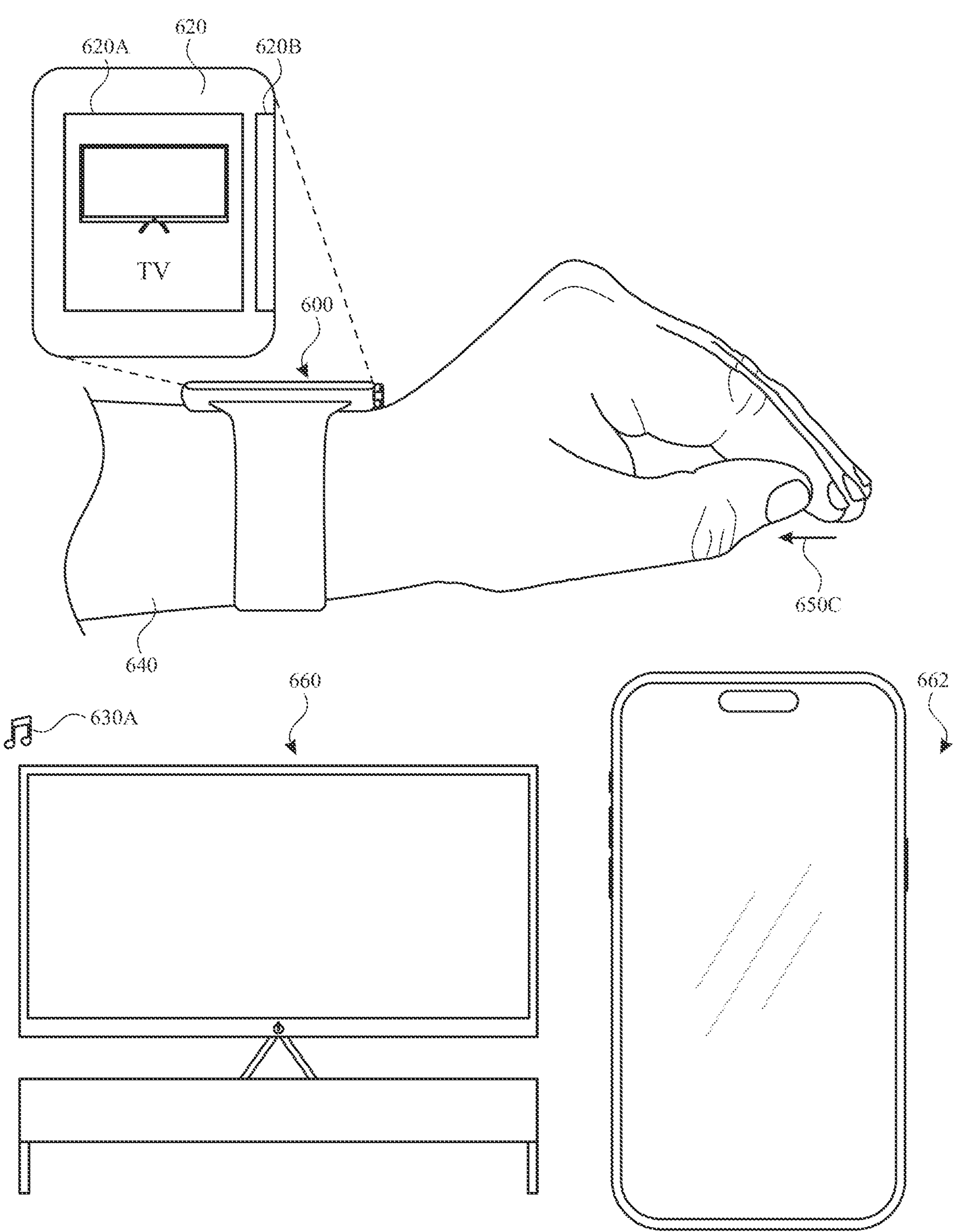

At FIG. 6A, computer system 600 is displaying home screen 610 that includes a plurality of selectable objects, such as object 610A and object 610B. Activation of a respective selectable object of the plurality of selectable objects causes computer system 600 to display a user interface corresponding to the selected object. In some embodiments, at FIG. 6A, computer system 600 detects a touch input (e.g., a tap gesture 650A) on object 610*b*, which corresponds to a control application for controlling external devices. In response to detecting the touch input on object 610*b*, computer system 600 displays user interface 620, as shown in FIG. 6B. In some embodiments, at FIG. 6A, computer system 600 detects an air gesture (e.g., a pinch air gesture 650B or a double-pinch air gesture 650B) that corresponds to object 610*b*. In response to detecting the air gesture, computer system 600 displays user interface 620, as shown in FIG. 6B.

At FIG. 6B, user interface 620 includes a plurality of indications of external devices, including indication 620A of television 660, indication 620B of a camera application of phone 662, and indication 620C of a media application of phone 662. In some embodiments, computer system 600 is logged into a service using account credentials (login and/or password) and computer system 600 identifies nearby external devices that are also logged into the service using the same account credentials. Computer system 600 includes indications of all or some of the identified nearby external devices as part of the plurality of indications in user interface 620. In some embodiments, indications are not included as part of the plurality of indications (and therefore, as part of user interface 620) of external devices that are not nearby (to computer system 600) and/or that are not logged into the service using the same account credentials. In some embodiments, the indications are ordered based on relevancy. In some embodiments, the indications are ordered based on the proximity of the corresponding external devices to computer system 600. For example, indication 620A of television 660 is first in the order because it is more relevant (e.g., controlled more recently than other nearby external devices, is the closest nearby external device, and/or is currently displaying and/or playing content/media). At FIG. 6B, computer system 600 indicates, such as by displaying indication 620A in the center of user interface 620 and/or display 602, that television 660 is currently selected to be controlled.

In response to detecting tap gesture 650A and/or detecting pinch air gesture 650B, computer system 600 optionally transmits data to television 660 indicating that computer system 600 is configured to control television 660. In some embodiments, television 660 outputs, in response to receiving the data, an indication (e.g., tactile output, visual output, and/or audio output 630A) that television 660 is being controlled by another device (e.g., computer system 600), as shown in FIG. 6B.

In some embodiments, while computer system 600 indicates, via user interface 620, that television 660 is currently selected to be controlled, computer system 600 detects an air gesture, such as a pinch air gesture or a pinch-and-hold air gesture and sends a corresponding command to television 660 (e.g., without sending a command to phone 662). For example, a pinch air gesture at FIG. 6B causes computer system 600 to send a command to television 660 to turn on a display of television 660 and/or a pinch-and-hold air gesture at FIG. 6B causes computer system 600 to send a command to television 660 to display default or pre-selected media content by streaming the content from a media provider (without sending a command to phone 662).

At FIG. 6B, while computer system 600 indicates, via user interface 620, that television 660 is currently selected to be controlled, computer system 600 detects a left swipe air gesture 650C. In some embodiments, left swipe air gesture 650C includes placement of thumb 640B on forefinger 640A and movement of thumb 640B in a leftward direction across forefinger 640A.

Figure 6C:
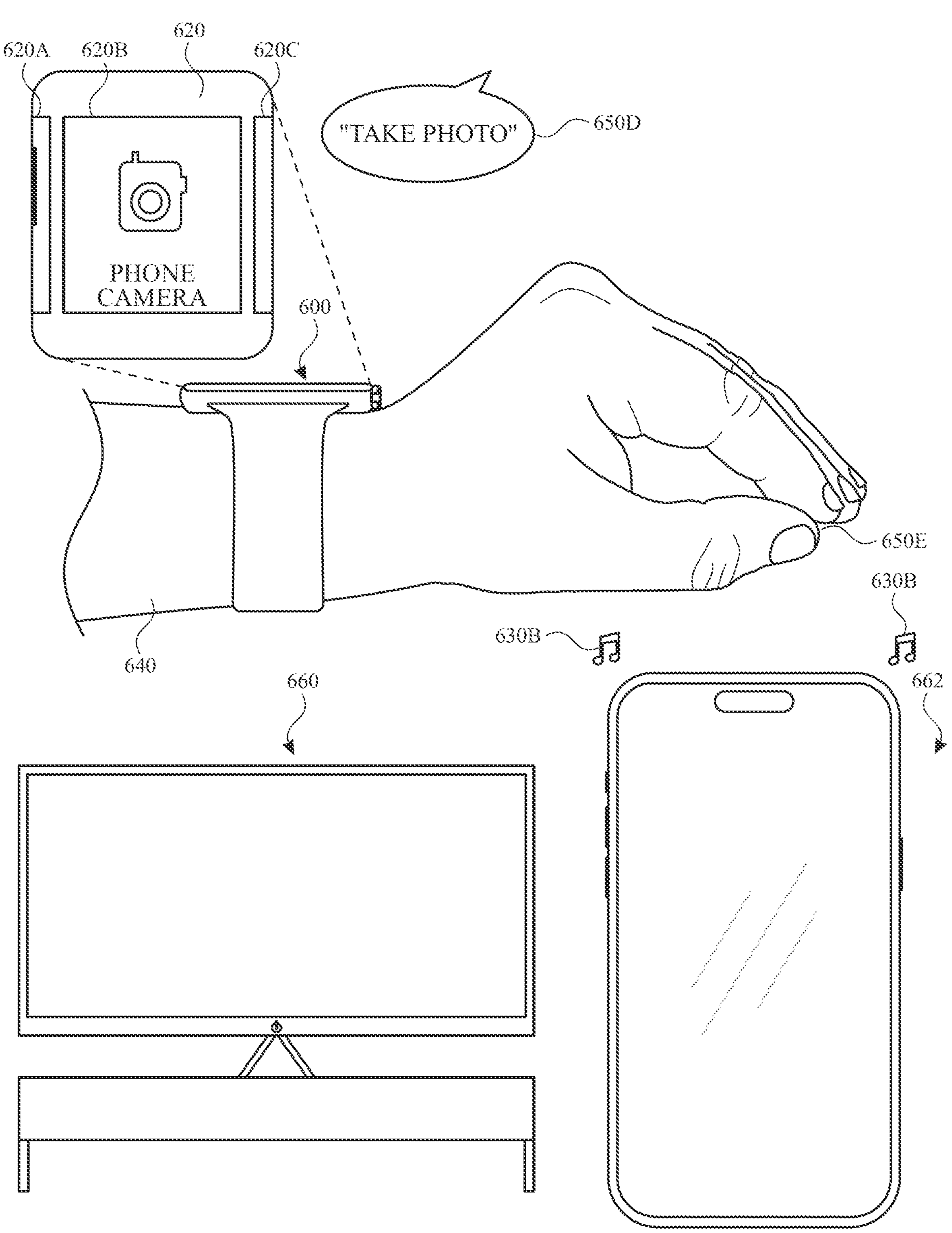
Figure 6D:
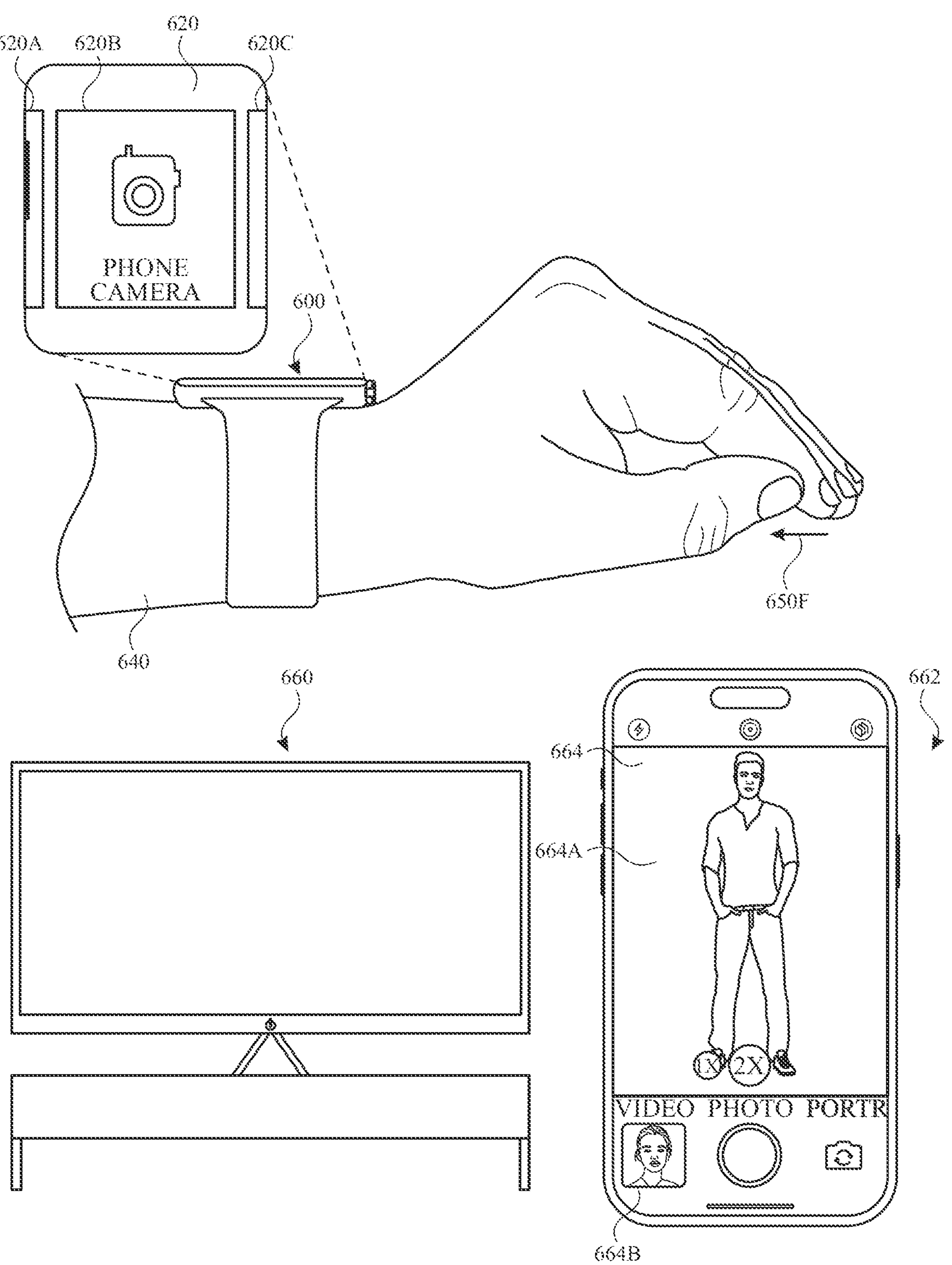
Figure 6E:
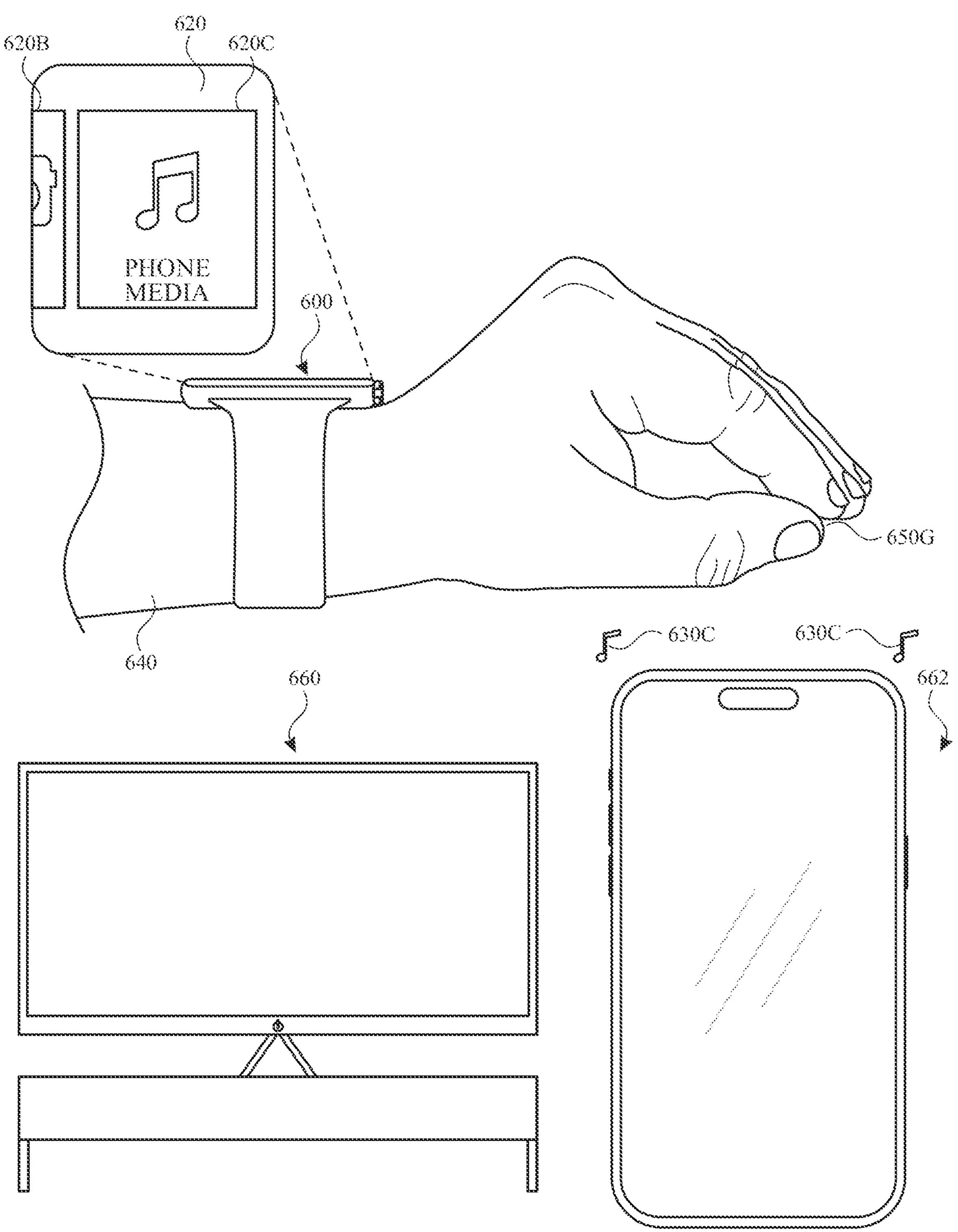

At FIG. 6C, in response to detecting left swipe air gesture 650C, computer system 600 indicates, via user interface 620, that computer system 600 is now configured to control the camera application of phone 662. In some embodiments, this is indicated by computer system 600 by replacing display of indication 620A of television 660 with indication 620B of the camera application of phone 662 in the center of user interface 620 and/or display 602, as shown in FIG. 6C. For example, as computer system 600 detects left swipe air gesture 650C, computer system 600 scrolls user interface 620 to the left (e.g., in conjunction with left swipe air gesture 650C). In some embodiments, the speed at which computer system 600 scrolls user interface 620 to the left is based on the speed of movement of left swipe air gesture 650C. In some embodiments, when left swipe air gesture 650C is a first (e.g., short) distance, computer system 600 displays user interface 620 as shown in FIG. 6C and when left swipe air gesture 650C is a second (e.g., longer) distance, computer system 600 scrolls further to display user interface 620 as shown in FIG. 6E.

In response to detecting left swipe air gesture 650C, computer system 600 optionally transmits data to phone 662 indicating that computer system 600 is configured to control the camera application of phone 662. In some embodiments, phone 662 outputs, in response to receiving the data, an indication (e.g., tactile output 630B, visual output, and/or audio output) that the camera application of phone 662 is being controlled by another device (e.g., computer system 600), as shown in FIG. 6C.

At FIG. 6C, while computer system 600 indicates, via user interface 620, that computer system 600 is configured to control the camera application of phone 662, computer system 600 detects an input. In some embodiments, the input is utterance 650D (e.g., with or without detecting a trigger for audio commands). In some embodiments, the input is an air gesture (e.g., a pinch air gesture 650E or a pinch-and-hold air gesture).

As shown in FIG. 6C, the utterance is "Take a photo." In response to detecting the utterance and in accordance with computer system 600 being configured to control the camera application of phone 662 (as indicated by indication 620B of the camera application of phone 662 being in the center of user interface 620 and/or display 602), computer system 600 transmits data (e.g., a command) to phone 662 that is directed to the camera application (without transmitting the data (e.g., command) to television 660) and that is based on the detected utterance. In some embodiments, the detected audio is transmitted to phone 662. In some embodiments, a transcription of the audio is transmitted to phone 662. In some embodiments, a command based on the detected audio and/or transcription of the utterance is transmitted to phone 662 (e.g., different utterances result in different commands being transmitted). For example, computer system 600 transmits a command to phone 662 directed to the photo application to capture a photo. As a result, phone 662 captures photo 664A and optionally displays a camera user interface that includes photo 664A and/or previously captured photo 664B, as shown in FIG. 6D. Thus, the user of computer system 600 can quickly select an external device and send an instruction to the device quickly, efficiently, and with reduced inputs.

As shown FIG. 6C, the air gesture is pinch air gesture 650E. In some embodiments, pinch air gesture 650E includes movement to bring thumb 640B and forefinger 640A together (e.g., the tips of the two fingers) and back apart. In response to detecting pinch air gesture 650E and in accordance with computer system 600 being configured to control the camera application of phone 662 (as indicated by indication 620B of the camera application of phone 662 being in the center of user interface 620 and/or display 602), computer system 600 transmits data (e.g., a command) to phone 662 that is directed to the camera application (without transmitting the data (e.g., command) to television 660) and that is based on the detected air gesture. In some embodiments, a command based on the detected air gesture is transmitted to phone 662 (e.g., different air gestures result in different commands being transmitted to phone 662). For example, computer system 600 transmits a command to phone 662 directed to the photo application to capture a photo. As a result, the camera application of phone 662 captures photo 664A and optionally displays a camera user interface that includes photo 664A and/or previously captured photo 664B, as shown in FIG. 6D. Thus, the user of computer system 600 can quickly select an external device and send an instruction to the device quickly, efficiently, with reduced inputs, and only using one hand (e.g., 640).

At FIG. 6D, while computer system 600 indicates, via user interface 620, that camera application of phone 662 is currently selected to be controlled, computer system 600 detects another left swipe air gesture 650F. In some embodiments, the left swipe air gesture includes placement of thumb 640B on forefinger 640A and movement of thumb 640B in a leftward direction across forefinger 640A.

At FIG. 6E, in response to detecting left swipe air gesture 650F, computer system 600 indicates, via user interface 620, that computer system 600 is now configured to control the media application of phone 662. In some embodiments, this is indicated by computer system 600 by replacing display of indication 620B with indication 620C of the media application of phone 662 in the center of user interface 620 and/or display 602, as shown in FIG. 6E. Alternatively, had computer system 600 detected a right swipe air gesture, computer system 600 would indicate (e.g., via indication 620A) that computer system 600 is configured to control television 660. In response to detecting left swipe air gesture 650F, computer system 600 optionally transmits data to phone 662 indicating that computer system 600 is configured to control the media application of phone 662. In some embodiments, phone 662 outputs, in response to receiving the data, an indication (e.g., tactile output, visual output, and/or audio output 630C) that the camera application of phone 662 is being controlled by another device (e.g., computer system 600).

At FIG. 6E, while computer system 600 indicates, via user interface 620, that the media application of phone 662 is currently selected to be controlled, computer system 600 detects pinch air gesture 650G. In some embodiments, pinch air gesture 650G includes movement to bring thumb 640B and forefinger 640A together (e.g., the tips of the two fingers) and back apart.

Figure 6F:
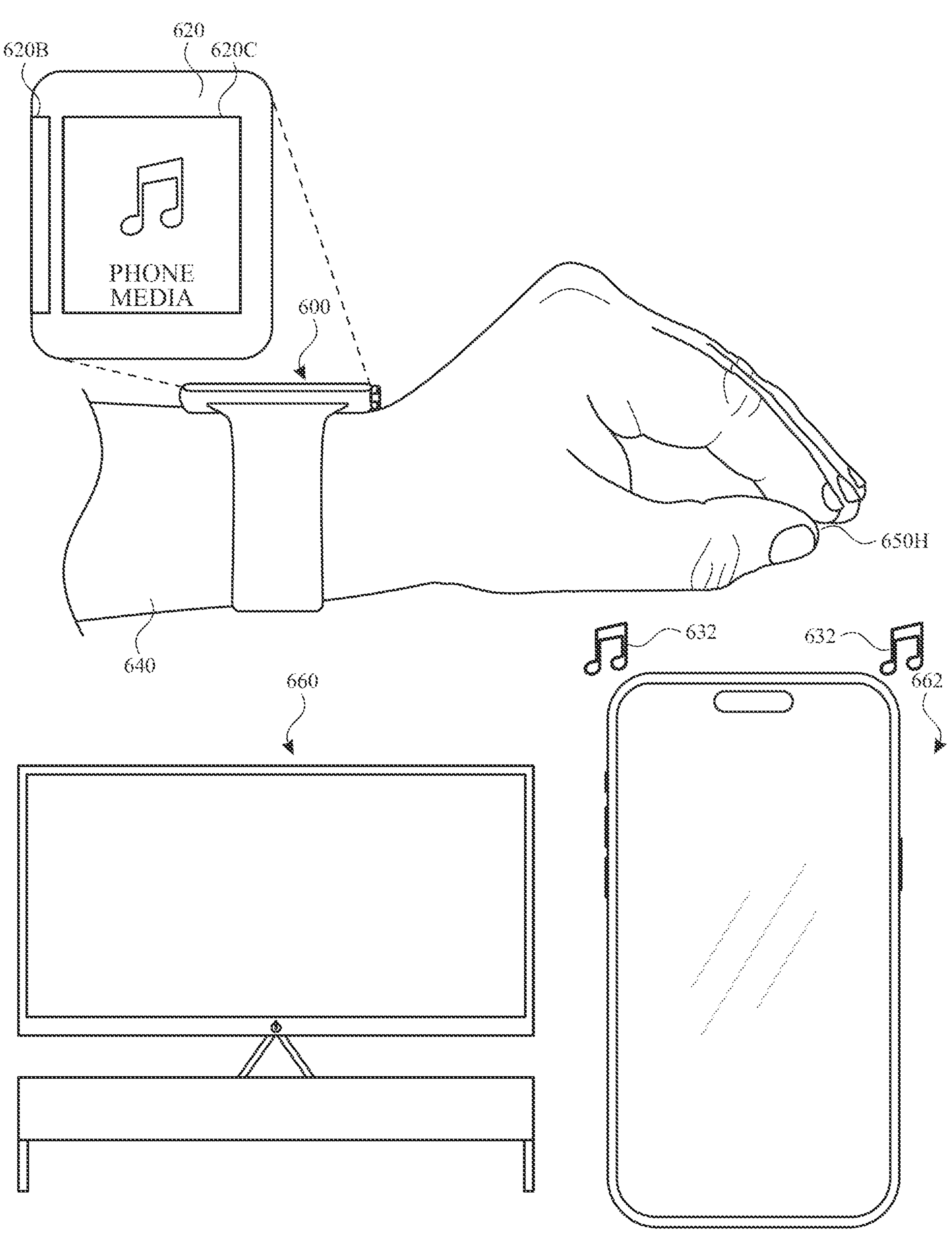

At FIG. 6F, in response to computer system 600 detecting pinch air gesture 650G and in accordance with computer system 600 being configured to control the media application of phone 662 (as indicated by indication 620C of the media application of phone 662 being in the center of user interface 620 and/or display 602), computer system 600 transmits data (e.g., a command) to phone 662 that is directed to the media application (without transmitting the data (e.g., command) to television 660) and that is based on the detected air gesture. In this example, computer system 600 transmits a command to phone 662 directed to the media application to start media playback. As a result, the media application of phone 662 starts media playback and phone 662 outputs audio 632 at a first volume, as shown in FIG. 6F, and optionally displays a media user interface. Thus, the user of computer system 600 can quickly select an external device and send an instruction to the device quickly, efficiently, with reduced inputs, and only using one hand (e.g., 640).

At FIG. 6F, while computer system 600 indicates, via user interface 620, that the media application of phone 662 is currently selected to be controlled, computer system 600 detects air gesture 650H, which begins with a pinch-and-hold air gesture. At FIG. 6G, while computer system 600 continues to indicate that the media application of phone 662 is currently selected to be controlled and while continuing to maintain the pinch-and-hold air gesture of air gesture 650H, computer system 600 detects rotation of hand 640. In response to detecting the pinch-and-hold gesture in combination with the rotation of hand 640, computer system 600 outputs tactile feedback 634 (e.g., in conjunction with detecting the rotation aspect of air gesture 650H and/or haptic output). In some embodiments, tactile feedback 634 is based on the direction, speed, and/or amount of the rotation aspect of air gesture 650H. In response to detecting the pinch-and-hold gesture in combination with the rotation of hand 640, computer system 600 transmits data to phone 662 that is based on air gesture 650H. In this example, air gesture 650H corresponds to a request to change a volume, thus computer system 600 transmits a command to phone 662 to change a volume of the media application of phone 662. In some embodiments, the amount of volume change in the request is based on the amount of rotation of hand 640—more rotation results in more volume change and less rotation results in less rotation. In some embodiments, whether to increase or decrease the volume is based on the direction of rotation of hand 640—a first direction (e.g., clockwise) increases the volume and a second direction (e.g., counter-clockwise) decreases the volume. Thus, tactile feedback 634 optionally provides the user with feedback about the amount of volume change. In some embodiments, when computer system 600 detects a pinch-and-hold gesture without detecting rotation of the hand performing the pinch-and-hold gesture, computer system 600 does not output the tactile feedback and does not transmit a command to the external device (e.g., phone 662) to change the volume of media playback.

Figure 6G:
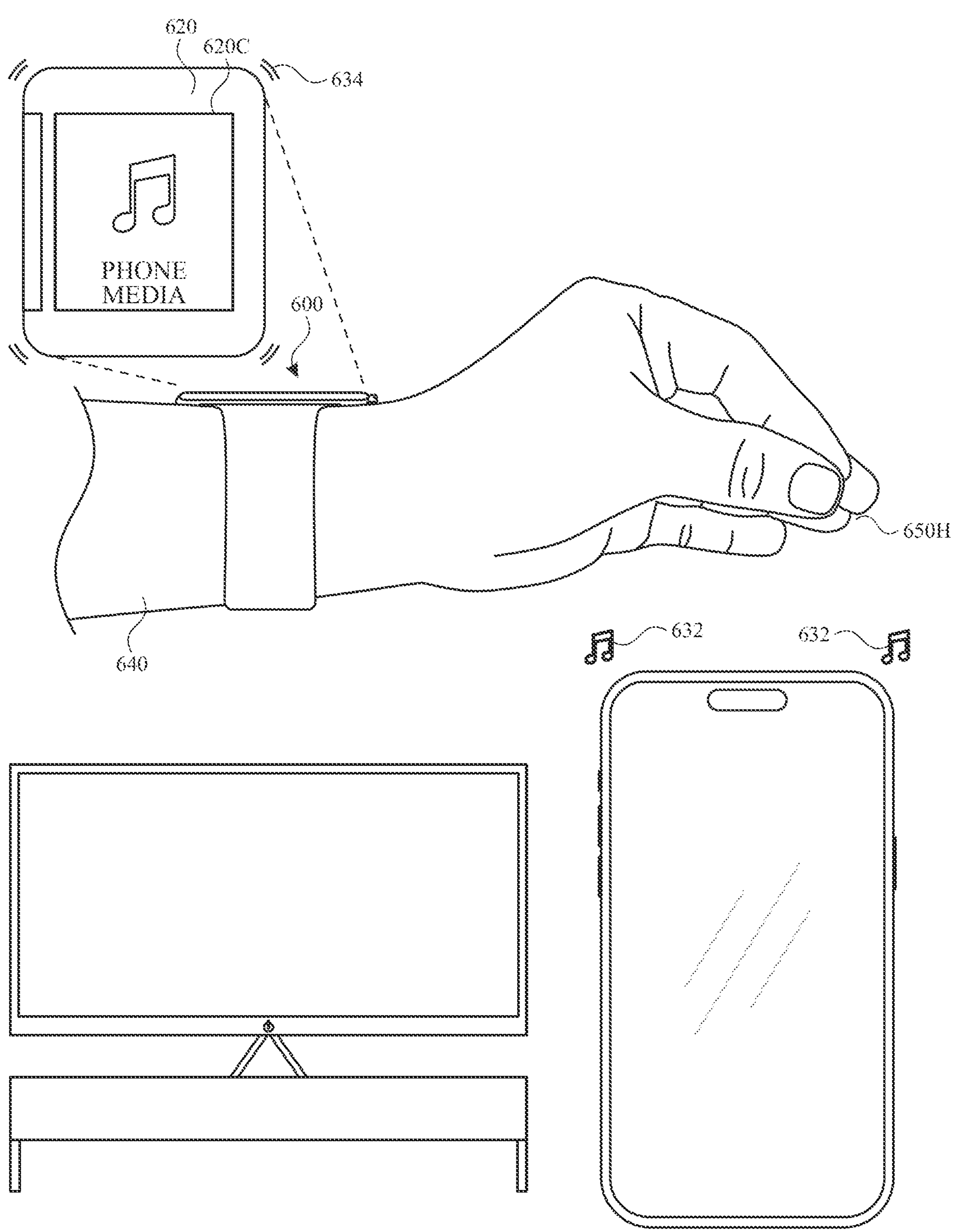
Figure 6H:
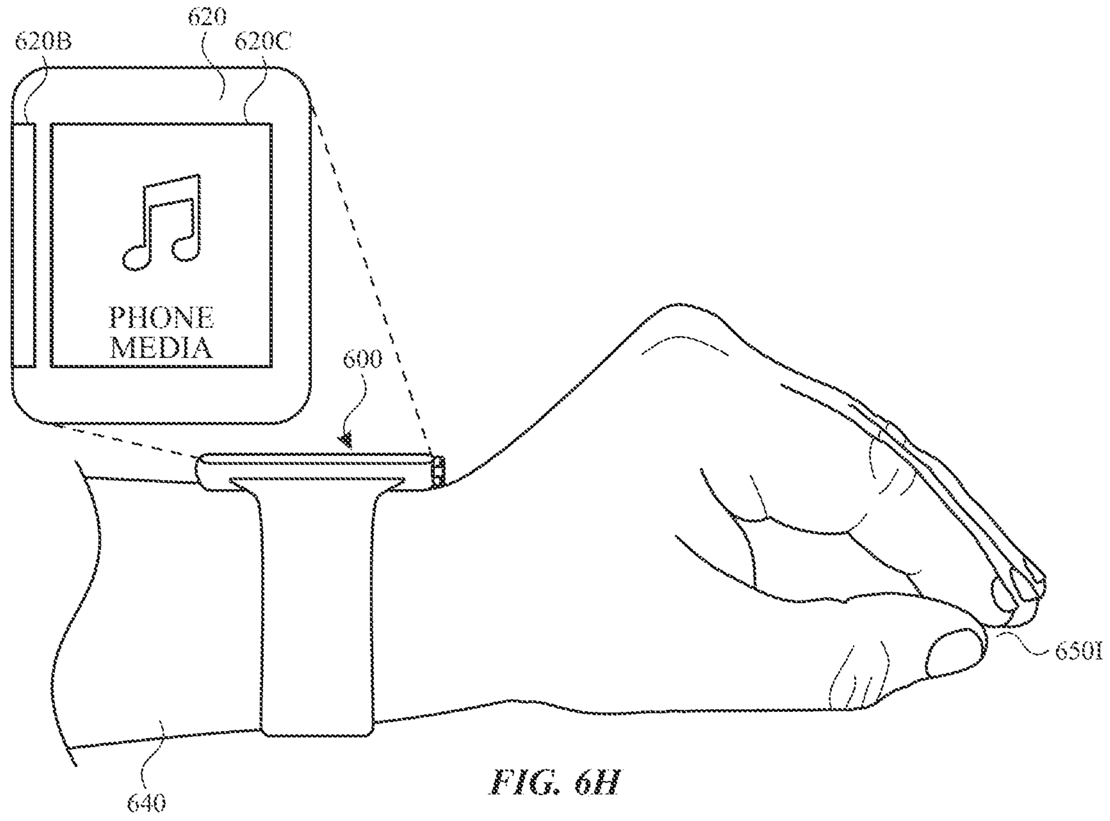

At FIG. 6H, while computer system 600 indicates, via user interface 620, that the media application of phone 662 is currently selected to be controlled, computer system 600 detects air gesture 650I. In some embodiments, air gesture 650I is a double-pinch air gesture. In some embodiments, air gesture 650I is a pinch-and-hold air gesture (e.g., held for more than a threshold duration of time). In response to detecting air gesture 650I, computer system 600 ceases to display the indication of media application of phone 662 (or any other indication of an external device of the nearby external devices) and computer system 600 ceases to be configured to control media application of phone 662 (or any other external device of the nearby external devices).

Figure 6I:
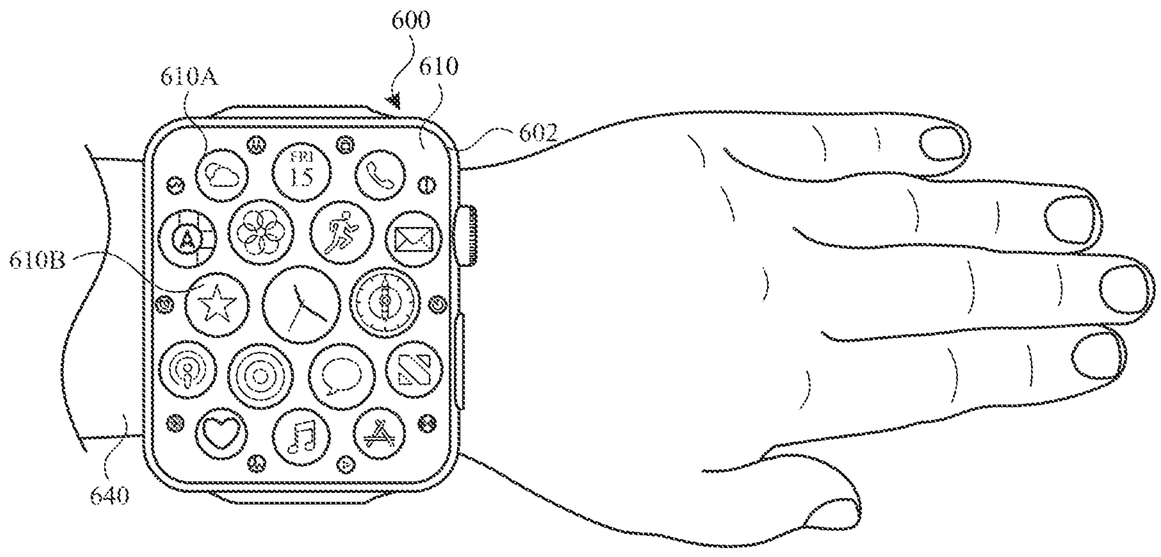

At FIG. 6I, in response detecting air gesture 650I, computer system 600 displays, via display 602, home screen 610. In some embodiments, when computer system 600 detects a pinch-and-hold gesture with rotation of the hand while displaying home screen 610 and/or while not displaying an indication (e.g., 620A-620C) of a nearby external device, computer system 600 does not output the tactile feedback and does not transmit a command to an external device (e.g., phone 662) to change the volume of media playback.

FIG. 7 is a flow diagram illustrating a method for controlling external devices using a computer system, in accordance with some embodiments. Method 700 is performed at a computer system (e.g., 100, 300, 500, and/or 600) (e.g., a smartwatch, a wearable device, and/or a smartphone) (e.g., that is worn on a hand of a user (e.g., worn on a wrist of the user and/or worn on one or more fingers of a user)) that is in communication with a display generation component (e.g., a display controller, a display, a touch-sensitive display system, a touchscreen, and/or a monitor) and one or more input devices (e.g., a gyroscope, an accelerometer, a touch-sensitive surface, a touchscreen display, a button, a keyboard, a mouse, a joystick, a camera sensor, and/or a microphone) that include a physiological sensor (e.g., a blood pressure sensor, a heart rate sensor placed against the body (wrist or fingers) of the user, configured to track heart-related metrics such as heart rate and/or blood flow, and/or an electromyography sensor). In some embodiments, the physiological sensor is or includes an optical sensor. In some embodiments, movement of the hand (e.g., fingers) of the user is not within a field-of-view of the optical sensor. Some operations in method 700 are, optionally, combined, the orders of some operations are, optionally, changed, and some operations are, optionally, omitted.

As described below, method 700 provides an intuitive way for controlling external devices. The method reduces the cognitive burden on a user for controlling external devices, thereby creating a more efficient human-machine interface. For battery-operated computing devices, enabling a user to control external devices faster and more efficiently conserves power and increases the time between battery charges.

The computer system (e.g., 600) receives (702), via the one or more input devices (e.g., using a touch-sensitive surface, using the physiological sensor/optical sensor, or not using the physiological sensor/optical sensor), an input (e.g., 650A, 650B, 650C, and/or 650F) (e.g., a swipe input on a touch-sensitive surface, a hand rotation air gesture, an audio input, and/or using or not using the physiological sensor) to display a respective indication (e.g., 620A-620C) corresponding to a respective external device (e.g., 660 and/or 662) (e.g., a respective nearby device, such as a device within a threshold distance of the computer system and/or a device within a respective radio communication range or signal strength of the computer system) from among a plurality of detected external devices (e.g., external devices that are detected to be within a threshold range and/or distances of the computer system); In some embodiments, the plurality of detected external devices are logged into a service using account information (e.g., username/password) and the computer system is logged into the same service using the same account information (e.g., username/password).

In response to receiving the input (e.g., 650A, 650B, 650C, and/or 650F) to display the respective indication corresponding to the respective external device, the computer system (e.g., 600) displays (704), via the display generation component, the respective indication (e.g., 620A-620C) corresponding to the respective external device (e.g., replacing display of a first indication of a first external device with a second indication of a second external device).

While displaying the respective indication (e.g., 620B and/or 620C) corresponding to the respective external device, the computer system (e.g., 600) detects (706), via the physiological sensor (and, optionally, without using a motion sensor, such as a gyroscope or an accelerometer, and/or without using a touch-sensitive surface, such as a touch-screen), a respective air gesture (e.g., 650E, 650G, and/or 650H) (e.g., performed using a hand on which the computer system is worn and/or performed using a hand different from the hand on which the computer system is worn).

In response (708) to detecting the respective air gesture (e.g., 650E, 650G, and/or 650H) and in accordance with a determination that the respective indication corresponds to a first external device (e.g., 660) (e.g., an indication of the first external device was displayed (and an indication of a second external device was not displayed) when the respective air gesture was detected), the computer system sends (710) (e.g., via a communication radio, via a wired or wireless communication channel, via a short-range communication protocol, such as Bluetooth and/or BLE) a command corresponding to the respective air gesture to the first external device (e.g., 660) without sending the command corresponding to the respective air gesture to a second external device (e.g., 662).

In response (708) to detecting the respective air gesture and in accordance with a determination that the respective indication corresponds to a second external device (e.g., 662) (e.g., an indication of the second external device was displayed (and an indication of a first external device was not displayed) when the respective air gesture was detected) that is different from the first external device, the computer system sends (712) (e.g., via a communication radio, via a wired or wireless communication channel, via a short-range communication protocol, such as Bluetooth and/or BLE) the command corresponding to the respective air gesture to the second external device (e.g., 662) without sending the command corresponding to the respective air gesture to the first external device (e.g., 660). Sending commands to different external devices based on which indication of an external device is displayed enables the computer system to control external devices while reducing the number of inputs required from the user. Providing external device control using a computer system that is worn on the hand of the user enables the user of the computer system to optionally control the external devices with a single hand.

In some embodiments, in accordance with a determination that the respective air gesture is a first air gesture (e.g., 650G) (e.g., a pinch air gesture), the command is a first command (e.g., a selection command). In some embodiments, in accordance with a determination that the respective air gesture is a second air gesture (e.g., 650H) (e.g., a double-pinch air gesture) that is different from the first air gesture, the command is a second command (e.g., back command and/or cancel command) that is different from the first command. Sending different commands to an external device based on air gesture enables the computer system to control external devices in different ways while reducing the number of inputs required from the user. Providing external device control using a computer system that is worn on the hand of the user enables the user of the computer system to optionally control the external devices with a single hand.

In some embodiments, the computer system (e.g., 600) detects, via the physiological sensor, a heart rate of a user of the computer system (e.g., of the user wearing the computer system) and displays, via the display generation component, the heart rate (e.g., as part of a health application). In some embodiments, the heart rate information is detected while displaying the indication corresponding to the respective external device. In some embodiments, the heart rate information is detected while not displaying the indication corresponding to the respective external device. Using the physiological sensor to measure a heart rate of a user wearing the computer system enables the physiological sensor to perform multiple functions, thereby reducing the hardware requirements of the computer system. Additionally, displaying heart rate information of the user provides the user with visual feedback about the heart rate being detected by the computer system, thereby providing improved visual feedback.

In some embodiments, the computer system (e.g., 600) is a wearable device that is being worn by a user of the computer system (e.g., when the input to display the respective indication corresponding to the respective external device is received and/or when the respective air gesture is detected). Providing external device control using a computer system that is worn on the hand of the user enables the user of the computer system to optionally control the external devices with a single hand.

In some embodiments, the input (e.g., 650B) to display the respective indication corresponding to the respective external device is a double-pinch air gesture (e.g., 650B) (e.g., a motion gesture (e.g., performed in the air and/or a performed using a hand on which the wearable computer system is worn) that includes movement (twice) of a first finger of a hand of a user coming together with a second finger of the same hand of the user). Performing a double-pinch air gesture to display the respective indication enables the computer system to detect the input using the same hand that is wearing the computer system. Providing external device control using a computer system that is worn on the hand of the user enables the user of the computer system to optionally control the external devices with a single hand.

In some embodiments, the input to display the respective indication (e.g., 620A-620C) corresponding to the respective external device includes (e.g., is) a swipe gesture (e.g., while the computer system detects that a gaze of the user is directed to the computer system). In some embodiments, the displayed respective indication is based on a direction of the swipe gesture (e.g., left swipe displays one indication and right swipe displays a different indication). In some embodiments, the swipe gesture is a touch gesture detected via a touch-sensitive surface of the computer system. In some embodiments, the swipe gesture is a swipe air gesture detected via the physiological sensor (and not a touch-sensitive surface). In some embodiments, a swipe air gesture includes movement in a first direction of a finger of a hand of the user along a second finger of the same hand of the user. Performing a swipe air gesture to display the respective indication enables the computer system to detect the input using the same hand that is wearing the computer system. Providing external device control using a computer system that is worn on the hand of the user enables the user of the computer system to optionally control the external devices with a single hand.

In some embodiments, the plurality of detected external devices are selected based on detected proximity (e.g., distance and/or communication (e.g., RF) proximity) of the plurality of detected external devices to the computer system, and an order of the indications of the plurality of detected external devices is based on states (e.g., on, off, playing media, and/or paused) and/or proximity (e.g., to the computer system) of the plurality of detected external devices. In some embodiments, the plurality of detected external devices are in an order and the user can navigate through the order (e.g., via swipe inputs) to display an indication of a desired external device of the plurality of detected external devices. In some embodiments, the order of the plurality of external devices is based on the state of the external devices. In some embodiments, the order of the plurality of devices is based on the proximity of the external devices to the computer system. Ordering the indications of the external deices based on their state and/or proximity enables the computer system to provide the most relevant options first, thereby reducing the number of inputs required to control the desired external device.

In some embodiments, the respective air gesture is a swipe air gesture (e.g., 1450G) (e.g., detected while the hand performing the swipe air gesture is pointed at the respective external device to be controlled) and the command corresponding to the swipe air gesture is a navigational command to navigate a user interface of the respective external device. In some embodiments, the command corresponding to the swipe air gesture is based on a direction of the swipe air gesture (e.g., up swipe air gesture results in an up navigational command, down swipe air gesture results in a down navigational command, left swipe air gesture results in a left navigational command, and/or right swipe air gesture results in a right navigational command). Navigating the external device based on a swipe air gesture enables the computer system to navigate the external device using the same hand that is wearing the computer system. Providing external device control using a computer system that is worn on the hand of the user enables the user of the computer system to optionally control the external devices with a single hand.

In some embodiments, while displaying the respective indication corresponding to the respective external device, detecting, via the physiological sensor, a double-pinch air gesture (e.g., 650I). In response to detecting the double-pinch air gesture (e.g., 650I), the computer system (e.g., 600) ceases to display an indication (e.g., transition between FIGS. 6H and 6I) of an external device of the plurality of detected external devices. In some embodiments, the double-pinch air gesture results in the computer system no longer sending commands to the external devices based on air gestures of the user. In some embodiments, while the computer system is displaying the respective indication corresponding to the respective external device, the computer system detects that a threshold amount of time has lapsed without detected user input (and/or without detecting an air gesture) and, in response, ceases to display an indication of an external device of the plurality of external devices. Stopping control of the external devices using a double-pinch gestures enables the user of the computer system to cease controlling the external device using the same hand that is wearing the computer system. Providing external device control using a computer system that is worn on the hand of the user enables the user of the computer system to optionally control the external devices with a single hand.

In some embodiments, in response to receiving the input (e.g., 650E, 650G, and/or 650H) to display the respective indication (e.g., 620A-620C) corresponding to the respective external device (e.g., 660 and/or 662), the computer system (e.g., 600) sends (e.g., via a communication radio, via a wired or wireless communication channel, via a short-range communication protocol, such as Bluetooth and/or BLE) an indication to the respective external device (e.g., without sending the indication to other external devices) that the computer system is configured to control the respective external device. In some embodiments, the respective external device provides (e.g., based on receiving the indication) an output (e.g., audio, visual, and/or tactile output) to indicate that the computer system is controlling the respective external device. Causing the selected external device to provide output to indicate that it is being controlled provides the user with feedback about which external device is currently being controlled, thereby providing improved feedback.

In some embodiments, the respective air gesture includes a pinch-and-hold air gesture (e.g., 650H) performed by a hand of the user of the computer system (e.g., 600) and the respective air gesture includes a first magnitude (e.g., amount, degrees, and/or speed) of rotation of the hand of the user of the computer system (e.g., 600) (e.g., during the pinch-and-hold air gesture), wherein the command corresponding to the respective air gesture that is sent to the respective external device (e.g., 662) includes a second magnitude (e.g., of volume change, of blind height, and/or of light brightness), based on the first magnitude, of change for a feature (e.g., volume of 632, blind height, light brightness) of the respective external device. In some embodiments, a first amount of rotation during the pinch-and-hold gesture results in a first amount of volume change at the respective external device and a second amount of rotation during the pinch-and-hold gesture results in a second amount of volume change at the respective external device. Using a pinch-and-hold in conjunction with a rotation of the user's hand to control the magnitude for the feature enables the computer system to control non-binary features, such as features that operate along a range of values (e.g., 0-100), thereby improving the man-machine interface.

In some embodiments, the first magnitude is an amount of rotation of the hand (e.g., 640, as shown in FIGS. 6F-6G) of the user of the computer system. In some embodiments, the greater the amount of rotation of the hand of the user, the greater the amount of change instructed to the respective external device via the second magnitude. Basing the amount of change of the feature on the amount of rotation of the hand of the user enables the computer system to quickly control the amount of change of the feature by detecting the rotation of the user's hand.

In some embodiments, the first magnitude is a speed of rotation of the hand (e.g., 640, as shown in FIGS. 6F-6G) of the user of the computer system (e.g., 600). In some embodiments, the faster the speed of rotation of the hand of the user, the greater the amount of change instructed to the respective external device via the second magnitude. Basing the amount of change of the feature on the speed of rotation of the hand of the user enables the computer system to quickly control the amount of change of the feature by detecting the rotation of the user's hand.

In some embodiments, a rate of change of feature (e.g., volume of 632) of the respective external device (e.g., 662) is limited to a threshold rate based on a value of the feature of the respective external device exceeding a threshold value. In some embodiments, the rate at which the value of the feature is changed is reduced once a threshold value is reached for the feature. In some embodiments, once a volume of an external device exceeds 50%, the rate of volume increase is capped (e.g., to prevent turning up the volume too loud, too quickly). Reducing the rate of change of the feature once a threshold value is reached for the feature enables the computer system to avoid unintentionally reaching an extreme value (e.g., too loud) for the feature.

In some embodiments, in response to detecting rotation of the hand (e.g., 640 in FIGS. 6F-6G) of the user of the computer system (e.g., 600) as part of the respective air gesture (e.g., 650H), the computer system (e.g., 600) provides tactile (e.g., haptic) feedback (e.g., 634) (e.g., in conjunction with the rotation of the hand). In some embodiments, the tactile feedback is based on the first magnitude of the rotation. Providing tactile output in conjunction with detecting rotation of the hand of the user provides the user with feedback that the rotation is being detected, thereby providing improved feedback.

In some embodiments, the respective air gesture (e.g., 650B) is a pinch air gesture. In some embodiments, the command corresponding to the respective air gesture is a play or pause command for an audio player of the respective external device. In some embodiments, a pinch air gesture is a motion gesture (e.g., performed in the air and/or a performed using a hand on which the wearable computer system is worn) that includes movement of a first finger (e.g., thumb) of a hand of a user coming together with a second finger (e.g., forefinger) of the same hand of the user. Sending a command to the external device in response to detecting a pinch air gesture enables the user to control the external device using the same hand that is wearing the computer system. Providing external device control using a computer system that is worn on the hand of the user enables the user of the computer system to optionally control the external devices with a single hand.

In some embodiments, the respective air gesture is a pinch-and-hold air gesture (e.g., an air gesture where the thumb of a hand the user taps on the forefinger of the hand of the user and remains for more than a threshold duration) and the command corresponding to the pinch-and-hold air gesture is a navigational command to navigate back in a user interface of the respective external device. In some embodiments, the command corresponding to the swipe air gesture is based on a direction of the swipe air gesture (e.g., up swipe air gesture results in an up navigational command, down swipe air gesture results in a down navigational command, left swipe air gesture results in a left navigational command, and/or right swipe air gesture results in a right navigational command). Sending a command to navigate back to the external device in response to detecting a tap-and-hold air gestures enables the user to control the external device using the same hand that is wearing the computer system. Providing external device control using a computer system that is worn on the hand of the user enables the user of the computer system to optionally control the external devices with a single hand.

In some embodiments, the respective air gesture is a tap of a finger of the user of the computer system against a palm of the user of the computer system (e.g., of the same hand). In some embodiments, the respective air gesture includes the user clenching a hand of the user such that one or more fingers of the hand touch the palm of the hand. Sending a command to navigate back to the external device in response to detecting a tap-on-palm air gestures enables the user to control the external device using the same hand that is wearing the computer system. Providing external device control using a computer system that is worn on the hand of the user enables the user of the computer system to optionally control the external devices with a single hand.

In some embodiments, while displaying the respective indication corresponding to the respective external device, the computer system (e.g., 600) detects, via one or more microphones of the computer system, an utterance (e.g., 650D) (e.g., from the user wearing the computer system). In response to detecting the utterance (e.g., 650D): in accordance with a determination that the respective indication (e.g., 620B at FIG. 6C) corresponds to the first external device (e.g., 662), the computer system (e.g., 600) sends (e.g., via a communication radio, via a wired or wireless communication channel, via a short-range communication protocol, such as Bluetooth and/or BLE) information based on the utterance (e.g., a command corresponding to the utterance and/or audio information (e.g., an audio stream) corresponding to the utterance) to the first external device (e.g., 662) without sending the information based on the utterance to the second external device (e.g., 660); and in accordance with a determination that the respective indication corresponds to the second external device, sending (e.g., via a communication radio, via a wired or wireless communication channel, via a short-range communication protocol, such as Bluetooth and/or BLE) information based on the utterance (e.g., a command corresponding to the utterance and/or audio information (e.g., an audio stream) corresponding to the utterance) to the second external device without sending the information based on the utterance to the first external device. In some embodiments, the respective external device is a set-up box, an audio device, a smart home assistant, smart blinds, a smart bulb, and/or a smart speaker. In some embodiments, because the respective indication is displayed via the display generation component, the computer system does not need to detect that the computer system has been raised (e.g., to the mouth of the user) to detect the utterance or send the information based on the utterance. In some embodiments, because the respective indication is displayed via the display generation component, the computer system does not need to detect a trigger word or a keyword to detect the utterance or send the information based on the utterance. Controlling an external device using utterances based the indication of the external device being displayed enables the user to control the external device without requiring multiple hands and while giving the user visual feedback about which external device will be controlled using the utterances, thereby providing improved feedback.

In some embodiments, a first indication (e.g., 620B) corresponds to a first application (e.g., presentation software) of a first external device (e.g., 662 and/or a phone) and a second indication (e.g., 620C), different from the first indication, corresponds to a second application (e.g., a music and/or audio application), different from the first application, of the first external device (e.g., 662 and/or a phone). In some embodiments, different applications on the same nearby external device have their own respective indications that can be selected at the computer system. Controlling various applications of the same external device enables the user of the computer system to have more refined controlled of the external device, thereby improving the man-machine interface.

Note that details of the processes described above with respect to method 700 (e.g., FIG. 7) are also applicable in an analogous manner to the methods described below. For example, methods 900, 1100, 1300, and/or 1500 optionally include one or more of the characteristics of the various methods described above with reference to method 700. For example, the computer system is the same computer system.

For another example, the air gestures optionally perform the same operations. For brevity, these details are not repeated below.

FIGS. 8A-8F illustrate exemplary user interfaces for managing audio dictation, in accordance with some embodiments. The user interfaces in these figures are used to illustrate the processes described below, including the processes in FIG. 9.

Figure 8A:
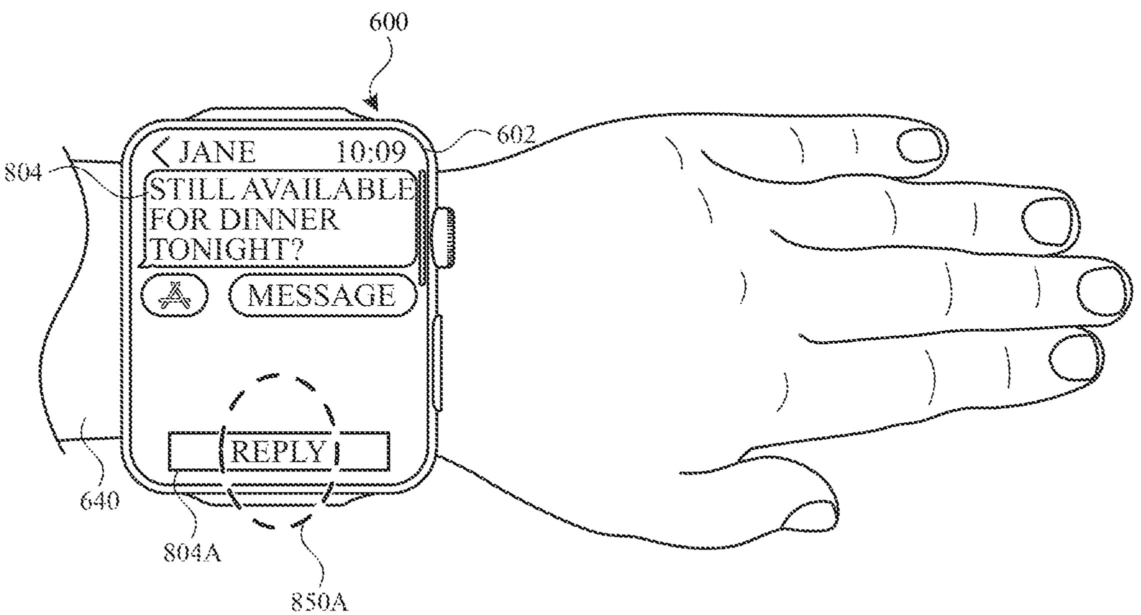
FIGS. 8A-8F illustrate exemplary user interfaces for managing audio dictation, in accordance with some embodiments.

FIG. 8A illustrates computer system 600 (e.g., a smartwatch) that is worn on a wrist of a hand 640 (e.g., left hand) of a user of computer system 600. Computer system 600 includes a plurality of input devices, such as a gyroscope, an accelerometer, touchscreen 602, and one or more physiological sensors. In some embodiments, the one or more physiological sensors include a blood pressure sensor, a heart rate sensor, and/or an electromyography (EMG) sensor. In some embodiments, the EMG sensor (e.g., a surface EMG sensor) measures electrical activity and/or muscle response by sensing electromyographic signals generated by a user's muscles as the muscles are moved. In some embodiments, the EMG sensor senses and/or measures electrical impulses generated when a user's muscles contract. In some embodiments, computer system 600 includes an EMG sensor that senses electromyographic signals of hand 640 to determine whether a gesture is being performed by hand 640 and, if so, what gesture is being performed. For example, the EMG sensor (with or without the use of the accelerometer) is used to detect whether a pinch-and-hold air gesture is performed and for how long the gesture (e.g., the pinch) is maintained. In some embodiments, the accelerometer is used to detected whether a gesture is being performed by hand 640 and, if so, what gesture is being performed. For example, the accelerometer (with or without the use of the EMG sensor) is used to detect whether a pinch air gesture is performed. In some embodiments, the EMG sensor and/or the accelerometer is used to detect a swipe air gesture, such as with thumb 640B moving along forefinger 640A.

At FIG. 8A, computer system 600 is displaying, via display 602, notification 804 received at computer system 600 corresponding to a message received from Jane, a user of a remote device. Notification 804 includes selectable object 804A to initiate a process for responding to Jane's message via a reply message. At FIG. 8A, computer system 600 detects activation of selectable object 804A, such as via touch input 850A (e.g., a tap input directed to selectable object 804A).

Figure 8B:
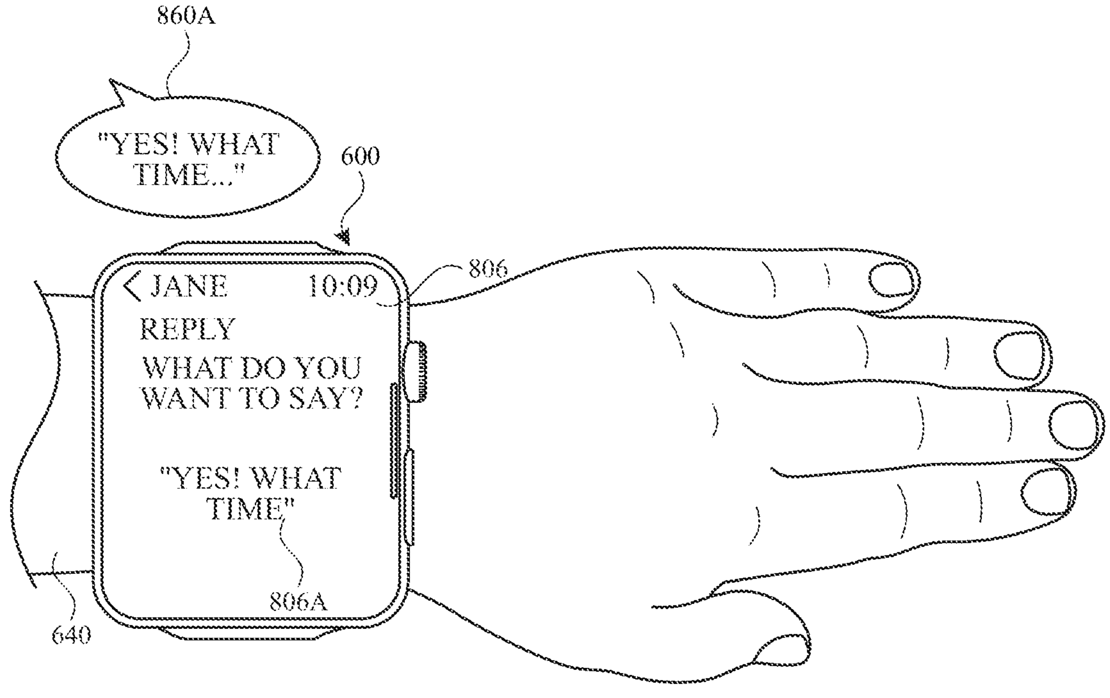

At FIG. 8B, in response to detecting activation of selectable object 804A, computer system 600 starts a dictation process during which detected utterances are transcribed as part of the reply message. In some embodiments, the dictation process includes display of dictation user interface 806, which includes an indication that the dictation process is ongoing. During the dictation process, computer system 600 will transcribe utterances of the user while hand 640 is not performing a pause air gesture. In this example, the pause air gesture is a pinch air gesture that is held for the duration that the utterances should not be transcribed. During the dictation process, computer system 600 will not transcribe utterances of the user while hand 640 is performing the pause air gesture.

At FIG. 8B, during the dictation process, computer system 600 detects utterance 860A that is spoken by the user of computer system 600. Computer system 600 determines whether hand 640 is performing the pause air gesture. In response to detecting utterance 860A and in accordance with the determination that hand 640 was not performing the pause air gesture during utterance 860A (e.g., as indicated by hand 640 not performing/holding a pinch gesture at FIG. 8B or performing a gesture other than the pause air gesture), computer system 600 transcribes utterance 860A and displays transcription 806A of utterance 860A.

Figure 8C:
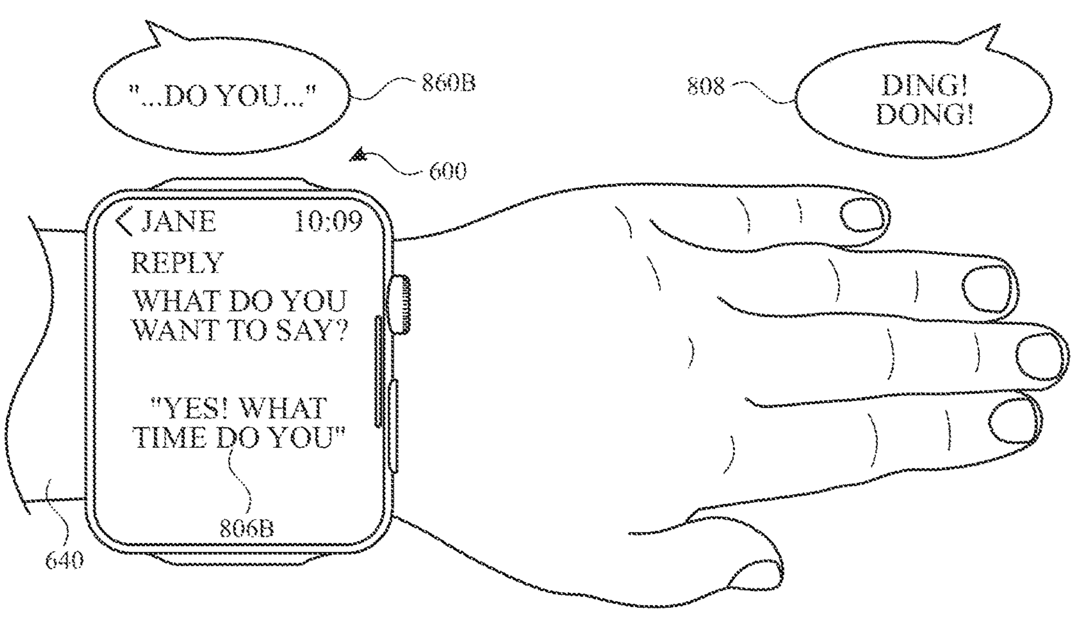

At FIG. 8C, during the dictation process, computer system 600 detects an additional utterance 860B that is spoken by the user of computer system 600. Computer system 600 determines whether hand 640 is performing the pause air gesture. In response to detecting utterance 860B and in accordance with the determination that hand 640 was not performing the pause air gesture during utterance 860B (e.g., as indicated by hand 640 not performing/holding a pinch gesture at FIG. 8C or performing a gesture other than the pause air gesture), computer system 600 transcribes utterance 860B and displays transcription 806B of utterance 860B. In this example, transcription 806B includes the transcript of both utterance 860A and 860B. Thus, while computer system 600 continues to detect utterances during the dictation process while not detecting the pause air gesture, computer system 600 continues to transcribe the detected utterances and display the corresponding transcriptions. At FIG. 8C, a visitor to the user's home rings 808 the doorbell.

Figure 8D:
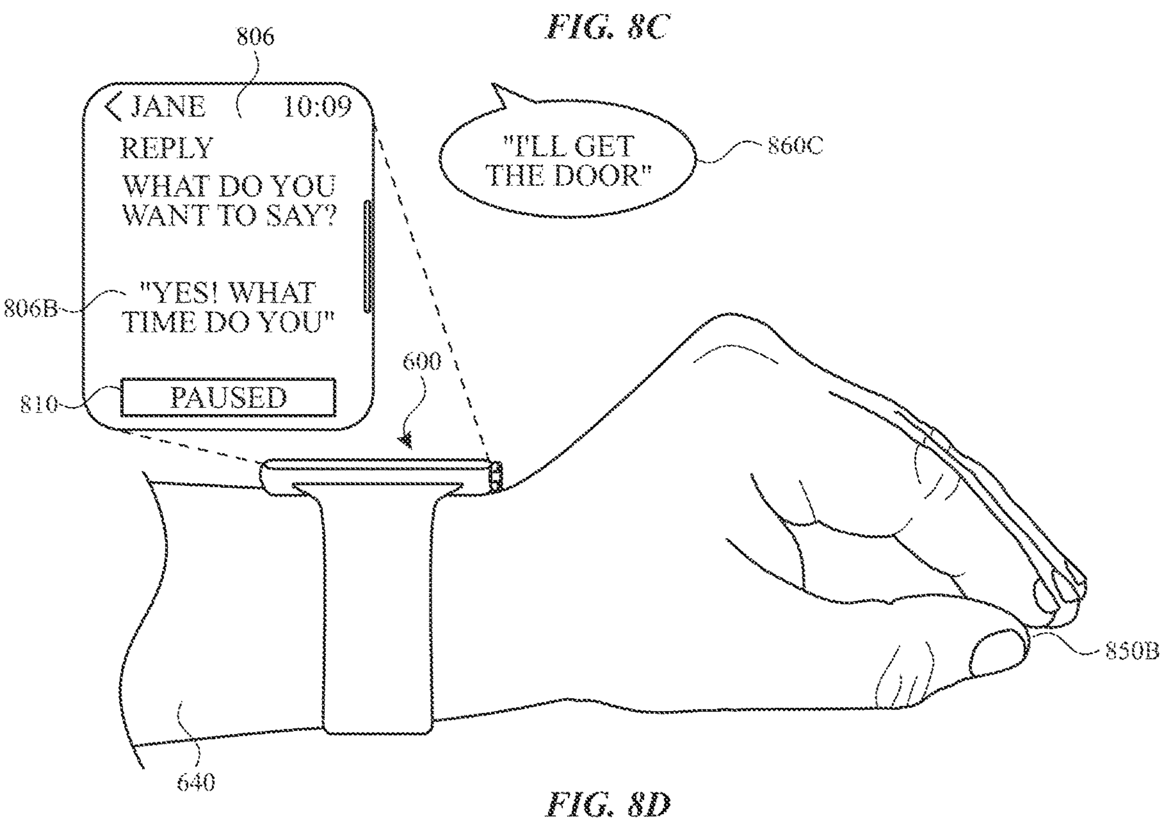

At FIG. 8D, the user of computer system 600 wants to announce to others in the home that the user will answer the door, but does not want the announcement to be transcribed as part of the reply message to Jane. To not have the user's utterances during the announcement become part of the reply message to Jane, the user performs the pause air gesture while uttering announcement 860C (e.g., "I'll get the door"). In some embodiments, in response to detecting (and/or for the duration of detecting) pause air gesture 850B (e.g., a pinch gesture that is held) during the dictation process, computer system 600 ceases detecting audio. Accordingly, computer system 600 does not detect announcement 860C (or other utterances during the pause air gesture), does not transcribe announcement 860C (or other utterances during the pause air gesture), and does not display a transcription corresponding to announcement 860C (or other utterances during the pause air gesture), as show in FIG. 8D. In some embodiments, in response to detecting (and/or for the duration of detecting) pause air gesture 850B during the dictation process, computer system 600 continues detecting audio, but does not transcribe detected utterances (e.g., announcement 860C) and does not display a transcription corresponding to detected utterances (e.g., announcement 860C), as shown in FIG. 8D. In some embodiments, in response to detecting (and/or for the duration of detecting) pause air gesture 850B during the dictation process, computer system 600 continues detecting audio and transcribing detected utterances (e.g., announcement 860C), but does not display a transcription corresponding to the detected utterances (e.g., announcement 860C), as shown in FIG. 8D. As shown in FIG. 8D, in response to detecting (and/or for the duration of detecting) pause air gesture 850B during the dictation process, computer system 600 displays indication 810 that the pause air gesture is detected and/or that transcriptions of utterances will not be displayed or included in the reply message.

Figure 8E:
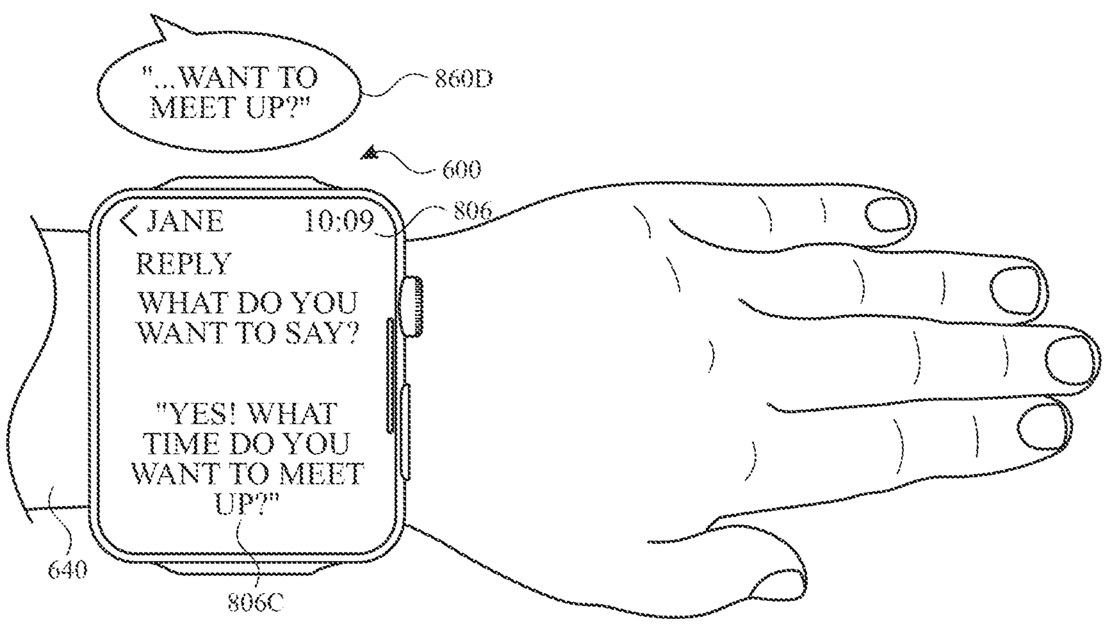

At FIG. 8E, the user has finished announcement 860C and wants to continue preparing the reply message. At FIG. 8E, during the dictation process, computer system 600 detects utterance 860D that is spoken by the user of computer system 600. Computer system 600 determines whether hand 640 is performing the pause air gesture. In response to detecting utterance 860D and in accordance with the determination that hand 640 was not performing the pause air gesture during utterance 860D (e.g., as indicated by hand 640 not performing/holding a pinch gesture at FIG. 8E or performing a gesture other than the pause air gesture), computer system 600 transcribes utterance 860D and displays transcription 806C of utterance 860C. In this example, transcription 806C includes the transcript of utterances 860A, 860B, and 860C. Thus, when computer system 600 ceases to detect the pause air gesture (and while the pause air gesture continues to not be detected), computer system 600 transcribes and detected utterances and displays the corresponding transcriptions.

Figure 8F:
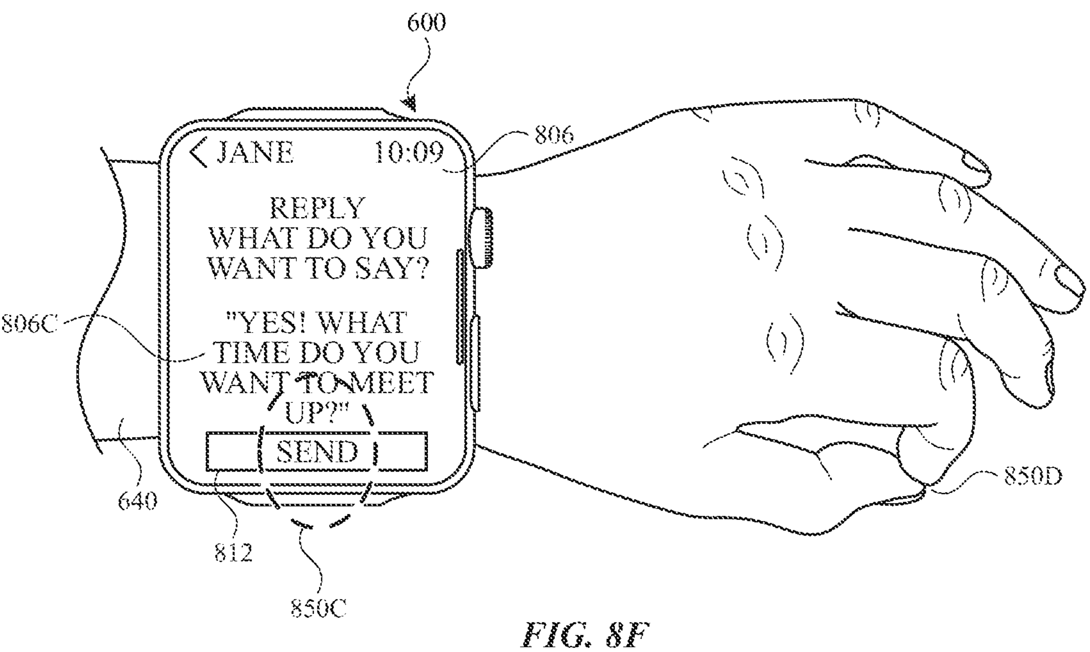

At FIG. 8F, computer system 600 determines that the user is no longer providing content for the reply message (e.g., by detecting more than a threshold duration where utterances are not detected while the pause air gesture is also not detected) and displays send option 812, which, when activated, transmits the reply message to Jane. At FIG. 8F, in response to detecting activation of send option 812, computer system 600 transmits the reply message that includes transcription 806C. In some embodiments, computer system 600 detects a touch input (e.g., tap input 850C) on send option 812 as the activation of send option 812. In some embodiments, computer system 600 detects an air gesture (e.g., pinch-and-hold air gesture 850D) as the activation of send option 812. In some embodiments, pinch-and-hold air gesture 850D to activate send option 812 shows progress and includes other characteristics described with respective to FIGS. 10A-10E.

FIG. 9 is a flow diagram illustrating a method for managing audio dictation using a computer system in accordance with some embodiments. Method 900 is performed at a computer system (e.g., 100, 300, 500, and/or 600) (e.g., a smartwatch, a wearable device, a smartphone, a tablet, a set-top device, a laptop, and/or a desktop computer) (e.g., that is worn on a hand of a user (e.g., worn on a wrist of the user and/or worn on one or more fingers of a user)) that is in communication with a display generation component (e.g., 602) (e.g., a display controller, a display, a touch-sensitive display system, a touchscreen, and/or a monitor) and one or more input devices (e.g., a touch-sensitive surface, a touchscreen display, a button, a keyboard, a mouse, a joystick, a camera sensor, an accelerometer, a physiological sensor (e.g., a blood pressure sensor, a heart rate sensor placed against the body (wrist or fingers) of the user, configured to track heart-related metrics such as heart rate and/or blood flow, and/or an electromyography sensor), and/or an optical sensor (e.g., placed against the body (wrist or fingers) of the user and/or configured to track heart-related metrics such as heart rate and/or blood flow)) that include one or more microphones. Some operations in method 900 are, optionally, combined, the orders of some operations are, optionally, changed, and some operations are, optionally, omitted.

As described below, method 900 provides an intuitive way for managing audio dictation. The method reduces the cognitive burden on a user for managing audio dictation, thereby creating a more efficient human-machine interface. For battery-operated computing devices, enabling a user to dictate faster and more efficiently conserves power and increases the time between battery charges.

During a dictation process (e.g., 902) (e.g., to dictate a message and/or to provide a command by voice), the computer system (e.g., 600) displays (904), via the display generation component (e.g., 602), a transcription (e.g., 806A) of a first utterance (e.g., 860A) of a user based on audio data detected by (e.g., in response to detecting audio by) the one or more microphones (e.g., during a first time period) of the first utterance (e.g., one or more words and/or phrases); In some embodiments, because the air gesture of the first type is not being detected, the computer system detects the audio data and transcribes the first utterance.

During a dictation process (e.g., 902) and in accordance with a determination that an air gesture of a first type (e.g., a pinch-and-hold air gesture and/or a clenched first air gesture) is not being detected (e.g., as in FIG. 8C) (e.g., during the second time period) (e.g., via the physiological sensor and/or optical sensor), via the one or more input devices, while the user is uttering (e.g., during a second time period (e.g., 3 seconds, 7 seconds, and/or 20 seconds)) a second utterance (e.g., 860B) (e.g., one or more words and/or phrases), the computer system (e.g., 600) displays (906), via the display generation component (e.g., concurrently with the transcription of the first utterance), a transcription (e.g., 806B) (e.g., of the second utterance based on audio data detected (e.g., during the second time period) by the one or more microphones of the second utterance. In some embodiments, because the air gesture of the first type is not being detected, the computer system detects the audio data and transcribes the second utterance.

During a dictation process (e.g., 902) and in accordance with a determination that the air gesture (e.g., 850B) of the first type is being detected (e.g., as in FIG. 8D) (e.g., during the second time period) (e.g., via the accelerometer, physiological sensor, and/or optical sensor), via the one or more input devices, while the user is uttering (e.g., during the second time period) the second utterance (e.g., 860C at FIG. 8D), the computer system (e.g., 600) forgoes displaying a transcription of the second utterance (as in FIG. 8D). In some embodiments, because the air gesture of the first type is being detected (e.g., during the second time period), the computer system does not detect the audio data corresponding to the second utterance (e.g., during the second time period) (e.g., stops detecting an audio during the air gesture of the first type) and thus does not transcribe the second utterance. In some embodiments, because the air gesture of the first type is being detected (e.g., during the second time period), the computer system does not display the transcription of (and optionally does not transcribe) the second utterance based on audio data that is detected (e.g., during the second time period) of/during the second utterance. Pausing a dictation operation when an air gesture of the first type is detected enables a user of the computer system to interrupt a current dictation operation to speak without the content being transcribed, thereby improving the man-machine interface.

In some embodiments, during the dictation process (e.g., to dictate a message and/or to provide a command by voice) and in accordance with a determination that an air gesture of the first type (e.g., a pinch-and-hold air gesture and/or a clenched first air gesture) is not being detected (e.g., at FIG. 8E) (e.g., during the third time period) (e.g., via the physiological sensor and/or optical sensor), via the one or more input devices, while the user is uttering (e.g., during a third time period (e.g., 2 seconds, 4 seconds, and/or 5 seconds)) a third utterance (e.g., 860D) (e.g., one or more words and/or phrases), the computer system (e.g., 600) displays, via the display generation component (e.g., concurrently with the transcription of the first utterance and/or second utterance), a transcription (e.g., 806C at FIG. 8E) of the third utterance based on audio data detected (e.g., during the third time period) by the one or more microphones of the third utterance. In some embodiments, because the air gesture of the first type is not being detected, the computer system detects the audio data and transcribes the third utterance.

In some embodiments, during the dictation process and in accordance with a determination that the air gesture of the first type is being detected (e.g., during the third time period) (e.g., via the physiological sensor and/or optical sensor), via the one or more input devices, while the user is uttering (e.g., during the third time period) the third utterance, forgoing displaying a transcription of the third utterance. In some embodiments, because the air gesture of the first type is being detected (e.g., during the third time period), the computer system does not detect the audio data corresponding to the third utterance (e.g., during the third time period) (e.g., stops detecting an audio during the air gesture of the first type) and thus does not transcribe the third utterance. In some embodiments, because the air gesture of the first type is being detected (e.g., during the third time period), the computer system does not display the transcription of (and optionally does not transcribe) the third utterance based on audio data that is detected (e.g., during the third time period) of/during the third utterance. Pausing a dictation operation when an air gesture of the first type is detected and resuming the dictation operation when the air gesture of the first type is no longer detected enables a user of the computer system to interrupt and continue a dictation operation, thereby improving the man-machine interface.

In some embodiments, the air gesture of the first type is a pinch-and-hold air gesture (e.g., 850B) (e.g., a motion gesture (e.g., performed in the air and/or a performed using a hand on which the wearable computer system is worn) that includes movement of a first finger (e.g., a thumb) of a hand of a user coming together with a second finger (e.g., forefinger) of the same hand of the user and stay together for more than a threshold duration). In some embodiments, the tips of the first and second fingers come together. Using a pinch-and-hold gesture to pause a dictation operation enables a user of the computer system to use a single hand to interrupt a current dictation operation to speak without the content being transcribed, thereby improving the man-machine interface In some embodiments, during the dictation process and in accordance with a determination that the air gesture of the first type (e.g., 850B) is being detected (e.g., during the second time period) (e.g., via the accelerometer, physiological sensor, and/or optical sensor) via the one or more input devices, the computer system (e.g., 600) displays (e.g., for the duration of the air gesture of the first type being detected), via the display generation component, an indication (e.g., 810) (e.g., text indicated "paused") that audio is not being transcribed. Displaying an indication that audio is not being transcribed when the air gesture of the first type is being detected provides the user with visual feedback about the state of the computer system (e.g., no transcribing).

In some embodiments, during the dictation process and in accordance with a determination that the air gesture of the first type is being detected (e.g., during the second or third time period) (e.g., via the accelerometer, physiological sensor, and/or optical sensor), the computer system (e.g., 600) detects, via the one or more microphones, audio data (e.g., of the second utterance and/or of the third utterance). Detecting audio but pausing a dictation operation when an air gesture of the first type is detected enables a user of the computer system to interrupt a current dictation operation to speak without the content being transcribed, thereby improving the man-machine interface.

In some embodiments, during the dictation process and in accordance with a determination that the air gesture of the first type (e.g., 850D) is being detected (e.g., during the second or third time period) (e.g., via the accelerometer, physiological sensor, and/or optical sensor) via the one or more input devices, the computer system (e.g., 600) forgoes detecting (e.g., based on detecting the air gesture of the first type), by the one or more microphones, audio data (e.g., of the second utterance and/or of the third utterance). Not detecting audio and pausing a dictation operation when an air gesture of the first type is detected enables a user of the computer system to interrupt a current dictation operation to speak without the content being transcribed, thereby improving the man-machine interface.

In some embodiments, the computer system (e.g., 600) detects an end of the dictation process (e.g., based on a threshold amount of silence or lack of utterances while the air gesture of the first type is not being detected). In response to detecting the end of the dictation process, the computer system (e.g., 600) displays, via the display generation component, an option (e.g., 812) to transmit a message that includes text based on the transcription (e.g., the displayed transcription). Displaying an option to transmit the message when dictation ends reduces the number of inputs required from the user of the computer system.

In some embodiments, while displaying the option (e.g., 812) (which, when activated (e.g., tapped on sends the message) to transmit the message, the computer system (e.g., 600) detects, via the one or more input devices, a pinch-and-hold air gesture (e.g., 850D). In response to detecting the pinch-and-hold air gesture (e.g., 850D) (e.g., for more than a threshold amount of time), the computer system (e.g., 600) transmits the message. Detecting a pinch-and-hold gesture (e.g., for a threshold duration) to transmit the message enables a user to send the message using a single hand that is wearing the computer system. In some embodiments, the computer system uses the technique described with respect to FIG. 11 to detect the pinch-and-hold air gesture, display visual feedback, and activate button 812.

In some embodiments, while displaying the option (e.g., 812) to transmit the message, the computer system (e.g., 600) detects, via the one or more input devices, a touch input (e.g., 850C) (e.g., a tap on a touch screen) at a location corresponding to the option to transmit the message. In response to detecting the touch input (e.g., 850C), the computer system (e.g., 600) transmits the message. In some embodiments, a touch input (e.g., via a tap gesture) activation, detected via the touch-sensitive surface, of the indication that the message (e.g., an instant message and/or an email message) is ready to be sent causes the computer system to send the message. Transmitting the message in response to detecting a touch input on the option to transmit the message allows the user of the computer system to provide touch inputs to transmit the message without the need to perform an air gesture, thereby providing the user with additional techniques to control the computer system.

In some embodiments, the computer system (e.g., 600) includes a touch screen (e.g., 602) (e.g., that includes an integrated display and touch-sensitive surface). Providing the computer system with a touch screen that detects touch inputs enables the user of the computer system to control the computer system in multiple ways, thereby enhancing the man-machine interface.

In some embodiments, the transcription of the first utterance (e.g., 860A) of the user is not based on input received at the touch screen (e.g., 602). Not using the touch screen to provide the data being transcribed enables the user of the computer system to provide data without the need to touch the touch screen, thereby improving the speed at which the user provides the data (e.g., audio input is faster than touch input).

In some embodiments, the air gesture (e.g., 850B) of the first type does not include contact of the touch screen (e.g., 602). In some embodiments, the air gesture of the first type does not include a touch input component on a touch-sensitive surface. Using an air gesture that does not rely on the touch screen enables the user of the computer system to provide the air gesture using the same hand that the computer system is being worn on, thereby providing an improved man-machine interface.

In some embodiments, the computer system (e.g., 600) is a wearable computer system that is worn on a hand (e.g., 640) of the user and the air gesture (e.g., 850B) of the first type is performed by the hand (e.g., 640) of the user on which the wearable computer system (e.g., 600) is worn. Providing a user with the ability to control the computer system using the same hand on which the computer system is worn enables the user of the computer system to control the computer system with a single hand, thereby improving the man-machine interface.

Note that details of the processes described above with respect to method 900 (e.g., FIG. 9) are also applicable in an analogous manner to the methods described below/above. For example, method 900 optionally includes one or more of the characteristics of the various methods described above with reference to methods 700, 1100, 1300, and 1500. For example, the computer system is the same computer system. For another example, the air gestures optionally perform the same operations. For brevity, these details are not repeated below.

FIGS. 10A-10E illustrate exemplary user interfaces for activating a displayed option, in accordance with some embodiments. The user interfaces in these figures are used to illustrate the processes described below, including the processes in FIG. 11.

Figure 10A:
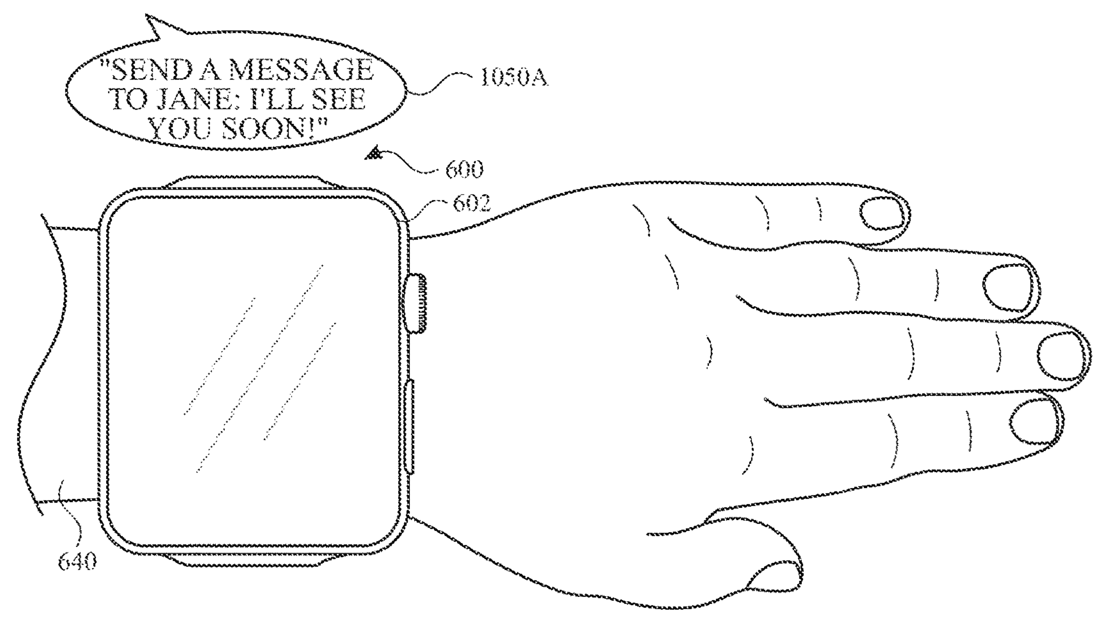
FIGS. 10A-10E illustrate exemplary user interfaces for activating a displayed option, in accordance with some embodiments.

FIG. 10A illustrates computer system 600 (e.g., a smartwatch) that is worn on a wrist of a hand 640 (e.g., left hand) of a user of computer system 600. Computer system 600 includes a plurality of input devices, such as a gyroscope, an accelerometer, touchscreen 602, and one or more physiological sensors. In some embodiments, the one or more physiological sensors include a blood pressure sensor, a heart rate sensor, and/or an electromyography (EMG) sensor. In some embodiments, the EMG sensor (e.g., a surface EMG sensor) measures electrical activity and/or muscle response by sensing electromyographic signals generated by a user's muscles as the muscles are moved. In some embodiments, the EMG sensor senses and/or measures electrical impulses generated when a user's muscles contract. In some embodiments, computer system 600 includes an EMG sensor that senses electromyographic signals of hand 640 to determine whether a gesture is being performed by hand 640 and, if so, what gesture is being performed. For example, the EMG sensor (with or without the use of the accelerometer) is used to detect whether a pinch-and-hold air gesture is performed and for how long the gesture (e.g., the pinch) is maintained. In some embodiments, the accelerometer is used to detected whether a gesture is being performed by hand 640 and, if so, what gesture is being performed. For example, the accelerometer (with or without the use of the EMG sensor) is used to detect whether a pinch air gesture is performed.

At FIG. 10A, computer system 600 detects, via a microphone, utterance 1050A to send a message to Jane, a user of a remote device. For example, utterance 1050A includes a command portion (e.g., "Send a message to Jane:") and a message portion (e.g., "I'll see you soon!"). At FIG. 10B, in response to detecting utterance 1050A, a voice assistant program of computer system 600 prepares the requested message and displays user interface 1004 that includes corresponding draft message 1004A and send option 812 (e.g., a default operation of user interface 1004). Draft message 1004A includes a transcript of a portion of utterance 1050A (e.g., the message portion of the utterance). In some embodiments, in response to detecting utterance 1050A, computer system 600 begins monitoring for air gesture inputs provided by the user (e.g., while the draft message 1004A is displayed). In some embodiments, computer system 600 is monitoring for air gesture inputs prior to detecting utterance 1050A and continues monitoring for air gesture inputs after detecting utterance 1050A (e.g., while the draft message 1004A is displayed). At FIG. 10B, in response to detecting utterance 1050A, computer system 600 outputs tactile output 1040A (e.g., a haptic output) to indicate to the user that computer system 600 is monitoring for air gesture inputs.

Figure 10B:
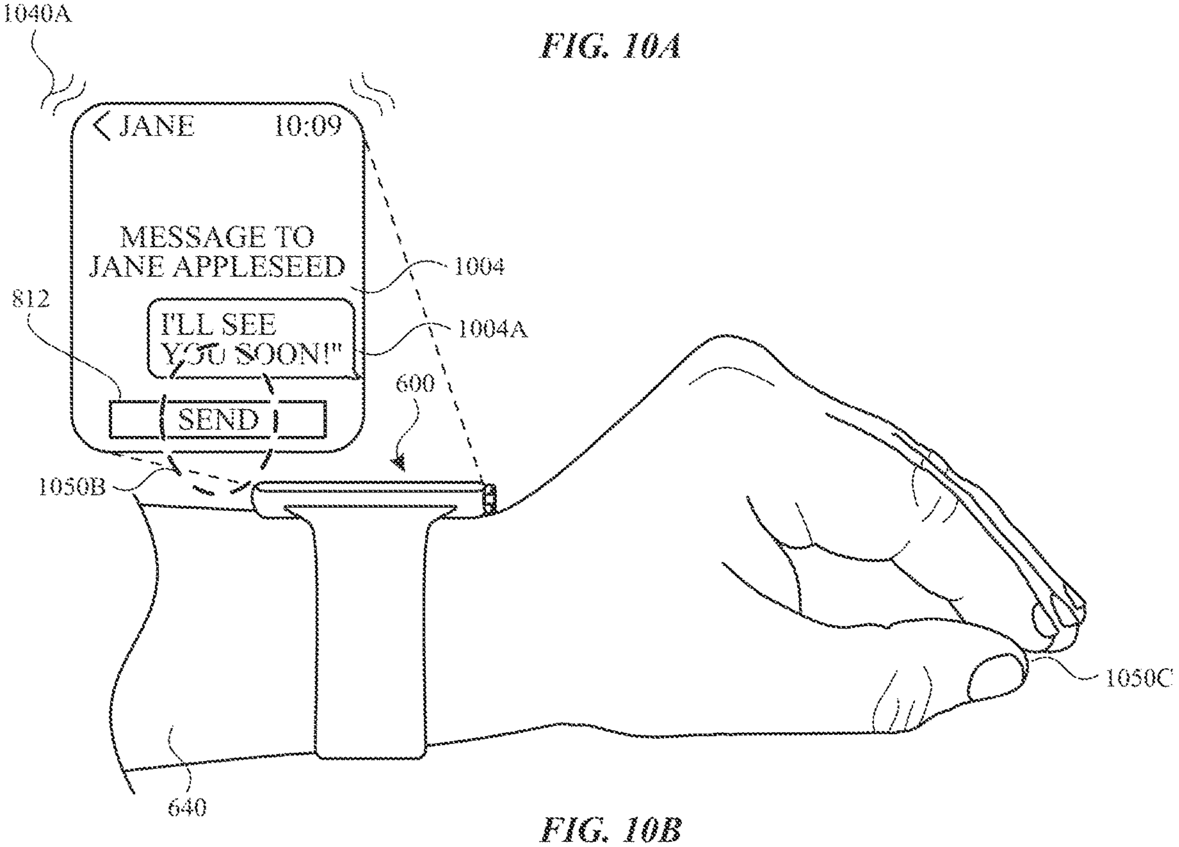

At FIG. 10B, send option 812 can be activated through either an air gesture (e.g., pinch-and-hold air gesture 1050C and/or a double pinch-and-hold air gesture) or a touch input (e.g., a tap on send option 812) (e.g., based on send option 812 being the default operation of the displayed user interface). The ability to activate send option 812 via an air gesture enables the user of computer system 600 to activate the option without using an additional hand (e.g., without using their right hand) and without providing audio input. At FIG. 10B, in order to activate send option 812 the user begins performing pinch-and-hold air gesture 1050C. At FIG. 10B, computer system 600 detects the beginning of pinch-and-hold air gesture 1050C and, in response, begins to show an indication of progress towards activating send option 812, as shown in FIG. 10C.

Figures 10C, 10D:
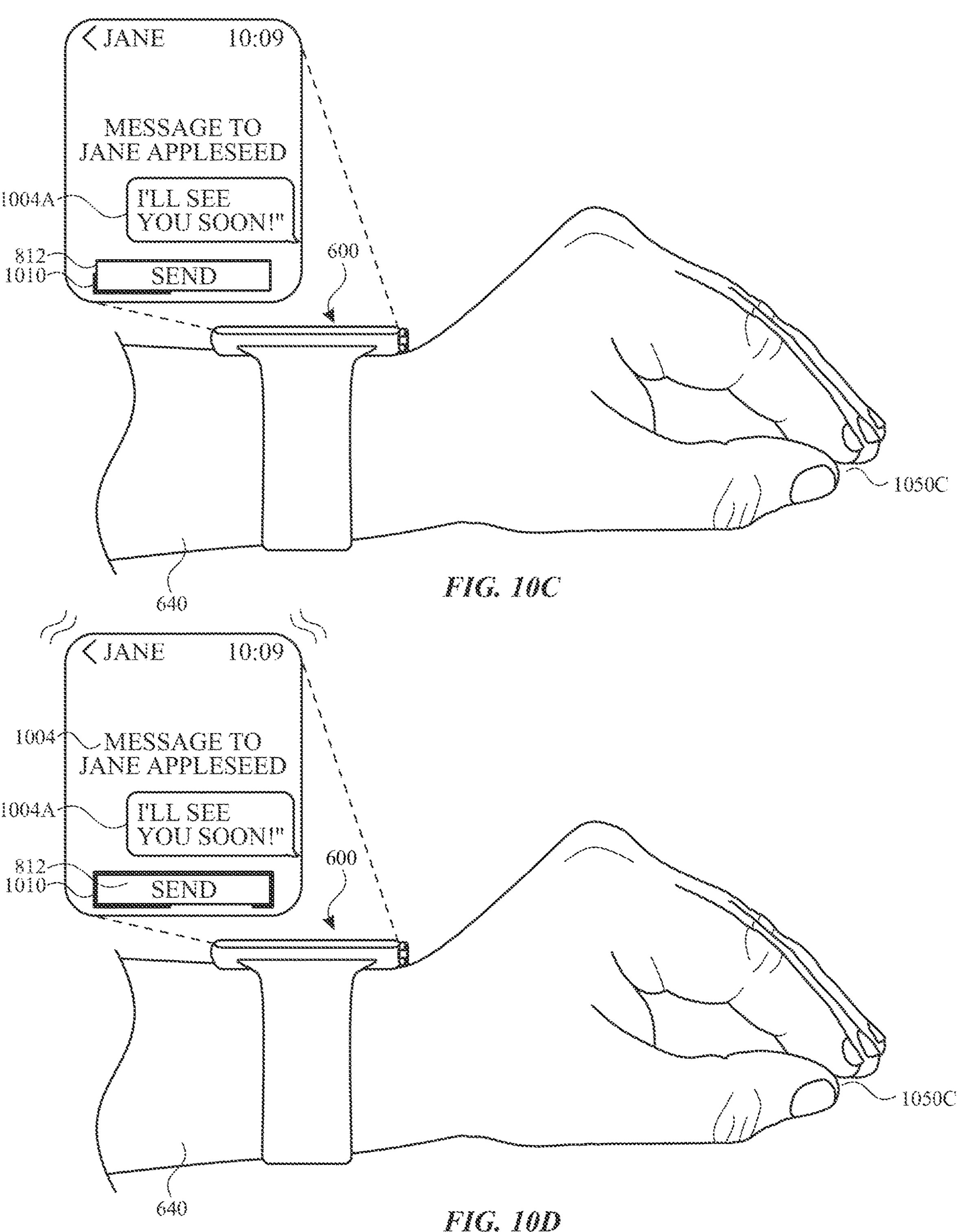

At FIG. 10C, progress indicator 1010 has begin progressing around an edge of send option 812. The amount of progress made by progress indicator 1010 around the edge of send option 812 is based on the amount of time that pinch-and-hold air gesture 1050C has been detected and a threshold duration of time (e.g., 1 second, 2 seconds, or 5 seconds) for activation of send option 812. In this example, computer system 600 activates send option 812 once a pinch-and-hold air gesture has been detected for 2 seconds (the threshold duration of time) and, at FIG. 10C, pinch-and-hold air gesture 1050C has been held for 0.5 seconds. Accordingly, progress indicator 1010 fills in to a certain percentage, e.g., 25% (based on 0.5 seconds/2 seconds) of the edge of send option 812. In some embodiments, in response to detecting that pinch-and-hold air gesture 1050C is released (the user is no longer pinching) before the threshold duration of time has been reached, the progress indicator is reset (e.g., send button 1010 reverts to the appearance as in FIG. 10B) and the message is not sent. In some embodiments, at FIG. 10C, a tap input on send option 812 (e.g., while progress indicator 1010 continues to progress) would cause computer system 600 to transmit the message before the threshold duration of time has been reached. As computer system 600 continues to detect pinch-and-hold air gesture 1050C being held, progress indicator 1010 continues to progress, as shown in FIG. 10D.

At FIG. 10D, computer system 600 displays progress indicator 1010 as indicating significant progress, e.g., about 90% progress, towards transmitting the message. Accordingly, computer system 600 displays the progress in detecting the user's input to send the message, while giving the user the opportunity to release the pinch-and-hold air gesture before the threshold duration of time is reached to not send the message. At FIG. 10D, computer system 600 indicates that about 90% of the threshold duration of time has passed while pinch-and-hold air gesture 1050C continues to be detected.

Figure 10E:
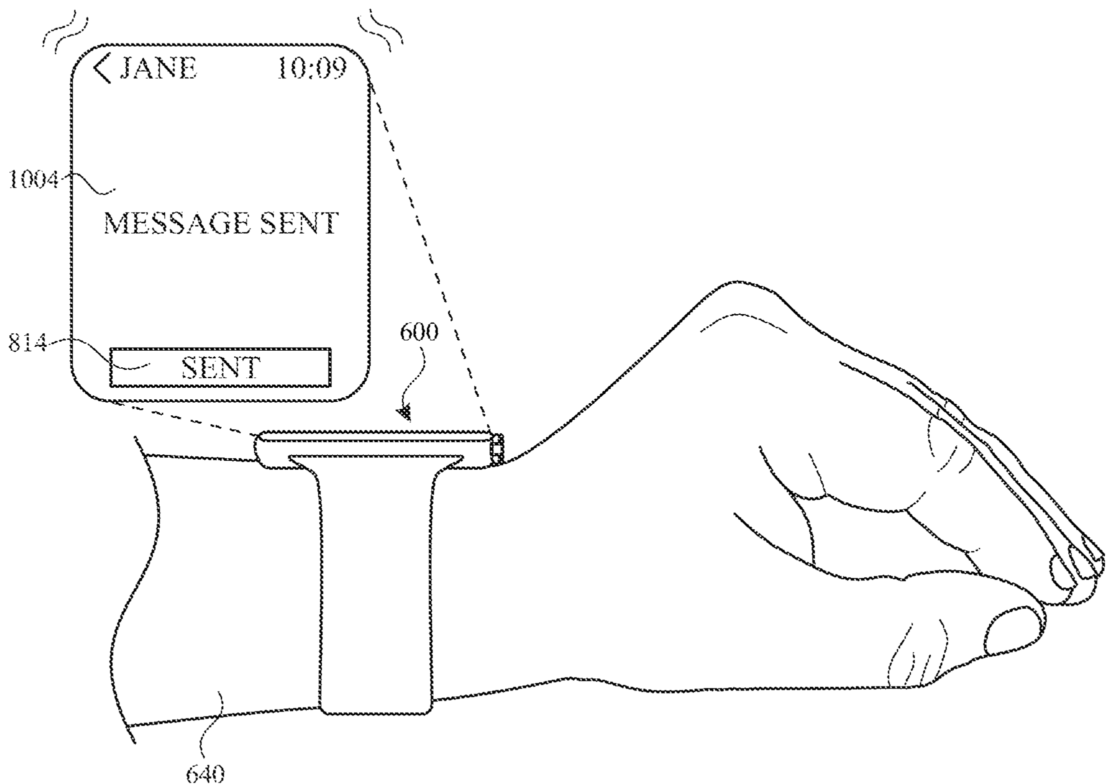

At FIG. 10E, computer system 600 detects that pinch-and-hold air gesture 1050C has been continuously held (detected) for the duration of the threshold duration of time and, in response, transmits the message. At FIG. 10E, computer system 600 updates user interface 1004 to indicate that pinch-and-hold air gesture 1050C has been continuously held (detected) for the duration of the threshold duration of time and/or that the message has been sent. In this example, send option 812 is replaced with indication 814 that the message has been sent.

FIG. 11 is a flow diagram illustrating a method for activating a displayed option using a computer system in accordance with some embodiments. Method 1100 is performed at a computer system (e.g., 100, 300, 500, and/or 600) (e.g., a smartwatch, a wearable device, and/or a smartphone) (e.g., that is worn on a hand of a user (e.g., worn on a wrist of the user and/or worn on one or more fingers of a user)) that is in communication with one or more input devices (e.g., a touch-sensitive surface, a touchscreen display, a button, a keyboard, a mouse, a joystick, a camera sensor, and/or a microphone) that include a physiological sensor (e.g., a blood pressure sensor, a heart rate sensor placed against the body (wrist or fingers) of the user, configured to track heart-related metrics such as heart rate and/or blood flow, and/or an electromyography sensor): In some embodiments, the computer system is also in communication with a display generation component (e.g., a display controller, a display, a touch-sensitive display system, a touchscreen, and/or a monitor). In some embodiments, the physiological sensor is or includes an optical sensor. Some operations in method 1100 are, optionally, combined, the orders of some operations are, optionally, changed, and some operations are, optionally, omitted.

As described below, method 1100 provides an intuitive way for activating a displayed option. The method reduces the cognitive burden on a user for activating the option, thereby creating a more efficient human-machine interface. For battery-operated computing devices, enabling a user to activate a desired option faster and more efficiently conserves power and increases the time between battery charges.

The computer system (e.g., 600) receives (1102), via the one or more input devices (e.g., using the physiologic sensor/optical sensor or not using the physiological sensor/optical sensor, such as by using one or more microphones or a button of the computer system), an input (e.g., 1050A) (e.g., an utterance) related to a voice assistant.

In response to receiving the input (e.g., 1050A) related to the voice assistant, the computer system (e.g., 600) outputs (1104) (e.g., via a speaker and/or the display generation component (e.g., 602)) voice assistant data (e.g., 1004 and/or 1004A) (e.g., content based on a received utterance and/or a prompt); In some embodiments, the computer system is not monitoring for air gestures when the input related to the voice assistant output mode is received. In some embodiments, the computer system initiates monitoring (e.g., in response to receiving the input to initiate the voice assistant output mode), via the physiological sensor/optical sensor, for one or more air gestures (e.g., performed using a hand on which the computer system is worn and/or performed using a hand different from the hand on which the computer system is worn) when the voice assistant data is output and, optionally, ceases monitoring for one or more air gestures when the voice assistant data ceases to be output. In some embodiments, the computer system monitors for one or more air gestures independent of whether voice assistant data is being output.

The computer system (e.g., 600) detects (1106), via the physiological sensor, a respective air gesture (e.g., 1050C at FIGS. 10B-10D) (e.g., performed using a hand on which the computer system is worn and/or performed using a hand different from the hand on which the computer system is worn).

In response (1108) to detecting the respective air gesture (e.g., during the voice assistant output mode or not during the voice assistant output mode) in accordance with a determination that a set of one or more conditions is met, including a first condition that is met when the respective air gesture is detected while the voice assistant data is being output (e.g., while the voice assistant data is displayed and/or while the voice assistant data is being output via a speaker), the computer system (e.g., 600) performs (1110) an operation (e.g., send, as shown in FIG. 10E) that corresponds to the respective air gesture.

In response (1108) to detecting the respective air gesture and in accordance with a determination that the set of one or more conditions is not met (e.g., at FIGS. 10B-10C, threshold duration not (yet) met), the computer system (e.g., 600) forgoes (1112) performing the operation that corresponds to the respective air gesture. Detecting the air gesture performs an operation when a set of conditions is met without requiring further inputs, thereby improving the man-machine interface. In addition, performing the operation when the air gesture is detected while the voice assistant data is output enables the user of the computer system to quickly and easily take action based on the voice assistant data being output.

In some embodiments, outputting voice assistant data includes displaying, via a display generation component, an indication (e.g., 812) that a message (e.g., an instant message and/or an email message) is ready to be sent (e.g., to a recipient and/or to a group of recipients). The input (e.g., an utterance) related to the voice assistant is an utterance (e.g., 1050A) detected by one or more microphones of the computer system (e.g., 600). The message is based on (e.g., a transcription of) the utterance. The set of one or more conditions includes a second condition that is met when the respective air gesture is a pinch-and-hold air gesture (e.g., 1050C) that is detected for more than a threshold duration of time (e.g., during FIGS. 10B-10D). The operation that corresponds to the respective air gesture is sending the message (e.g., as shown in FIG. 10E) (e.g., to a recipient and/or to a group of recipients). Sending the message when a pinch-and-hold air gesture is detected for more than the threshold duration of time enables the user to quickly and easily send the message using the same hand on which the computer system is being worn, thereby improving the man-machine interface.

In some embodiments, in response to detecting (e.g., a start of) the respective air gesture (e.g., 1050C), the computer system (e.g., 600) displays, via the display generation component, a progress indicator (e.g., 1010) that progresses over time (as the pinch-and-hold air gesture is detected), wherein a location of the progress indicator (e.g., 1010) is based on a location of the indication (e.g., 812) that the message is ready to send. In some embodiments, the indication that the message is ready to send is a selectable (e.g., via a tap input on a touch screen or touch-sensitive surface)

option that, when selected, sends the message. In some embodiments, the progress indicator increases in length and/or size over time and wraps around the selectable option. Displaying a progress indicator that progresses over time provides the user with visual feedback of the progress. By placing the progress indicator at a location that is based on the location of the indication that the message is ready to send, the user can view the indication that the message is ready to send and continue to look at the same location to see the progress before the message is sent.

In some embodiments, the progress indicator (e.g., 1010) that progresses over time indicates completion when the pinch-and-hold air gesture is detected for the threshold duration of time. In some embodiments, the progress indicator wraps around (over time) the indication that the message is ready to send and the message is sent once the progress indicator finishes wrapping around the indication that the message is ready to send. Sending the message once the progress indicator wraps around the send button provides the user with visual feedback that the message has been sent.

In some embodiments, the computer system (e.g., 600) includes a touch-sensitive surface (e.g., 602) (e.g., integrated into a display to form a touchscreen). Providing the computer system with a touch screen that detects touch inputs enables the user of the computer system to control the computer system in multiple ways, thereby enhancing the man-machine interface.

In some embodiments, contents of the message (e.g., 1004A) are not based on touch gestures received via the touch-sensitive surface. In some embodiments, the computer system receives the message via input devices other than the touch-sensitive surface, such as one or more microphones of the computer system. Receiving the contents of the message not using the touch gestures enables the user to more quickly provide the data used for the content (e.g., via voice input).

In some embodiments, the pinch-and-hold air gesture (e.g., 1050C) does not include input detected by the touch-sensitive surface (e.g., 602). Not using the touch-sensitive surface to detect the pinch-and-hold air gesture enables the user of the computer system to provide the air gesture using the same hand on which the computer system is worn.

In some embodiments, a touch input (e.g., 1050B) (e.g., via a tap gesture) activation, detected via the touch-sensitive surface, of the indication that the message (e.g., an instant message and/or an email message) is ready to be sent causes the computer system (e.g., 600) to send the message. Transmitting the message in response to detecting a touch input on the option to transmit the message allows the user of the computer system to provide touch inputs to transmit the message without the need to perform an air gesture, thereby providing the user with additional techniques to control the computer system.

In some embodiments, in response to receiving the input (e.g., 1050A) related to the voice assistant, the computer system (e.g., 600) outputs (e.g., via a tactile output component and/or in conjunction with starting to output the voice assistant data) a first tactile output (e.g., 1040A) (e.g., a haptic output). In some embodiments, outputting the voice assistant data includes visually displaying voice assistant information and/or outputting an audio announcement. In some embodiments, the outputting of the first tactile output indicates to the user that the computer system is now monitoring for air gestures. Outputting tactile output when starting to output (e.g., via a speaker and/or the display generation component) the voice assistant data provides the user with feedback that the input related to the voice assistant has been received, that the output is being output, and/or that air gestures can be provided, thereby providing the user with improved feedback.

In some embodiments, in response to ending (and/or completing) outputting the voice assistant data, the computer system (e.g., 600) outputs (e.g., via a tactile output component and/or in conjunction with ending output of the voice assistant data) a second tactile output. In some embodiments, the outputting of the second tactile output indicates to the user that the computer system is no longer monitoring for air gestures. Outputting tactile output when ending output (e.g., via a speaker and/or the display generation component) of the voice assistant data provides the user with feedback that the output has ended and/or that air gestures can no longer be provided (based on the voice assistant data being output), thereby providing the user with improved feedback.

In some embodiments, while the computer system (e.g., 600) is outputting the voice assistant data (e.g., 1004 and/or 1004A), the computer system (e.g., 600) detects, via the physiological sensor, a double-pinch air gesture. In response to detecting the double-pinch air gesture, the computer system (e.g., 600) ceases outputting the voice assistant data (e.g., without performing an additional operation). In some embodiments, the computer system is outputting voice assistant data by outputting speech of a notification and/or received message and, in response to detecting the double-pinch air gesture, the computer system ceases outputting the speech of the notification and/or received message. Dismissing the output of the voice assistant data in response to a double-pinch air gesture allows the user of the computer system to quickly dismiss the voice assistant using the hand that is wearing the computer system, thereby improving the man-machine interface.

In some embodiments, performing the operation that corresponds to the respective air gesture includes performing a default operation corresponding to a currently displayed user interface (e.g., sending a message and/or capturing an image). Performing the default operation of the currently displayed user interface when the respective air gesture is detected enables the computer system to perform the most likely operation that the user will want, thereby reducing the number of inputs required to perform the operation.

In some embodiments, the respective air gesture is a single-pinch air gesture (or, optionally, a pinch-and-hold air gesture). In some embodiments, a pinch air gesture (also referred to as a single-pinch air gesture) is a motion gesture (e.g., performed in the air and/or a performed using a hand on which the wearable computer system is worn) that includes movement of a first finger of a hand of a user coming together with a second finger of the same hand of the user (e.g., the tips of the fingers come together). In some embodiments, a pinch-and-hold gesture includes holding the pinch for more than a threshold duration of time. Performing the operation based on the respective air gesture being a single-pinch air gesture enables the user of the computer system to provide the input using the same hand on which the computer system is being worn, thereby improving the man-machine interface.

In some embodiments, the respective air gesture is a double-pinch air gesture (or, optionally, a double-pinch-and-hold air gesture). In some embodiments, a double-pinch air gesture is a motion gesture (e.g., performed in the air and/or a performed using a hand on which the wearable computer system is worn) that includes movement (twice) of a first finger of a hand of a user coming together with a second finger of the same hand of the user (e.g., the tips of the fingers come together). In some embodiments, a double-pinch-and-hold gesture includes holding the second pinch for more than a threshold duration of time. Performing the operation based on the respective air gesture being a double-pinch air gesture enables the user of the computer system to provide the input using the same hand on which the computer system is being worn, thereby improving the man-machine interface.

In some embodiments, outputting voice assistant data includes outputting, via one or more speakers (e.g., headphones and/or headset), speech (e.g., computer-generated speech) corresponding to (e.g., of contents of) a received message (e.g., an instant message and/or an email message). Outputting the speed of the contents of a received message provides the user with audio feedback about the contents of the message, thereby providing improved feedback.

In some embodiments, performing the operation that corresponds to the respective air gesture includes initiating a recording and/or transcribing of audio (e.g., utterances) as part of a response (e.g., via instant message and/or email message) to the received message. Performing the operation including initiating a process to respond to the message being output enables the user to quickly reply to the message, thereby reducing the number of inputs required.

In some embodiments, outputting voice assistant data includes outputting (e.g., via one or more speakers, via audio output, via displayed content) a request for a user of the computer system to confirm to perform the operation that corresponds to the respective air gesture. The computer system getting user-confirmation to perform the operation helps ensure that the operation is not performed unintentionally.

In some embodiments, outputting voice assistant data includes outputting (e.g., via one or more speakers, via audio output, via displayed content) an indication that a proposed calendar event conflicts (e.g., in time and/or in location) with an existing calendar event. In some embodiments, the respective air gesture is a pinch air gesture or a double-pinch air gesture. In some embodiments, the operation that corresponds to the respective air gesture (e.g., a pinch air gesture) is a confirmation to create (e.g., send out requests for) the proposed calendar event. In some embodiments, the operation that corresponds to the respective air gesture (e.g., a double-pinch air gesture) is a cancellation (e.g., cancel the creating of) the proposed calendar event. Thus, the computer system creates the event when a single pinch air gesture is created and cancels the creation of the event when a double-pinch air gesture is detected. Providing the user with information indicating that a proposed calendar event conflicts provides the user with feedback about the state of the device, thereby providing improved feedback.

In some embodiments, the computer system (e.g., 600) is a wearable computer system that is worn on a hand (e.g., 640) of the user and the respective air gesture (e.g., 1050C) is a gesture performed by the hand (e.g., 640) of the user on which the wearable computer system (e.g., 600) is worn. Enabling a user to control the computer system using the same hand on which the computer system is worn enables the user of the computer system to control the computer system with a single hand, thereby improving the man-machine interface.

Note that details of the processes described above with respect to method 1100 (e.g., FIG. 11) are also applicable in an analogous manner to the methods described below/above. For example, methods 700, 900, 1300, and/or 1500 optionally include one or more of the characteristics of the various methods described above with reference to method 1100. For example, the computer system is the same computer system. For another example, the air gestures optionally perform the same operations. For brevity, these details are not repeated below.

FIGS. 12A-12E illustrate exemplary user interfaces for using a gesture to change a mode of operation, in accordance with some embodiments. The user interfaces in these figures are used to illustrate the processes described below, including the processes in FIG. 13.

Figure 12A:
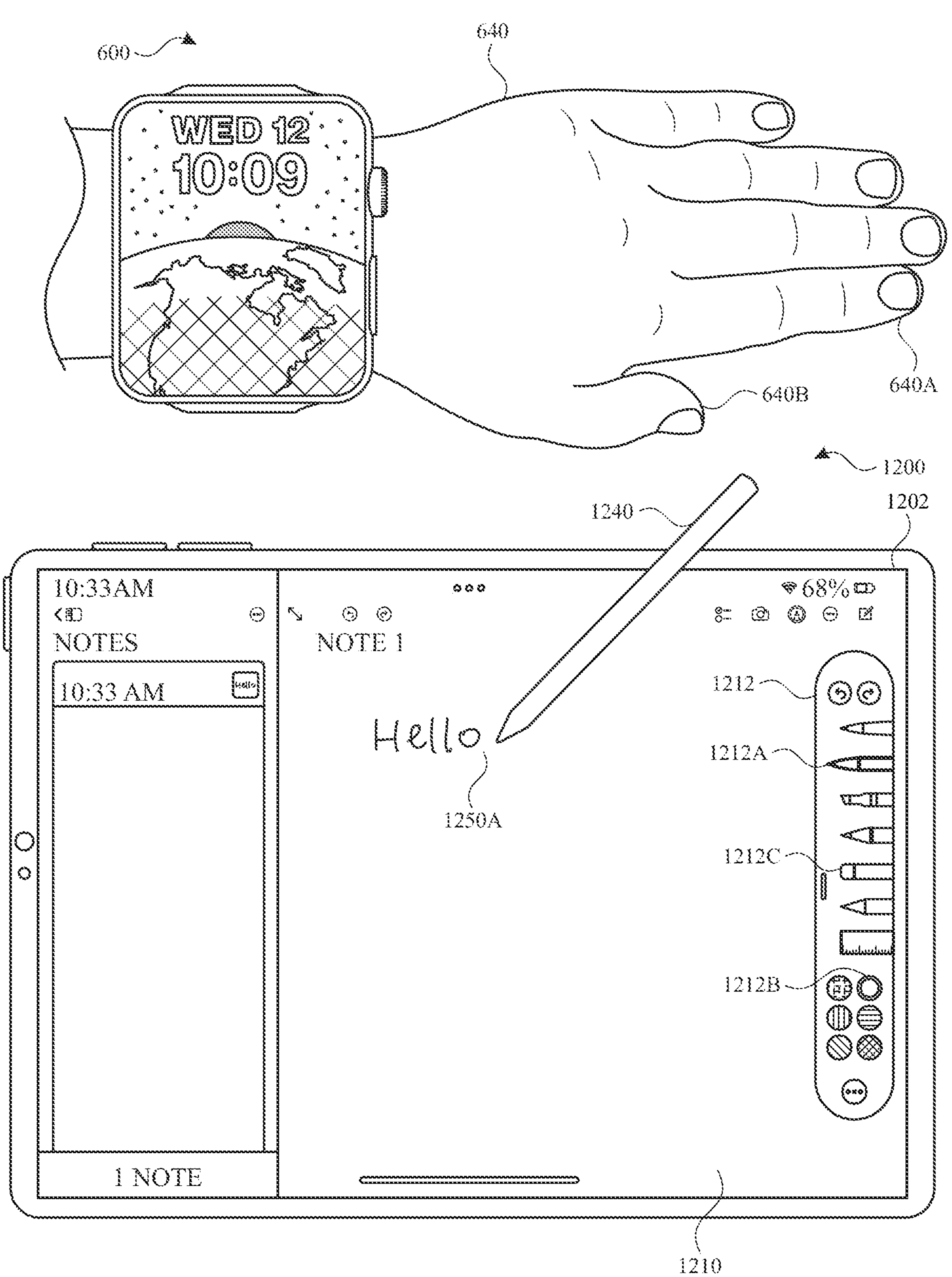
FIGS. 12A-12E illustrate exemplary user interfaces for using a gesture to change a mode of operation, in accordance with some embodiments.

FIG. 12A illustrates computer system 1200 that is in wireless communication with computer system 600 (e.g., an external device). Computer system 1200 includes touchscreen (touch-sensitive display) 1202 that can detect touch inputs. Computer system 600 includes a plurality of input devices, such as a gyroscope, an accelerometer, touchscreen 602, and one or more physiological sensors. In some embodiments, the one or more physiological sensors include a blood pressure sensor, a heart rate sensor, and/or an electromyography (EMG) sensor. In some embodiments, the EMG sensor (e.g., a surface EMG sensor) measures electrical activity and/or muscle response by sensing electromyographic signals generated by a user's muscles as the muscles are moved. In some embodiments, the EMG sensor senses and/or measures electrical impulses generated when a user's muscles contract. In some embodiments, computer system 600 includes an EMG sensor that senses electromyographic signals of hand 640 to determine whether a gesture is being performed by hand 640 and, if so, what gesture is being performed. For example, the EMG sensor (with or without the use of the accelerometer) is used to detect whether a pinch-and-hold air gesture is performed and for how long the gesture (e.g., the pinch) is maintained. In some embodiments, the accelerometer is used to detected whether a gesture is being performed by hand 640 and, if so, what gesture is being performed. For example, the accelerometer (with or without the use of the EMG sensor) is used to detect whether a pinch air gesture is performed. In some embodiments, the EMG sensor and/or the accelerometer is used to detect a swipe air gesture, such as with thumb 640B moving along forefinger 640A.

At FIG. 12A, computer system 1200 is displaying, via touchscreen 1202, drawing user interface 1210, which includes toolbar 1212 for selecting drawing and erasing tools, of a drawing application. Computer system 1200 detects touch inputs (e.g., by a finger and/or by a stylus) at drawing user interface 1210 via touchscreen 1202 and, in response, performs respective operations (e.g., simulated pen strokes, simulated marker strokes, and/or erasures). For example, a user is wearing computer system 600, which is a wearable watch device, on their left hand 640 while the user holds stylus 1240 in their right hand. At FIG. 12A, while computer system 600 does not detect a pinch gesture (e.g., computer system 600 communicates to computer system 1200 that it is not detecting a pinch gesture and/or computer system 600 does not communicate to computer system 1200 that it is detecting the pinch gesture), computer system 1200 detects, via touchscreen 1202, touch inputs in the form of strokes 650A by stylus 1240 that write out "Hello". Because the pinch gesture is not detected during strokes 650A, computer system 1200 operates in a write mode (as indicated by toolbar 1212 highlighting pencil tool 1212A with color 1212B) and performs a write operation to write "Hello" based on strokes 650A.

Figure 12B:
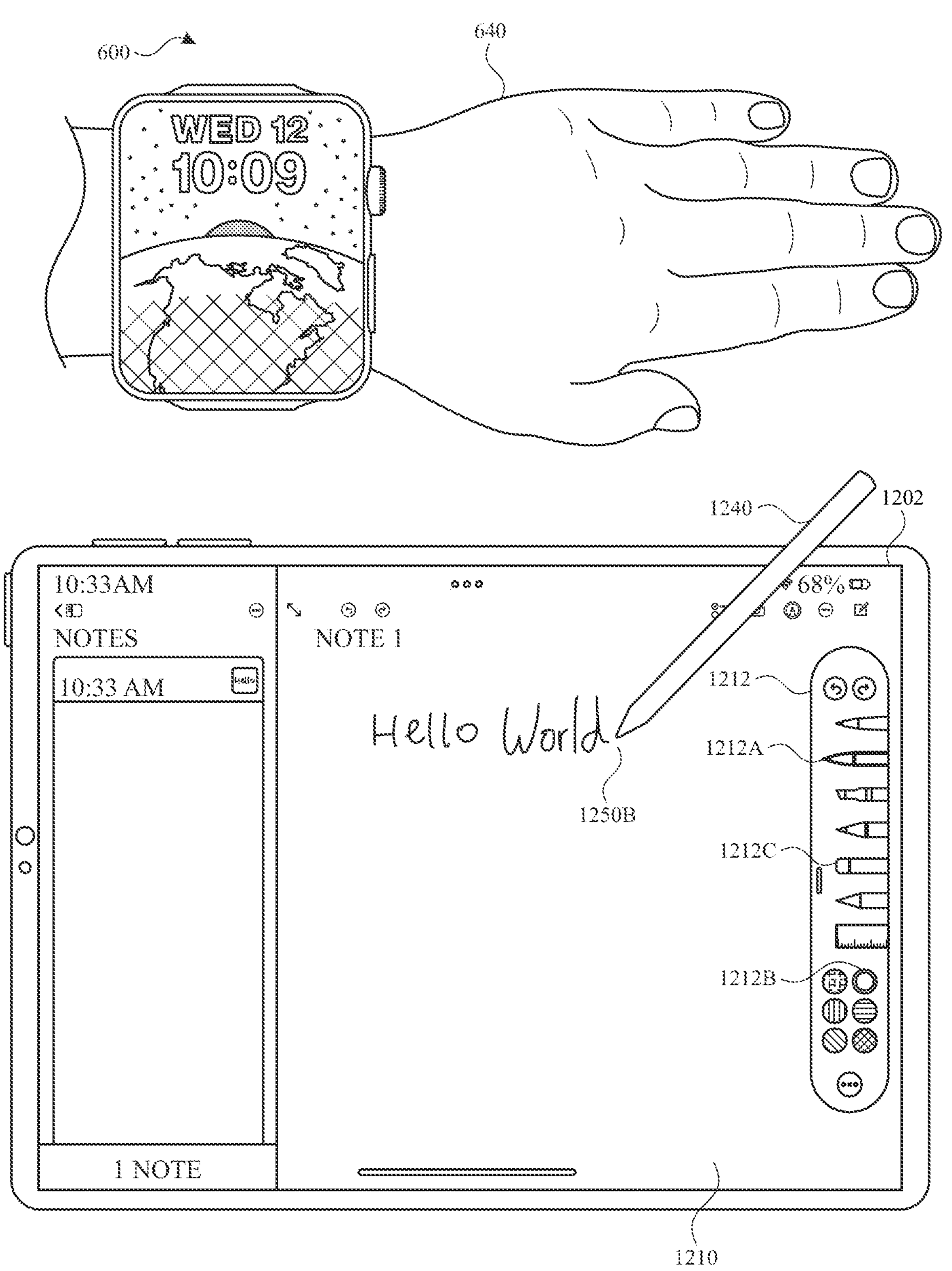

At FIG. 12B. while computer system 600 continues to not detect a pinch gesture (e.g., computer system 600 communicates to computer system 1200 that it is not detecting a pinch gesture and/or computer system 600 does not communicate to computer system 1200 that it is detecting the pinch gesture), computer system 1200 detects, via touchscreen 1202, touch inputs in the form of strokes 1250B by stylus 1240 that write out "World". Because the pinch gesture is not detected during strokes 1250B, computer system 1200 operates in a write mode (as indicated by toolbar 1212 highlighting pencil tool 1212A with color 1212B) and performs a write operation to write "World" based on strokes 1250B.

Figure 12C:
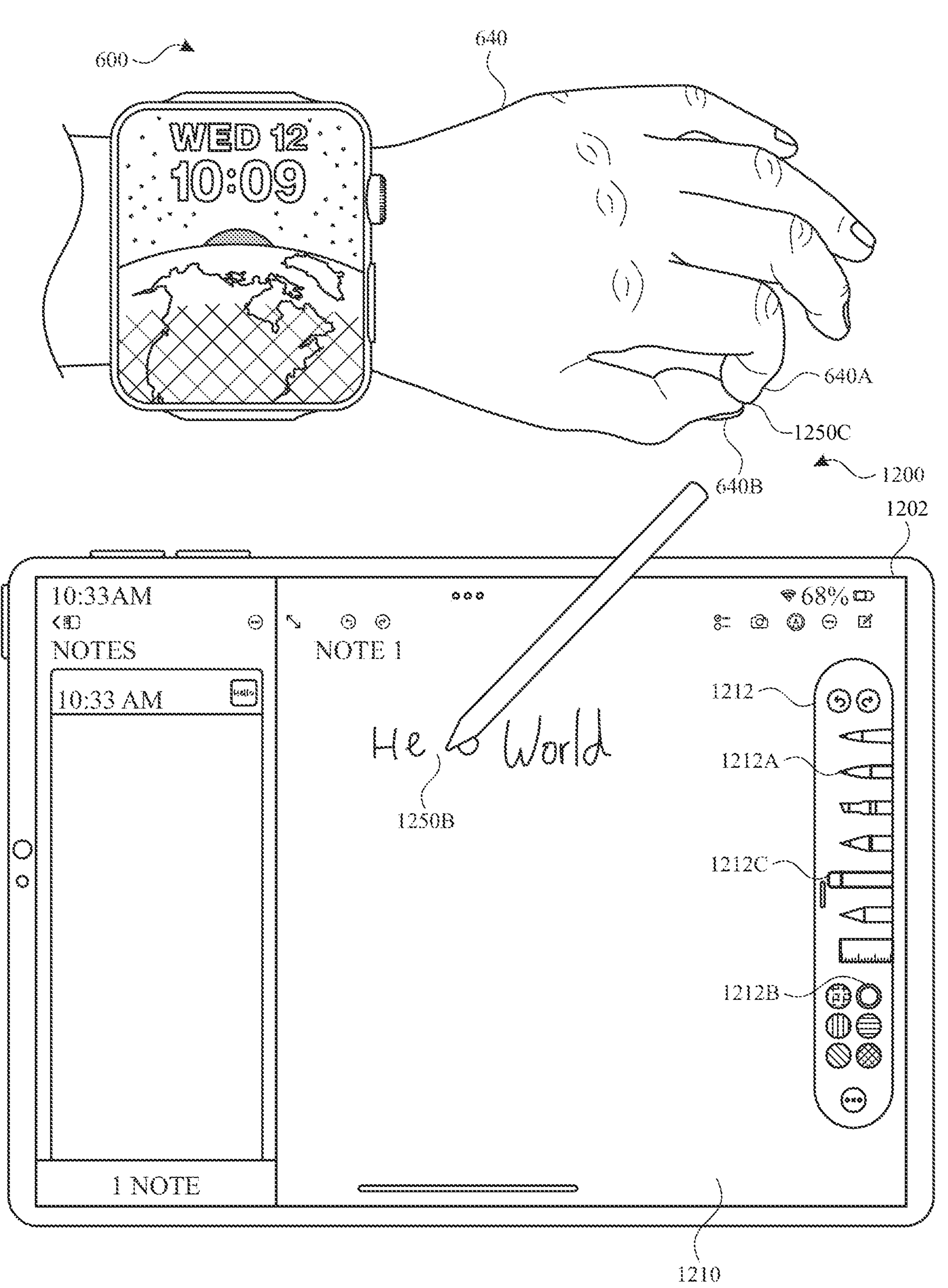

At FIG. 12C, computer system 600 detects pinch gesture 1250C being performed by hand 640 (e.g., the tips of forefinger 640A and thumb 640B are being held together) and communicates to computer system 1200 that the pinch gesture is detected (e.g., communicates the start and end of the pinch gesture, or communicates while the pinch gesture is ongoing). In accordance with a determination that hand 640 is performing pinch gesture 1250C, computer system 600 transitions to an erasure mode. At FIG. 12C, while pinch gesture 1250C is being performed, computer system 1200 detects, via touchscreen 1202, touch inputs in the form of strokes 1250D by stylus 1240 that overlap the previously written letters "ll" in "Hello". Because pinch gesture 650C is detected during strokes 1250D, computer system 1200 operates in an erasure mode (as indicated by toolbar 1212 highlighting eraser tool 1212C and not pencil tool 1212A) and performs an erase operation to erase "ll" from the writing "Hello" based on strokes 650D. To switch back to the write mode, the user simply releases the pinch gesture, which is detected by computer system 600 and communicated to computer system 1200. Accordingly, a user can quickly, easily, and efficiently transition between the write mode (or any selected first mode) to the erasure mode (or any selected second mode) by performing a gesture (e.g., a predefined gesture or a user-selected gesture) with a hand wearing computer system 600.

Figures 12D, 12E:
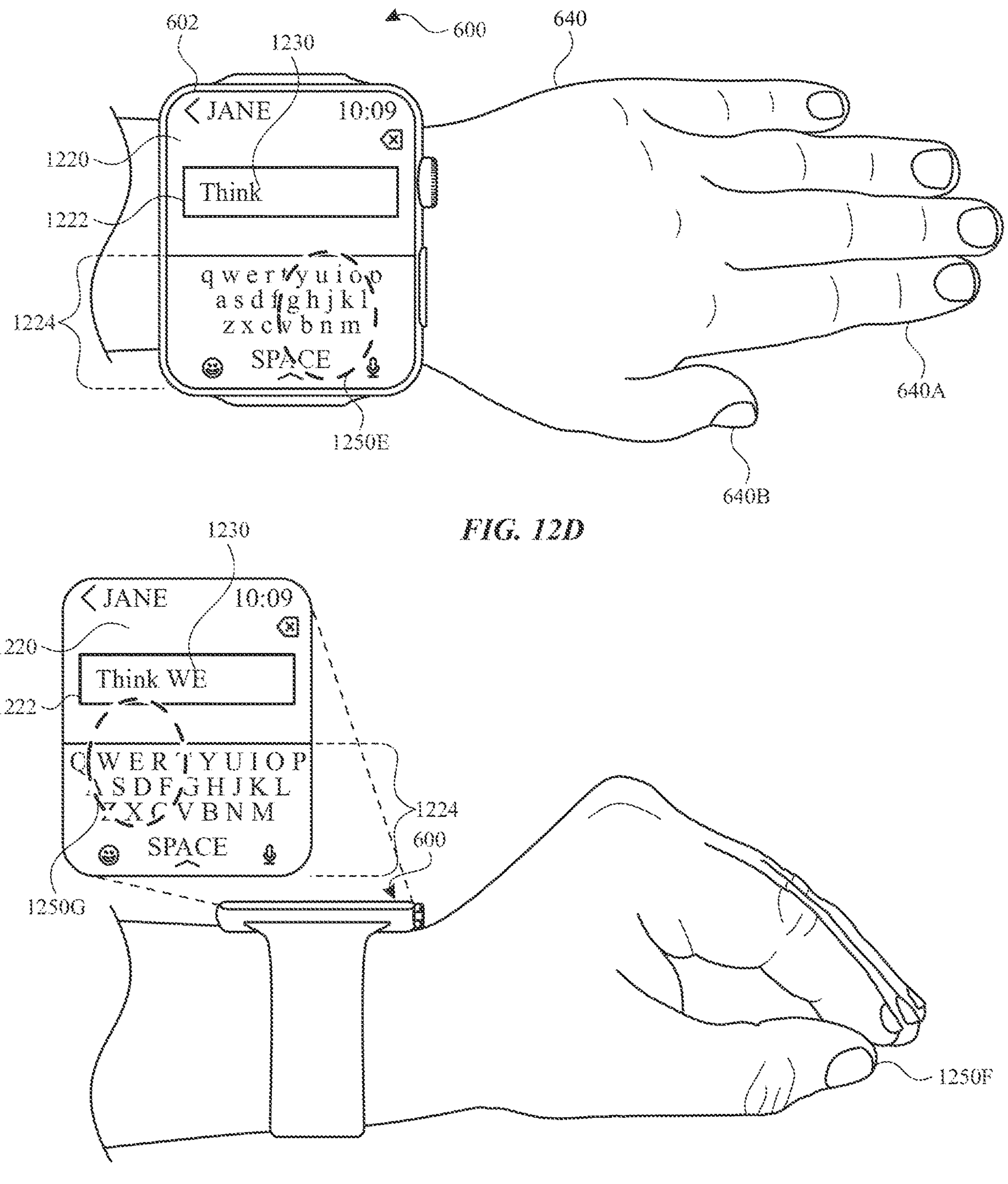

At FIG. 12D, computer system 600 is displaying, via display 602, messaging user interface 1220 that includes text entry field 1222 (e.g., to draft a message to be sent) and keyboard 1224 (e.g., for entering characters into text entry field 1222). At FIG. 12D, while computer system 600 does not detect that a pinch gesture is being performed by hand 640, keyboard 1224 operates in a lower-case mode in which lowercase characters are entered into text entry field 1222 in response to tap inputs (e.g., by the user using a different hand from hand 640) directed to keyboard 1224. At FIG. 12D, computer system 600 has detected tap input 1250E on letter "k" of keyboard 1224 (while in the lower-case mode) and, in response, computer system 600 has entered a lowercase "k" into field 1222 to result in draft message 1230 displaying "Think". Subsequently, computer system 600 received a space bar input and entered a space into text entry field 1222. At FIG. 12E, computer system 600 has detected pinch gesture 1250F being performed by hand 640. In response to detecting pinch gesture 1250F, computer system 600 has changed to an upper-case mode and updated keyboard 1224 to show uppercase letters (and not lowercase letters). While in the upper-case mode, computer system 600 has detected a tap input on the "W" character and a subsequent tap input 1250G on the "E" character of keyboard 1224. In response, computer system 600 has entered an uppercase "W" and an uppercase "E" into field 1222 to result in draft message 1230 displaying "Think WE". While pinch gesture 1250F continues to be detected, computer system 600 stays in the upper-case mode. When pinch gesture 1250F is no longer detected, computer system 600 transitions back to the lower-case mode, displaying keyboard 1224 with lowercase letters (as in FIG. 12D) and entering lower case characters into text entry field 1222 in response to tap inputs on keyboard 1224. After draft message 1230 is complete (e.g., to say "Think WE CAN!"), computer system 600 can use the techniques of FIGS. 8A-8F and/or 10A-10E to send the message.

FIG. 13 is a flow diagram illustrating a method for managing operations using gestures using a computer system in accordance with some embodiments. Method 1300 is performed at a computer system (e.g., 100, 300, 500, and/or 600) (e.g., a tablet, a laptop, a desktop computer, a smartwatch, a wearable device, and/or a smartphone) that is in communication with one or more input devices (e.g., a touch-sensitive surface, a touchscreen display, a button, a keyboard, a mouse, a joystick, a camera sensor, a gyroscope, an accelerometer, and/or a smart watch and/or wearable with a physiological sensor (e.g., a blood pressure sensor, a heart rate sensor placed against the body (wrist or fingers) of the user, configured to track heart-related metrics such as heart rate and/or blood flow, and/or an electromyography sensor)). In some embodiments, the physiological sensor is or includes an optical sensor. Some operations in method 1300 are, optionally, combined, the orders of some operations are, optionally, changed, and some operations are, optionally, omitted.

As described below, method 1300 provides an intuitive way for managing operations using gestures. The method reduces the cognitive burden on a user for performing operations, thereby creating a more efficient human-machine interface. For battery-operated computing devices, enabling a user to perform operations faster and more efficiently conserves power and increases the time between battery charges.

The computer system (e.g., 600) detects (1302), via the one or more input devices (e.g., a touch-sensitive surface), a first input (e.g., 1250A, 1250B, 1250C) of a first type (e.g., a stylus input (e.g., tap and/or drag) or finger input on a touch-sensitive surface of the computer system, a rotation of a rotatable input mechanism of the computer system, an activation of a displayed affordance or physical button of the computer system, and/or an activation of keys of a (virtual or physical) keyboard).

In response (1304) to detecting the first input of the first type and in accordance with a determination that a respective air gesture was being detected (e.g., by an external device, such as a watch and/or wearable (e.g., that is worn on a hand of a user (e.g., worn on a wrist of the user and/or worn on one or more fingers of a user))) when (e.g., while) the first input of the first type was detected, the computer system (e.g., 600) performs (1306) a first operation (e.g., erase/delete, as in FIG. 12C) (e.g., displaying a writing, drawn line, and/or a scribble based on the first input using a stylus or finger input, changing a magnitude of a first function (such as volume) based on the first input using a rotatable input mechanism, and/or entering lower case text based on the first input using a keyboard) based on the first input of the first type.

In response (1304) to detecting the first input of the first type and in accordance with a determination that the respective air gesture was not being detected (e.g., by the watch and/or wearable) when (e.g., while) the first input of the first type was detected, the computer system (e.g., 600) performs (e.g., 1308) a second operation (e.g., write, as in FIGS. 12A and 12B) (e.g., deleting a writing, a drawn line, and/or a scribble based on the first input using a stylus or finger input, changing a magnitude of a second function (such as display brightness) based on the first input using the rotatable input mechanism, and/or entering upper case text based on the first input using the keyboard), different from the first operation, based on the first input of the first type.

Using the respective air gesture as a modifier for performing operations based on the input of the first type enables the user to quickly perform different operations by providing or not providing the respective air gesture, thereby reducing the number of inputs required to perform the operations and improving the man-machine interface.

In some embodiments, the respective air gesture (e.g., 1250F and/or 1250C) is (or includes) a pinch air gesture. In some embodiments, a pinch air gesture is a motion gesture (e.g., performed in the air and/or a performed using a hand on which the wearable computer system is worn) that includes movement of a first finger (e.g., thumb) of a hand of a user coming together with a second finger (e.g., forefinger) of the same hand of the user. Using a pinch air gesture as the modifier enables the user of the computer system to provide the modifier input using the same hand on which the computer system is being worn, thereby improving the man-machine interface.

In some embodiments, the first input (e.g., 1250A-1250C) of the first type is a stylus input along a path (e.g., a line or a bent line). Modifying the operation of a stylus based on the respective air gesture enables a user of the computer system to use the stylus in multiple modes, such as writing and erasing, thereby reducing the number of inputs needed to switch between the modes.

In some embodiments, the first operation (e.g., as shown in FIG. 12C) is an erase operation (e.g., along the path of movement of the stylus input). Modifying the operation of a stylus based on the respective air gesture enables a user of the computer system to use the stylus in multiple modes, such as writing and erasing, thereby reducing the number of inputs needed to switch between the modes.

In some embodiments, the second operation (e.g., as shown in FIGS. 12A-12B) is a write operation (e.g., along the path of movement of the stylus input). Modifying the operation of a stylus based on the respective air gesture enables a user of the computer system to use the stylus in multiple modes, such as writing and erasing, thereby reducing the number of inputs needed to switch between the modes.

In some embodiments, the first input (e.g., 1250E and/or 1250G) of the first type is a keyboard input (or other typing input). Modifying the operation of keyboard input based on the respective air gesture enables a user of the computer system to use the keyboard to provide multiple types of input, such as uppercase and lowercase input, thereby reducing the number of inputs needed to switch between the modes.

In some embodiments, the first operation (e.g., as shown in FIG. 12E) is a text entry operation using a first case (e.g., uppercase). In some embodiments, the first operation is a text entry of a first character. Modifying the operation of keyboard input based on the respective air gesture enables a user of the computer system to use the keyboard to provide multiple types of input, such as uppercase and lowercase input, thereby reducing the number of inputs needed to switch between the modes.

In some embodiments, the second operation (e.g., as shown in FIG. 12D) is a text entry operation using a second case (e.g., lowercase) that is different from the first case. In some embodiments, the second operation is a text entry of the first character. Modifying the operation of keyboard input based on the respective air gesture enables a user of the computer system to use the keyboard to provide multiple types of input, such as uppercase and lowercase input, thereby reducing the number of inputs needed to switch between the modes.

Note that details of the processes described above with respect to method 1300 (e.g., FIG. 13) are also applicable in an analogous manner to the methods described below/above. For example, methods 700, 900, 1100, and 1500 optionally includes one or more of the characteristics of the various methods described above with reference to method 1300. For example, the computer system is the same computer system. For another example, the air gestures optionally perform the same operations. For brevity, these details are not repeated below.

FIGS. 14A-14L illustrate exemplary user interfaces for navigating user interfaces using air gestures, in accordance with some embodiments. The user interfaces in these figures are used to illustrate the processes described below, including the processes in FIG. 15.

FIGS. 14A-14L illustrates computer system 600 that includes a plurality of input devices, such as a gyroscope, an accelerometer, touchscreen 602, and one or more physiological sensors. In some embodiments, the one or more physiological sensors include a blood pressure sensor, a heart rate sensor, and/or an electromyography (EMG) sensor. In some embodiments, the EMG sensor (e.g., a surface EMG sensor) measures electrical activity and/or muscle response by sensing electromyographic signals generated by a user's muscles as the muscles are moved. In some embodiments, the EMG sensor senses and/or measures electrical impulses generated when a user's muscles contract. In some embodiments, computer system 600 includes an EMG sensor that senses electromyographic signals of hand 640 to determine whether a gesture is being performed by hand 640 and, if so, what gesture is being performed. For example, the EMG sensor (with or without the use of the accelerometer) is used to detect whether a pinch-and-hold air gesture is performed and for how long the gesture (e.g., the pinch) is maintained. In some embodiments, the accelerometer is used to detected whether a gesture is being performed by hand 640 and, if so, what gesture is being performed. For example, the accelerometer (with or without the use of the EMG sensor) is used to detect whether a pinch air gesture is performed. In some embodiments, the EMG sensor and/or the accelerometer is used to detect a swipe air gesture, such as with thumb 640B moving along forefinger 640A.

Figures 14A, 14B:
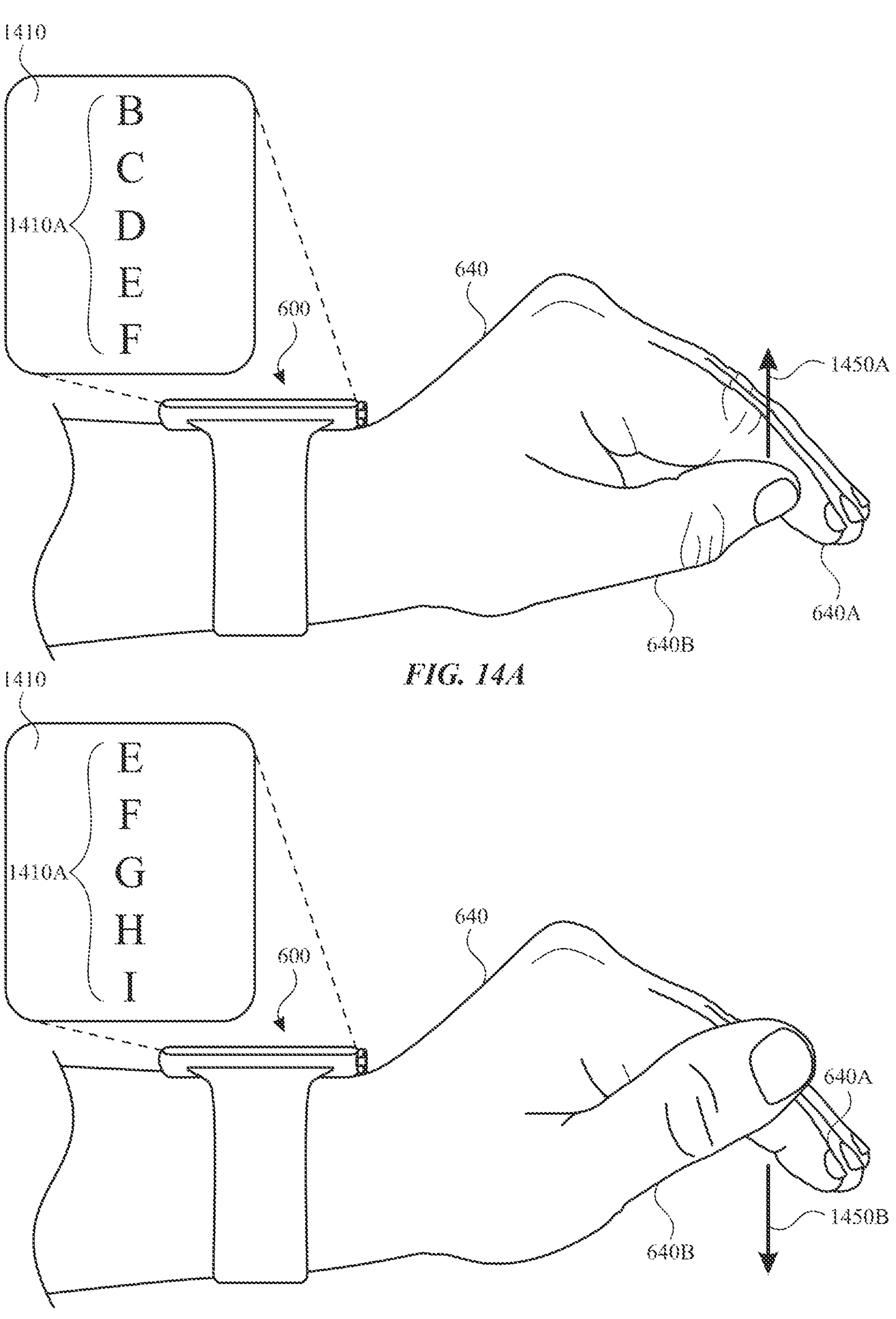
FIGS. 14A-14L illustrate exemplary user interfaces for performing operations based on a direction and/or magnitude of a gesture, in accordance with some embodiments.

FIGS. 14A-14D illustrate using air gestures to scroll content displayed on computer system 600. At FIG. 14A, computer system 600 is displaying user interface 1410, which is scrollable. In some examples, user interface 1410 includes a list of items, such as list 1410A, an alphabetical list of contacts, and/or a list of applications. At FIG. 14A, while displaying list 1410A, computer system 600 detects air gesture 1450A (e.g., a swipe up air gesture). Air gesture 1450A includes thumb 640B moving relative to forefinger 640A. As illustrated in FIG. 14A, thumb 640B is touching forefinger 640A and thumb 640B is moving along forefinger 640A in a direction that is away from the tip of forefinger 640A (e.g., towards the base of forefinger 640A). This motion is similar to motion where forefinger 640A is operating as a (virtual or simulated) trackpad and thumb 640B is moving along the trackpad to provide inputs that include direction and/or magnitude. In some embodiments, air gesture 1450A includes forefinger 640A moving and/or thumb 640B moving such that forefinger 640A and thumb 640B move relative to each other. In some embodiments, the technique uses air gestures whereby the thumb 640B is operating as a (virtual or simulated) trackpad and forefinger 640A is moving along the trackpad to provide inputs that include direction and/or magnitude.

At FIG. 14B, in response to detecting air gesture 1450A, computer system 600 scrolls list 1410A, as illustrated. In some embodiments, computer system 600 detects that air gesture 1450A has an upward direction and a magnitude of one inch of movement. Computer system 600 scrolls list 1410A based on the detected direction and magnitude of air gesture 1450A. As shown in FIG. 14B, list 1410A is scrolled upward (e.g., moving items out of view from the top of display 602 and moving items into view from the bottom of display 602) based on the upward direction of air gesture 1450A. Similarly, list 1410A is scrolled the equivalent of three letters (e.g., letters B, C, and D are moved out of view and letters G, H, and I are moved into view) based on the magnitude (e.g., distance and/or speed) of air gesture 1450A. In some embodiments, the amount of scroll is proportional to the magnitude of air gesture 1450A. For example, when the magnitude of the air gesture is greater, computer system 600 performs more scrolling than if the magnitude of the air gesture is less.

At FIG. 14B, computer system 600 detects air gesture 1450B (e.g., a swipe up air gesture). Air gesture 1450B includes thumb 640B moving relative to forefinger 640A. As illustrated in FIG. 14B, thumb 640B is touching forefinger 640A and thumb 640B is moving along forefinger 640A in a direction that is towards the tip of forefinger 640A (e.g., away from the base of forefinger 640A). As discussed above in greater detail, this motion is similar to motion where forefinger 640A is operating as a (virtual or simulated) trackpad and thumb 640B is moving along the trackpad to provide inputs that include direction and/or magnitude.

Figures 14C, 14D:
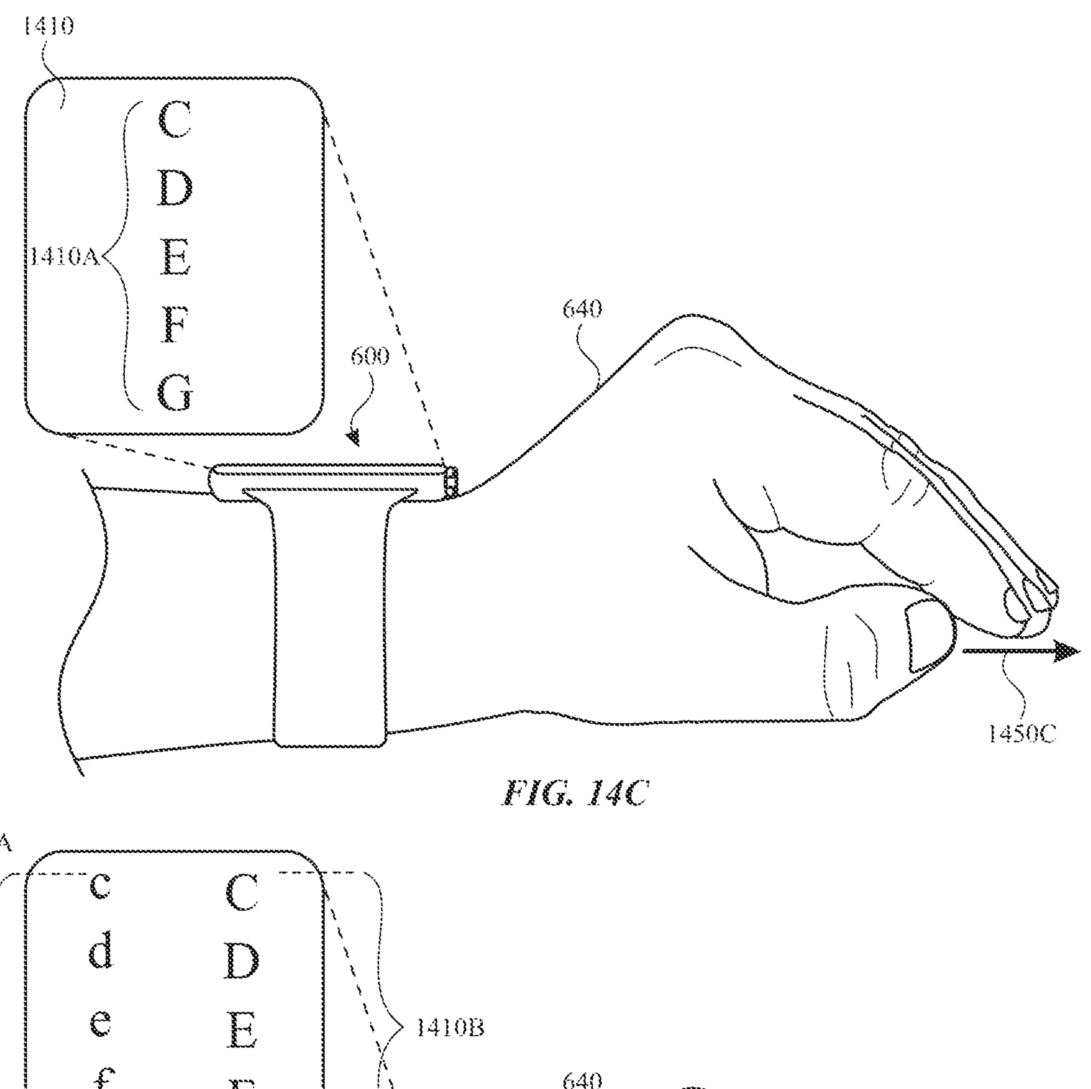

At FIG. 14C, in response to detecting air gesture 1450B, computer system 600 scrolls list 1410A, as illustrated. In some embodiments, computer system 600 detects that air gesture 1450B has a downward direction and a magnitude of 0.6 inches of movement. Computer system 600 scrolls list 1410A based on the detected direction and magnitude of air gesture 1450B. As shown in FIG. 14C, list 1410A is scrolled downward (e.g., moving items into view from the top of display 602 and moving items out of view from the bottom of display 602) based on the downward direction of air gesture 1450B. Similarly, list 1410A is scrolled the equivalent of two letters (e.g., letters H and I are moved out of view and letters C and D are moved into view) based on the magnitude (e.g., distance and/or speed) of air gesture 1450B. In some embodiments, the amount of scroll is proportional to the magnitude of air gesture 1450B. For example, when the magnitude of the air gesture is greater, computer system 600 performs more scrolling than if the magnitude of the air gesture is less.

At FIG. 14C, computer system 600 detects air gesture 1450C (e.g., a swipe right air gesture). Air gesture 1450C includes thumb 640B moving relative to forefinger 640A. As illustrated in FIG. 14C, thumb 640B is touching forefinger 640A and forefinger 640A is moving along thumb 640B in a direction that is towards the base of thumb 640B (e.g., away from the tip of thumb 640B). As discussed above in greater detail, this motion is similar to motion where thumb 640B is operating as a (virtual or simulated) trackpad and forefinger 640A is moving along the trackpad to provide inputs that include direction and/or magnitude.

At FIG. 14D, in response to detecting air gesture 1450C, computer system 600 scrolls user interface 1410, as illustrated. In some embodiments, computer system 600 detects that air gesture 1450C has a rightward direction and a magnitude of 2 inches/second of movement. Computer system 600 scrolls user interface 1410 based on the detected direction and magnitude of air gesture 1450C. As shown in FIG. 14C, list 1410A is scrolled rightward based on the rightward direction of air gesture 1450C and based on the speed of air gesture 1450C exceeding a threshold speed (e.g., exceeding 1 inch/second). In some embodiments, when the speed of air gesture 1450C does not exceed the threshold speed, the user interface is not scrolled horizontally. Scrolling user interface 1410 in the rightward direction causes list 1410B to be displayed (e.g., by coming onto the display from the left side of the display). In some embodiments, in response to detecting air gesture 1450C, computer system 600 displays list 1410B and ceases to display list 1410A. In some embodiments, list 1410B is also scrollable in the upward/downward directions using swipe up air gesture and swipe down air gesture, respectively.

In some embodiment, as displayed contents are scrolled, an element of the scrolled content is highlighted. In some embodiments, the highlighted element can be activated (e.g., for entry into a text entry field) using the techniques discussed above, such as with respect to FIGS. 10A-10E.

Figures 14E, 14F:
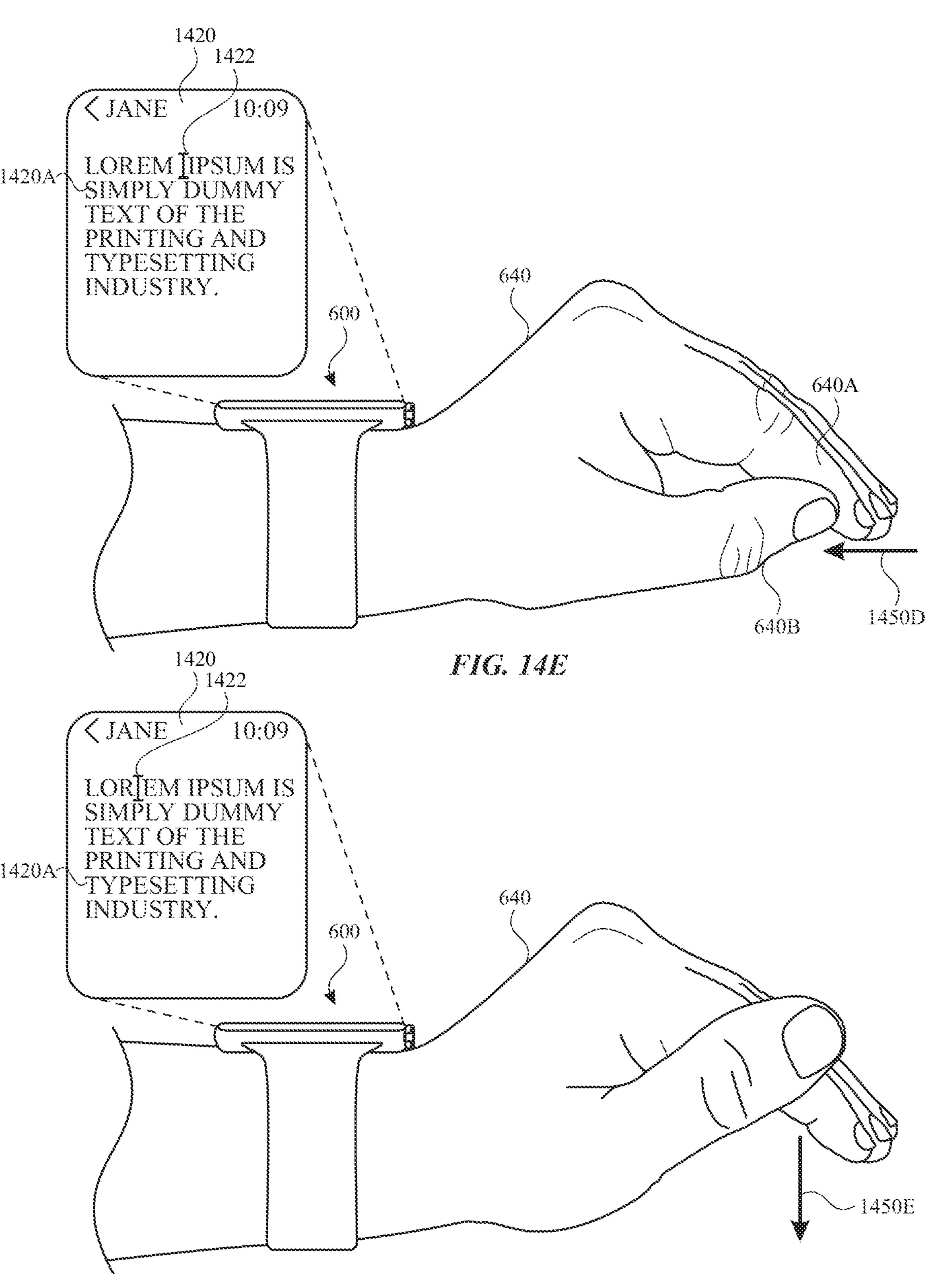
Figure 14G:
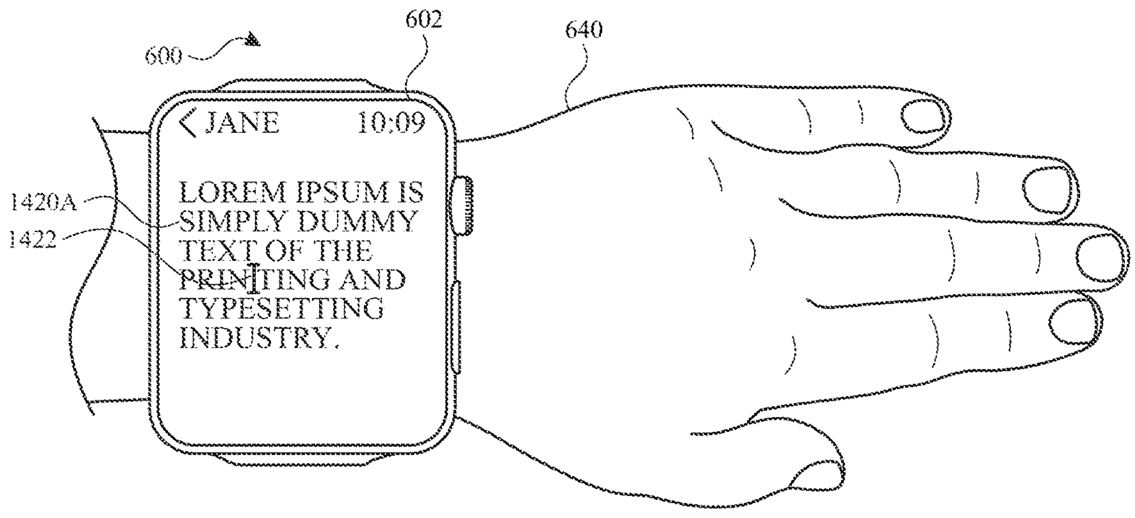

FIGS. 14E-14G illustrate using air gestures to reposition cursor 1422 within text 1420A that is displayed on computer system 600. At FIG. 14E, computer system 600 is displaying user interface 1420 (e.g., a word processing user interface, a messaging user interface, and/or a text editing user interface), which includes text 1420A (e.g., text of a word processing document and/or a draft message). At FIG. 14E, while cursor 1422 is positioned at a first location within text 1420A, computer system 600 detects air gesture 1450D (e.g., a swipe left air gesture).

At FIG. 14F, in response to (e.g., in conjunction with) detecting air gesture 1450D, computer system 600 moves cursor 1422 to a second location within text 1420A. In some embodiments, computer system 600 moves cursor 1422 in a direction that is based on a direction (e.g., up, down, left, and/or right) of air gesture 1450D and with a magnitude (e.g., distances or number of characters traversed) that is based on a magnitude (e.g., amount, distanced, and/or speed) of air gesture 1450D. For example, a distance magnitude of air gesture 1450D is a distance of finger movement and/or a speed magnitude of air gesture 1450D is a speed of finger movement. At FIG. 14F, cursor 1422 has moved to the left by two characters within text 1420A. Cursor 1422 has moved to the left based on air gesture 1450D including a leftward movement of thumb 640B along forefinger 640A. Cursor 1422 has moved two characters within text 1420A based on a magnitude (e.g., distance) of the movement of thumb 640B along forefinger 640A of air gesture 1450D. Thus, computer system 600 moves cursor 1422 around within text 1420A based on air gestures that the user performs, thereby enabling the user to quickly and efficiently reposition cursor 1422.

At FIG. 14E, while cursor 1422 is positioned at the second location within text 1420A, computer system 600 detects air gesture 1450E (e.g., a downward air gesture).

At FIG. 14F, cursor 1422 has moved down three lines within text 1420A. Cursor 1422 has moved down based on air gesture 1450E including a downward movement of thumb 640B along forefinger 640A. In some embodiments, computer system 600 moves cursor 1422 in a direction that is based on a direction (e.g., up, down, left, and/or right) of air gesture 1450E and with a magnitude (e.g., distances or number of characters traversed) that is based on a magnitude (e.g., amount, distanced, and/or speed) of air gesture 1450E. At FIG. 14G, cursor 1422 has moved down based on air gesture 1450E including a downward movement of thumb 640B along forefinger 640A. Cursor 1422 has moved three lines within text 1420A based on a magnitude (e.g., distance) of the movement of thumb 640B along forefinger 640A of air gesture 1450E.

In some embodiments, computer system 600 detects additional air gestures and performs different operations. In some embodiments, computer system 600 detects a pinch-and-hold air gesture and, in response, highlights the word, sentence, and/or paragraph in which the cursor is currently positioned. In some embodiments, computer system 600 detects a double-pinch air gesture and, in response, ceases to display the cursor. In some embodiments, computer system 600 detects a pinch air gesture and, in response, displays a keyboard for entering additional text.

Figure 14H:
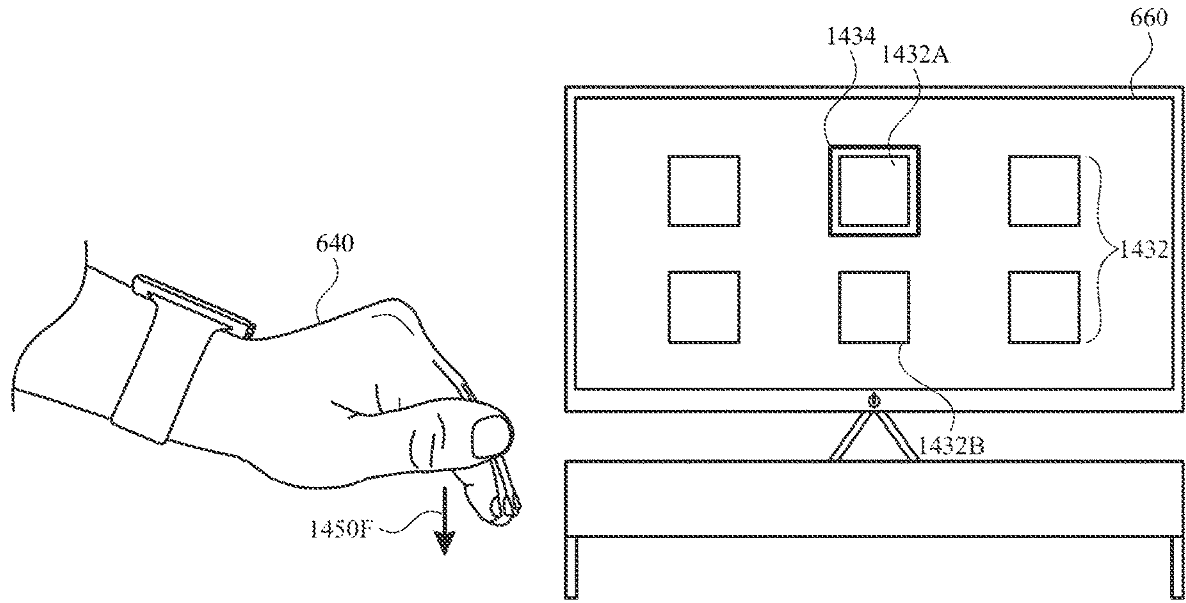
Figure 14I:
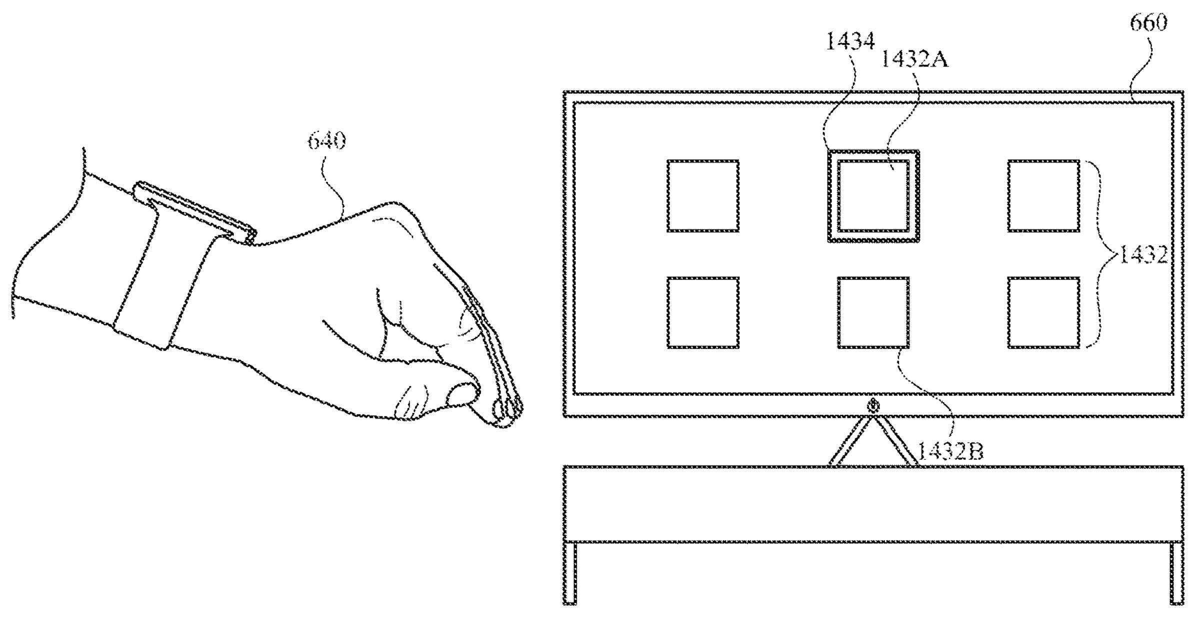

FIGS. 14H-14L illustrates using air gestures while pointing at an external device to control a user interface of the external device. At FIG. 14H, computer system 600 is worn on hand 640. At FIG. 14H, external device 660 (e.g., a television, set top box, tabletop device, and/or wall mounted device) is displaying user interface 1432, which includes application icons 1432A and 1432B. Application icon 1432A, when activated, causes display of a messaging application and application icon 1432B, when activated, causes display of a gaming application. As illustrated in FIG. 14H, application icon 1432A is currently highlighted by focus element 1434. While hand 640 is not directed to (e.g., not pointing at and/or not pointing to within a threshold angle of) external device 660, computer system 600 detects air gesture 1450F (e.g., a swipe down air gesture). In response to detecting air gesture 1450F and in accordance with a determination that hand 640 of the user is not directed to external device 660, computer system 600 forgoes transmitting a command to external device 660 that is based on air gesture 1450F. In some embodiments, computer system 600 instead performs a different operation (e.g., a local operation (as described with respect to FIGS. 14A-14G) and/or transmits a command to a different external device) based on air gesture 1450F. Accordingly, at FIG. 14I, focus element 1434 continues to highlight application icon 1432A and, optionally, user interface 1432 remains unchanged.

Figure 14J:
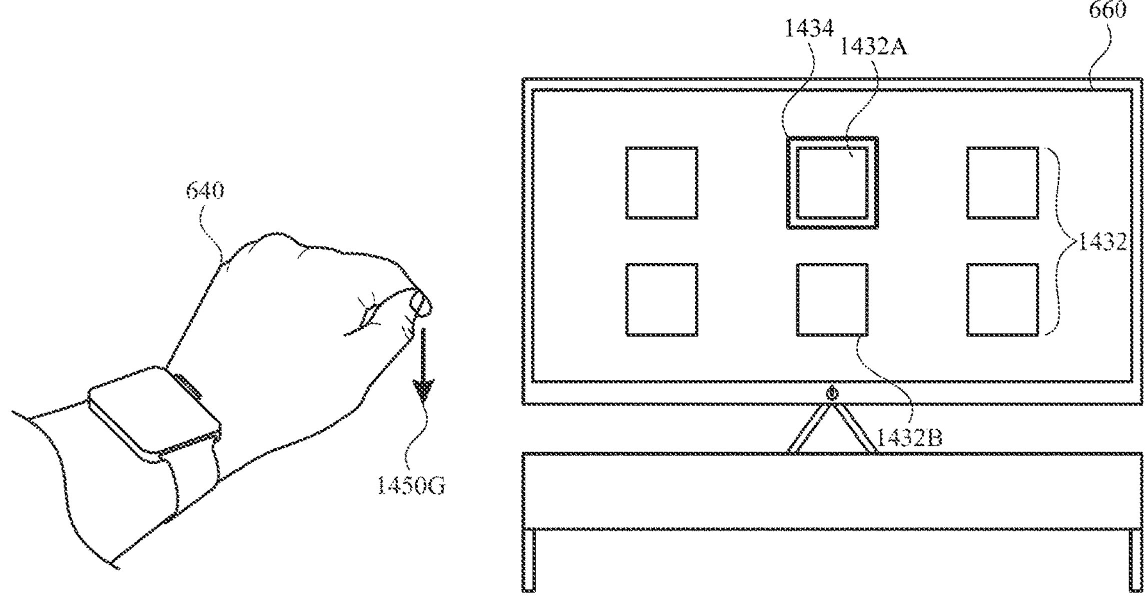

At FIG. 14J, the user raises hand to point to external device 660. While hand 640 is directed to (e.g., pointing at and/or pointing to within a threshold angle of) external device 660, computer system 600 detects air gesture 1450G (e.g., a swipe down air gesture). In response to detecting air gesture 1450G and in accordance with a determination that hand 640 of the user is directed to external device 660, computer system 600 transmits a command to external device 660 that is based on air gesture 1450G. In this example, the command is an instruction to navigate within user interface 1432. Accordingly, at FIG. 14K, focus element 1434 moves from highlighting application icon 1432A to highlighting application icon 1434B.

Figure 14K:
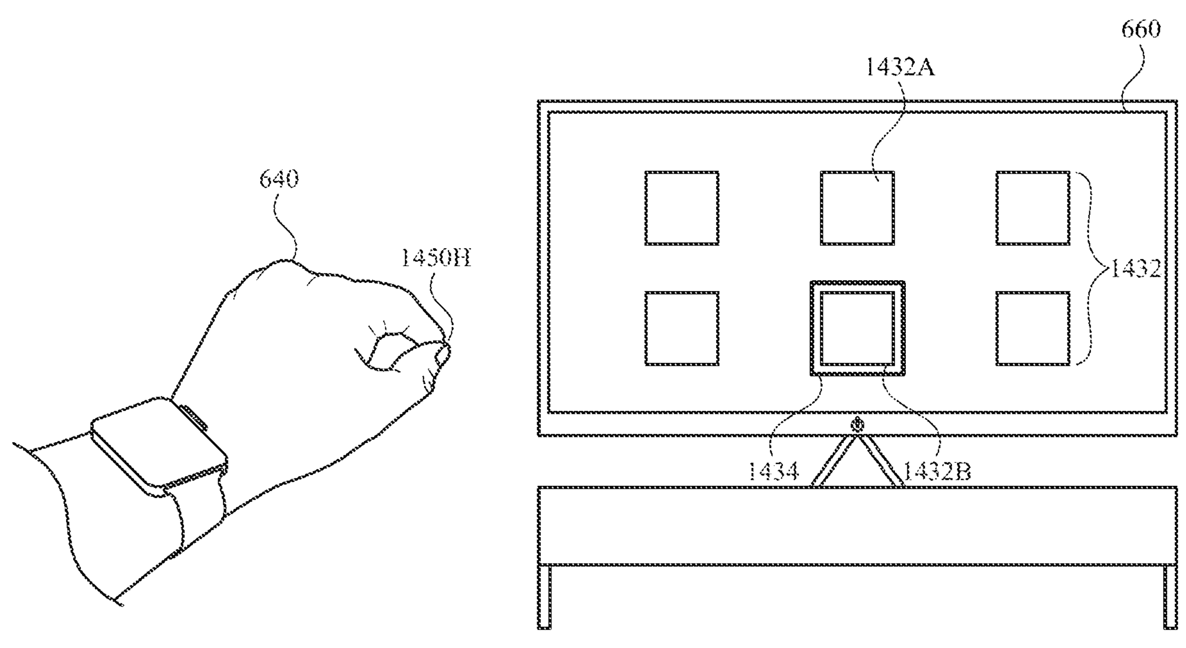
Figure 14L:
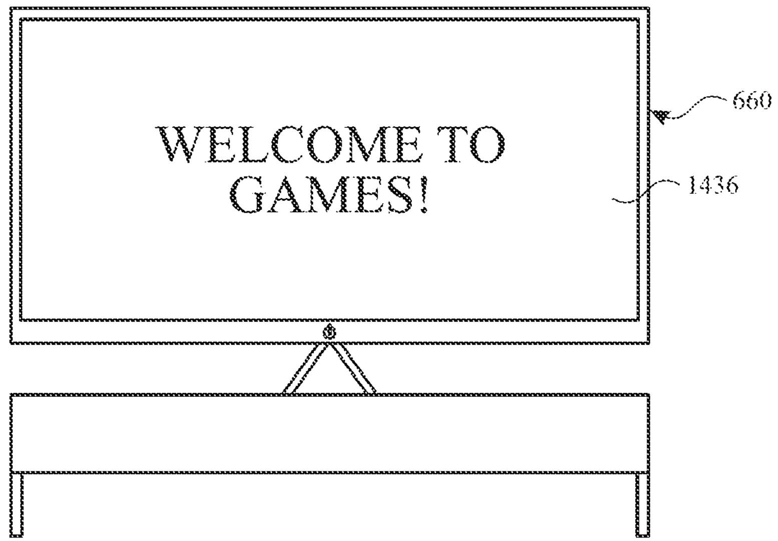

At FIG. 14K, while hand 640 is directed to (e.g., pointing at and/or pointing to within a threshold angle of) external device 660, computer system 600 detects air gesture 1450H (e.g., a pinch air gesture and/or a pinch-and-hold air gesture). In response to detecting air gesture 1450H and in accordance with a determination that hand 640 of the user is directed to external device 660, computer system 600 transmits a command to external device 660 that is based on air gesture 1450H. In this example, the command is an instruction to activate the highlighted user interface element. Accordingly, at FIG. 14L, external device 660 has received the command to activate application icon 1434B and, in response, displays games user interface 1436.

In some embodiments, computer system 600 uses a magnetometer, gyroscope, and/or accelerometer to determine the direction that hand 640 is pointing. In some embodiments, computer system 600 and/or external device 660 use short range communication protocols to determine their locations/directions with respect to each other.

FIG. 15 is a flow diagram illustrating a method for performing an operation using a finger slider gesture using a computer system in accordance with some embodiments. Method 1500 is performed at a computer system (e.g., 100, 300, 500, and/or 600) (e.g., a smartwatch, a wearable device, and/or a smartphone) (e.g., that is worn on a hand of a user (e.g., worn on a wrist of the user and/or worn on one or more fingers of a user)) that is in communication with one or more input devices (e.g., a touch-sensitive surface, a touchscreen display, a button, a keyboard, a mouse, a joystick, a camera sensor, a microphone, a gyroscope, and/or an accelerometer) that include a physiological sensor (e.g., a blood pressure sensor, a heart rate sensor placed against the body (wrist or fingers) of the user, configured to track heart-related metrics such as heart rate and/or blood flow, and/or an electromyography sensor). In some embodiments, the physiological sensor is or includes an optical sensor. Some operations in method 1500 are, optionally, combined, the orders of some operations are, optionally, changed, and some operations are, optionally, omitted.

As described below, method 1500 provides an intuitive way for performing an operation using a finger slider gesture. The method reduces the cognitive burden on a user for performing operations, thereby creating a more efficient human-machine interface. For battery-operated computing devices, enabling a user to perform operations faster and more efficiently conserves power and increases the time between battery charges.

The computer system (e.g., 600) detects (1502), via the physiological sensor, a first finger slide gesture (e.g., 1450A-1450E and/or 1450G) (e.g., that is an air gesture) of a first finger of a hand of a user sliding in a first direction (e.g., toward the tip of the second finger, away from the top of the second finger, toward a top of the second finger, or away from the top of the second finger) and with a first magnitude (e.g., distance and/or speed) along a second finger, different from the first finger, of the hand of the user.

In response to detecting the first finger slide gesture, the computer system (e.g., 600) performs (1504) a first operation (e.g., a navigation and/or a scroll) (e.g., transmitting a request and/or changing a mode) that is based on the first direction and/or first magnitude of the first finger slide gesture. Performing the first operation based on the direction and/or magnitude of the finger slide gesture enables the user of the computer system to perform various operations based on slide gesture, thereby reducing the number of inputs required to perform the operations and improving the man-machine interface.

In some embodiments, the first operation (e.g., scroll up/down as in FIGS. 14B-14C and/or navigate left/right as in FIGS. 14D, 14F) is based on the first direction and the first magnitude of the first finger slide gesture. Performing the first operation based on the direction and magnitude of the finger slide gesture enables the user of the computer system to perform various operations based on slide gesture, thereby reducing the number of inputs required to perform the operations and improving the man-machine interface.

In some embodiments, the computer system (e.g., 600) detects, via the physiological sensor, a second finger slide gesture (e.g., 1450C) of the first finger of the hand (e.g., 640) of the user sliding in a second direction (e.g., away the tip of the second finger, towards the top of the second finger, aware from a top of the second finger, or towards the top of the second finger) and with a second magnitude (e.g., distance and/or speed) along the second finger of the hand of the user. In response to detecting the second finger slide gesture (e.g., 1450C), the computer system (e.g., 600) performs a second operation (horizontal scroll) (e.g., transmitting a request and/or changing a mode), different from the first operation, that is based on the second direction and/or second magnitude of the second finger slide gesture. Performing a second operation based on the direction and/or magnitude of the finger slide gesture enables the user of the computer system to perform various operations based on slide gestures, thereby reducing the number of inputs required to perform the operations and improving the man-machine interface.

In some embodiments, the first operation comprises a scroll operation (e.g., as in FIGS. 14A-14D) that scrolls content that is displayed, via a display generation component of the computer system. Performing scroll operations based on the direction and/or magnitude of the finger slide gesture enables the user of the computer system to quickly and easily perform scroll operation and view additional content, thereby reducing the number of inputs required to perform the operations and improving the man-machine interface.

In some embodiments, a scroll direction of the scroll operation is based on the first direction of the first finger slide gesture. In some embodiments, the scroll operation is an up, down, left, or right scroll operation that is based on the first direction. Basing the direction of the scroll on the direction of the first finger slide gesture enables the user to select the direction in which the scroll operation is performed, thereby reducing the number of inputs required.

In some embodiments, a scroll magnitude (e.g., scroll speed or distance) of the scroll operation is based on the first magnitude (e.g., speed or distance) of the first finger slide gesture. Basing the amount of the scroll on the distance of the first finger slide gesture enables the user to select the amount of scrolling that is performed, thereby reducing the number of inputs required.

In some embodiments, the computer system (e.g., 600) detects, via one or more input devices, a rotational input (e.g., using a rotatable input mechanism, such as a crown) that includes a rotational direction and a rotational magnitude (e.g., speed and or amount). In response to detecting the rotational input, the computer system (e.g., 600) performs the first operation (e.g., transmitting a request and/or changing a mode) that is based on the rotational direction and/or rotational magnitude of the rotational input. Using a crown of the computer system to perform the same operation (or same type of operation) as the first operation enables the computer system to perform that type of operation using various types of input, thereby providing the user with more input options and improving the man-machine interface.

In some embodiments, the first magnitude of the first finger slide gesture is a detected distance of movement of the first finger slide gesture (e.g., of the first finger along the second finger). Basing the first operation on the distance of the movement of the first finger slide gesture enables the user to provide various inputs using different distances of the movement, thereby improving the man-machine interface.

In some embodiments, the first magnitude of the first finger slide gesture is a detected speed of movement of the first finger slide gesture (e.g., of the first finger along the second finger). Basing the first operation on the speed of the movement of the first finger slide gesture enables the user to provide various inputs using different speeds of the movement, thereby improving the man-machine interface.

In some embodiments, the first operation includes a magnitude that is based on the first magnitude of the first finger slide gesture. Performing the first operation using a magnitude that is based on the first magnitude allows the user of the computer system to control the magnitude of the first operation using the magnitude of the finger slide gesture, thereby improving the man-machine interface.

In some embodiments, the magnitude of the first operation is an amount of scroll (e.g., as in FIGS. 14A-14C). Performing varying amounts of scrolling based on the first magnitude allows the user of the computer system to control the amount of scrolling using the magnitude of the finger slide gesture, thereby improving the man-machine interface.

In some embodiments, the magnitude of the first operation is a speed of scroll (e.g., as in FIGS. 14A-14C). Performing varying speeds of scrolling based on the first magnitude allows the user of the computer system to control the speed of scrolling using the magnitude of the finger slide gesture, thereby improving the man-machine interface.

In some embodiments, the first operation is sending an instruction to an external device (e.g., 660) (e.g., a television and/or a set top box) to traverse a user interface (e.g., 1432) of the external device, wherein the external device is selected from a plurality of external devices based on the hand (or arm) of the user being directed to (e.g., pointing towards) (as in FIG. 14J) the external device when the first finger slide gesture is detected. In some embodiments, the second operation is sending an instruction to an external device (e.g., a television and/or a set top box) to traverse a user interface of the external device in a different direction, wherein the external device is selected from the plurality of external devices based on the hand (or arm) of the user being directed to (e.g., pointing towards) the external device when the second finger slide gesture is detected. The computer system selecting the external device based on the user's hand (on which the computer system is being worn) being directed to (e.g., pointing towards) the external device and navigating a user interface of the external device allows the user to quickly and efficiently control user interfaces of various devices by pointing their hand at the device and performing navigation gestures.

In some embodiments, the first operation (as in FIGS. 14E-14G) is a movement of a cursor (e.g., 1422) (e.g., a text insertion cursor) (e.g., within text and/or a user interface). In some embodiments, the second operation is a movement of the cursor in a different direction. Moving a cursor within content (e.g., text) enables the user to quickly and easily change the location of the cursor using the gesture, thereby improving the man-machine interface.

Note that details of the processes described above with respect to method 1500 (e.g., FIG. 15) are also applicable in an analogous manner to the methods described above. For example, method 1500 optionally includes one or more of the characteristics of the various methods described above with reference to methods 700, 900, 1100, and 1300. For example, the computer system is the same computer system. For another example, the air gestures optionally perform the same operations. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve detection of user inputs. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve how users provide inputs. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of detecting inputs/gestures, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer system configured to communicate with a display generation component and one or more input devices that include a physiological sensor, comprising:

one or more processors; and memory storing one or more programs configured to be executed by the one or more processors, the one or more programs including instructions for:

displaying, via the display generation component, a respective user interface that includes a plurality of representations corresponding to a plurality of detected external devices;

while displaying the respective user interface, detecting, via the one or more input devices, a first air gesture to display a respective indication corresponding to a respective external device from among the plurality of detected external devices;

in response to detecting the first air gesture to display the respective indication corresponding to the respective external device, displaying, in the respective user interface and via the display generation component, the respective indication corresponding to the respective external device;

while displaying the respective indication corresponding to the respective external device in the respective user interface, detecting, via the one or more input devices, a respective air gesture; and in response to detecting the respective air gesture:

in accordance with a determination that the respective indication corresponds to a first external device, sending a command corresponding to the respective air gesture to the first external device without sending the command corresponding to the respective air gesture to a second external device that is different from the first external device; and in accordance with a determination that the respective indication corresponds to the second external device, sending the command corresponding to the respective air gesture to the second external device without sending the command corresponding to the respective air gesture to the first external device.

2. The computer system of claim 1, wherein:

in accordance with a determination that the respective air gesture is a second air gesture, the command is a first command; and in accordance with a determination that the respective air gesture is a third air gesture that is different from the second air gesture, the command is a second command that is different from the first command.

3. The computer system of claim 1, wherein the one or more input devices include a physiological sensor, the one or more programs further including instructions for:

detecting, via the physiological sensor, a heart rate of a user of the computer system; and displaying, via the display generation component, the heart rate.

4. The computer system of claim 1, wherein the computer system is a wearable device that is being worn by a user of the computer system.

5. The computer system of claim 1, wherein the first air gesture to display the respective indication corresponding to the respective external device is a double-pinch air gesture.

6. The computer system of claim 1, wherein the first air gesture to display the respective indication corresponding to the respective external device includes a swipe air gesture.

7. The computer system of claim 1, wherein:

the plurality of detected external devices are selected based on detected proximity of the plurality of detected external devices to the computer system; and an order of indications of the plurality of detected external devices is based on states and/or proximity of the plurality of detected external devices.

8. The computer system of claim 1, wherein the respective air gesture is a swipe air gesture and the command corresponding to the swipe air gesture is a navigational command to navigate a user interface of the respective external device.

9. The computer system of claim 1, the one or more programs further including instructions for:

while displaying the respective indication corresponding to the respective external device, detecting, via the one or more input devices, a double-pinch air gesture; and in response to detecting the double-pinch air gesture, ceasing to display an indication of an external device of the plurality of detected external devices.

10. The computer system of claim 1, the one or more programs further including instructions for:

in response to receiving the first air gesture to display the respective indication corresponding to the respective external device, sending an indication to the respective external device that the computer system is configured to control the respective external device.

11. The computer system of claim 1, wherein:

the respective air gesture includes a pinch-and-hold air gesture performed by a hand of a user of the computer system and the respective air gesture includes a first magnitude of rotation of the hand of the user of the computer system, wherein the command corresponding to the respective air gesture that is sent to the respective external device includes a second magnitude, based on the first magnitude, of change for a feature of the respective external device.

12. The computer system of claim 11, wherein the first magnitude is an amount of rotation of the hand of the user of the computer system.

13. The computer system of claim 11, wherein the first magnitude is a speed of rotation of the hand of the user of the computer system.

14. The computer system of claim 11, wherein a rate of change of the feature of the respective external device is limited to a threshold rate based on a value of the feature of the respective external device exceeding a threshold value.

15. The computer system of claim 11, the one or more programs further including instructions for:

in response to detecting rotation of the hand of the user of the computer system as part of the respective air gesture, providing tactile feedback.

16. The computer system of claim 1, wherein the respective air gesture is a pinch air gesture.

17. The computer system of claim 1, wherein the respective air gesture is a pinch-and-hold air gesture and the command corresponding to the pinch-and-hold air gesture is a navigational command to navigate back in a user interface of the respective external device.

18. The computer system of claim 1, wherein the respective air gesture is a tap of a finger of a user of the computer system against a palm of the user of the computer system.

19. The computer system of claim 1, the one or more programs further including instructions for:

while displaying the respective indication corresponding to the respective external device, detecting, via one or more microphones of the computer system, an utterance; and in response to detecting the utterance:

in accordance with a determination that the respective indication corresponds to the first external device, sending information based on the utterance to the first external device without sending the information based on the utterance to the second external device; and in accordance with a determination that the respective indication corresponds to the second external device, sending information based on the utterance to the second external device without sending the information based on the utterance to the first external device.

20. The computer system of claim 1, wherein a first indication corresponds to a first application of a first external device and a second indication, different from the first indication, corresponds to a second application, different from the first application, of the first external device.

21. A non-transitory computer-readable storage medium storing one or more programs configured to be executed by one or more processors of a computer system that is in communication with a display generation component and one or more input devices, the one or more programs including instructions for:

displaying, via the display generation component, a respective user interface that includes a plurality of representations corresponding to a plurality of detected external devices;

while displaying the respective user interface, detecting, via the one or more input devices, a first air gesture to display a respective indication corresponding to a respective external device from among the plurality of detected external devices;

in response to detecting the first air gesture to display the respective indication corresponding to the respective external device, displaying, in the respective user interface and via the display generation component, the respective indication corresponding to the respective external device;

while displaying the respective indication corresponding to the respective external device in the respective user interface, detecting, via the one or more input devices, a respective air gesture; and in response to detecting the respective air gesture:

in accordance with a determination that the respective indication corresponds to a first external device, sending a command corresponding to the respective air gesture to the first external device without sending the command corresponding to the respective air gesture to a second external device that is different from the first external device; and in accordance with a determination that the respective indication corresponds to the second external device, sending a command corresponding to the respective air gesture to the second external device without sending the command corresponding to the respective air gesture to the first external device.

22. A method, comprising:

at a computer system that is in communication with a display generation component and one or more input devices:

displaying, via the display generation component, a respective user interface that includes a plurality of representations corresponding to a plurality of detected external devices;

while displaying the respective user interface, detecting, via the one or more input devices, a first air gesture to display a respective indication corresponding to a respective external device from among the plurality of detected external devices;

in response to detecting the first air gesture to display the respective indication corresponding to the respective external device, displaying, in the respective user interface and via the display generation component, the respective indication corresponding to the respective external device;

while displaying the respective indication corresponding to the respective external device in the respective user interface, detecting, via the one or more input devices, a respective air gesture; and in response to detecting the respective air gesture:

in accordance with a determination that the respective indication corresponds to a first external device, sending a command corresponding to the respective air gesture to the first external device without sending the command corresponding to the respective air gesture to a second external device that is different from the first external device; and in accordance with a determination that the respective indication corresponds to the second external device, sending a command corresponding to the respective air gesture to the second external device without sending the command corresponding to the respective air gesture to the first external device.

23. The non-transitory computer-readable storage medium of claim 21, wherein:

in accordance with a determination that the respective air gesture is a second air gesture, the command is a first command; and in accordance with a determination that the respective air gesture is a third air gesture that is different from the second air gesture, the command is a second command that is different from the first command.

24. The non-transitory computer-readable storage medium of claim 21, wherein the one or more input devices include a physiological sensor, the one or more programs further including instructions for:

detecting, via the physiological sensor, a heart rate of a user of the computer system; and displaying, via the display generation component, the heart rate.

25. The non-transitory computer-readable storage medium of claim 21, wherein the computer system is a wearable device that is being worn by a user of the computer system.

26. The non-transitory computer-readable storage medium of claim 21, wherein the first air gesture to display the respective indication corresponding to the respective external device is a double-pinch air gesture.

27. The non-transitory computer-readable storage medium of claim 21, wherein the first air gesture to display the respective indication corresponding to the respective external device includes a swipe air gesture.

28. The non-transitory computer-readable storage medium of claim 21, wherein:

the plurality of detected external devices are selected based on detected proximity of the plurality of detected external devices to the computer system; and an order of indications of the plurality of detected external devices is based on states and/or proximity of the plurality of detected external devices.

29. The non-transitory computer-readable storage medium of claim 21, wherein the respective air gesture is a swipe air gesture and the command corresponding to the swipe air gesture is a navigational command to navigate a user interface of the respective external device.

30. The non-transitory computer-readable storage medium of claim 21, the one or more programs further including instructions for:

while displaying the respective indication corresponding to the respective external device, detecting, via the one or more input devices, a double-pinch air gesture; and in response to detecting the double-pinch air gesture, ceasing to display an indication of an external device of the plurality of detected external devices.

31. The non-transitory computer-readable storage medium of claim 21, the one or more programs further including instructions for:

in response to receiving the first air gesture to display the respective indication corresponding to the respective external device, sending an indication to the respective external device that the computer system is configured to control the respective external device.

32. The non-transitory computer-readable storage medium of claim 21, wherein:

the respective air gesture includes a pinch-and-hold air gesture performed by a hand of a user of the computer system and the respective air gesture includes a first magnitude of rotation of the hand of the user of the computer system, wherein the command corresponding to the respective air gesture that is sent to the respective external device includes a second magnitude, based on the first magnitude, of change for a feature of the respective external device.

33. The non-transitory computer-readable storage medium of claim 32, wherein the first magnitude is an amount of rotation of the hand of the user of the computer system.

34. The non-transitory computer-readable storage medium of claim 32, wherein the first magnitude is a speed of rotation of the hand of the user of the computer system.

35. The non-transitory computer-readable storage medium of claim 32, wherein a rate of change of the feature of the respective external device is limited to a threshold rate based on a value of the feature of the respective external device exceeding a threshold value.

36. The non-transitory computer-readable storage medium of claim 32, the one or more programs further including instructions for:

in response to detecting rotation of the hand of the user of the computer system as part of the respective air gesture, providing tactile feedback.

37. The non-transitory computer-readable storage medium of claim 21, wherein the respective air gesture is a pinch air gesture.

38. The non-transitory computer-readable storage medium of claim 21, wherein the respective air gesture is a pinch-and-hold air gesture and the command corresponding to the pinch-and-hold air gesture is a navigational command to navigate back in a user interface of the respective external device.

39. The non-transitory computer-readable storage medium of claim 21, wherein the respective air gesture is a tap of a finger of a user of the computer system against a palm of the user of the computer system.

40. The non-transitory computer-readable storage medium of claim 21, the one or more programs further including instructions for:

while displaying the respective indication corresponding to the respective external device, detecting, via one or more microphones of the computer system, an utterance; and in response to detecting the utterance:

in accordance with a determination that the respective indication corresponds to the first external device, sending information based on the utterance to the first external device without sending the information based on the utterance to the second external device; and in accordance with a determination that the respective indication corresponds to the second external device, sending information based on the utterance to the second external device without sending the information based on the utterance to the first external device.

41. The non-transitory computer-readable storage medium of claim 21, wherein a first indication corresponds to a first application of a first external device and a second indication, different from the first indication, corresponds to a second application, different from the first application, of the first external device.

42. The method of claim 22, wherein:

in accordance with a determination that the respective air gesture is a second air gesture, the command is a first command; and in accordance with a determination that the respective air gesture is a third air gesture that is different from the second air gesture, the command is a second command that is different from the first command.

43. The method of claim 22, wherein the one or more input devices include a physiological sensor, the method further comprising:

detecting, via the physiological sensor, a heart rate of a user of the computer system; and displaying, via the display generation component, the heart rate.

44. The method of claim 22, wherein the computer system is a wearable device that is being worn by a user of the computer system.

45. The method of claim 22, wherein the first air gesture to display the respective indication corresponding to the respective external device is a double-pinch air gesture.

46. The method of claim 22, wherein the first air gesture to display the respective indication corresponding to the respective external device includes a swipe air gesture.

47. The method of claim 22, wherein:

the plurality of detected external devices are selected based on detected proximity of the plurality of detected external devices to the computer system; and an order of indications of the plurality of detected external devices is based on states and/or proximity of the plurality of detected external devices.

48. The method of claim 22, wherein the respective air gesture is a swipe air gesture and the command corresponding to the swipe air gesture is a navigational command to navigate a user interface of the respective external device.

49. The method of claim 22, further comprising:

while displaying the respective indication corresponding to the respective external device, detecting, via the one or more input devices, a double-pinch air gesture; and in response to detecting the double-pinch air gesture, ceasing to display an indication of an external device of the plurality of detected external devices.

50. The method of claim 22, further comprising:

in response to receiving the first air gesture to display the respective indication corresponding to the respective external device, sending an indication to the respective external device that the computer system is configured to control the respective external device.

51. The method of claim 22, wherein:

the respective air gesture includes a pinch-and-hold air gesture performed by a hand of a user of the computer system and the respective air gesture includes a first magnitude of rotation of the hand of the user of the computer system, wherein the command corresponding to the respective air gesture that is sent to the respective external device includes a second magnitude, based on the first magnitude, of change for a feature of the respective external device.

52. The method of claim 51, wherein the first magnitude is an amount of rotation of the hand of the user of the computer system.

53. The method of claim 51, wherein the first magnitude is a speed of rotation of the hand of the user of the computer system.

54. The method of claim 51, wherein a rate of change of the feature of the respective external device is limited to a threshold rate based on a value of the feature of the respective external device exceeding a threshold value.

55. The method of claim 51, further comprising:

in response to detecting rotation of the hand of the user of the computer system as part of the respective air gesture, providing tactile feedback.

56. The method of claim 22, wherein the respective air gesture is a pinch air gesture.

57. The method of claim 22, wherein the respective air gesture is a pinch-and-hold air gesture and the command corresponding to the pinch-and-hold air gesture is a navigational command to navigate back in a user interface of the respective external device.

58. The method of claim 22, wherein the respective air gesture is a tap of a finger of a user of the computer system against a palm of the user of the computer system.

59. The method of claim 22, further comprising:

while displaying the respective indication corresponding to the respective external device, detecting, via one or more microphones of the computer system, an utterance; and in response to detecting the utterance:

in accordance with a determination that the respective indication corresponds to the first external device, sending information based on the utterance to the first external device without sending the information based on the utterance to the second external device; and in accordance with a determination that the respective indication corresponds to the second external device, sending information based on the utterance to the second external device without sending the information based on the utterance to the first external device.

60. The method of claim 22, wherein a first indication corresponds to a first application of a first external device and a second indication, different from the first indication, corresponds to a second application, different from the first application, of the first external device.

* * * * *